United States Patent
Gibson

(10) Patent No.: US 11,011,896 B2
(45) Date of Patent: May 18, 2021

(54) CABLE GLAND FOR GROUNDING A CABLE

(71) Applicant: CAPE Industries, LLC, Liberty, MO (US)

(72) Inventor: Allen Todd Gibson, Liberty, MO (US)

(73) Assignee: CAPE INDUSTRIES, LLC, Liberty, MO (US)

( * ) Notice: Subject to any disclaimer, the term of this patent is extended or adjusted under 35 U.S.C. 154(b) by 0 days.

(21) Appl. No.: 16/884,882

(22) Filed: May 27, 2020

(65) Prior Publication Data

US 2020/0287367 A1 Sep. 10, 2020

Related U.S. Application Data

(60) Continuation-in-part of application No. 16/137,170, filed on Sep. 20, 2018, now Pat. No. 10,673,216, (Continued)

(51) Int. Cl.
*H02G 3/00* (2006.01)
*H02G 3/06* (2006.01)
(Continued)

(52) U.S. Cl.
CPC ......... *H02G 3/0625* (2013.01); *H01R 13/648* (2013.01); *H02G 3/0658* (2013.01);
(Continued)

(58) Field of Classification Search
CPC .. H02G 3/0625; H02G 3/0658; H02G 3/0675; H02G 15/013; H02G 15/043; H02G 15/007; H01R 13/648
(Continued)

(56) References Cited

U.S. PATENT DOCUMENTS 1,809,582 A 6/1931 Church
3,833,754 A 9/1974 Philibert
(Continued)

FOREIGN PATENT DOCUMENTS

AU 52172-96 11/1996
DE 202011002287 5/2012
(Continued)

OTHER PUBLICATIONS

Cable Glands for Ex Applications; Pratley Ex e Envirogland—For SWA Cable, Pratley Electrical, Factoria, Krugersdorp, South Africa, 6 pgs. Aug. 11, 2016.
(Continued)

*Primary Examiner* — Harshad C Patel
(74) *Attorney, Agent, or Firm* — Spencer Fane LLP

(57) ABSTRACT

A cable gland and methods for earthing, grounding, bonding, and electromagnetic capability with armored, metal-clad, and metallic-sheathed cable types. The cable gland comprises a gland body, a plurality of extensions, an elastomer seal, a compression member configured to rotate the plurality of extensions towards to the elastomer seal, and an earthing insert mounted in the gland body configured to electrically connect a cable to a neutral and/or grounded conductor. The cable gland is configured to provide an air-tight seal between the exterior of the cable and the elastomer seal through rotation of the plurality of extension upon the elastomer seal. The cable gland may include an o-ring and nut to secure the cable gland to a planar body. The earthing insert comprises a grounding spring in electrical communication with a metallic portion of the cable and a neutral and/or grounded conductor.

15 Claims, 42 Drawing Sheets

Related U.S. Application Data which is a division of application No. 15/787,657, filed on Oct. 18, 2017, now Pat. No. 10,090,653.

(60) Provisional application No. 62/409,720, filed on Oct. 18, 2016.

(51) Int. Cl.
| | |
|---|---|
| *H01R 13/648* | (2006.01) |
| *H02G 15/04* | (2006.01) |
| *H02G 15/013* | (2006.01) |
| *H02G 15/007* | (2006.01) |
| *H02G 1/00* | (2006.01) |

(52) U.S. Cl.
CPC ......... *H02G 3/0675* (2013.01); *H02G 15/013* (2013.01); *H02G 15/043* (2013.01); *H02G 1/00* (2013.01); *H02G 15/007* (2013.01)

(58) Field of Classification Search
USPC .............................................. 174/78; 439/98
See application file for complete search history.

(56) References Cited

U.S. PATENT DOCUMENTS

| | | | |
|---|---|---|---|
| 4,032,205 A | 6/1977 | Taj | |
| 4,080,024 A * | 3/1978 | Kroon | H01R 4/646 174/78 |
| 5,015,804 A | 5/1991 | Nattel et al. | |
| 5,037,140 A | 8/1991 | Anderson | |
| 5,310,963 A | 5/1994 | Kennelly | |
| 5,491,766 A | 2/1996 | Huynh et al. | |
| 5,691,505 A | 11/1997 | Norris | |
| 5,789,706 A | 8/1998 | Perkins | |
| 5,933,556 A | 8/1999 | Hawkins | |
| 6,034,325 A * | 3/2000 | Nattel | H01R 9/03 174/59 |
| 7,563,993 B2 | 7/2009 | Drotleff et al. | |
| 7,963,567 B2 | 6/2011 | Gallardo et al. | |
| 8,134,088 B2 | 3/2012 | Naumann et al. | |
| 8,485,062 B2 | 7/2013 | Chiou | |
| 8,562,361 B2 | 10/2013 | Corbett et al. | |
| 8,586,881 B1 | 11/2013 | Shemtov | |
| 8,919,221 B2 | 12/2014 | Chiou | |
| 9,178,303 B2 | 11/2015 | Franke et al. | |
| 9,252,585 B2 | 2/2016 | Schlachter et al. | |
| 10,090,653 B2 | 10/2018 | Gibson | |
| 10,236,555 B2 | 3/2019 | Blodt | |
| 2002/0006309 A1 | 1/2002 | Bartholoma et al. | |
| 2007/0017688 A1 | 1/2007 | Pyron et al. | |
| 2009/0149053 A1 | 6/2009 | Chansrivong | |
| 2010/0029114 A1 | 2/2010 | Hsu et al. | |
| 2010/0108020 A1 | 5/2010 | Miretti | |
| 2011/0147081 A1 | 6/2011 | Best | |
| 2013/0256467 A1 | 10/2013 | Aumiller | |
| 2014/0127938 A1 | 5/2014 | DeFrance et al. | |
| 2014/0259617 A1 | 9/2014 | Kompa et al. | |
| 2015/0222107 A1 | 8/2015 | Jackson | |
| 2020/0029114 A1 * | 1/2020 | Kim | H04N 21/4758 |

FOREIGN PATENT DOCUMENTS

| | | |
|---|---|---|
| DE | 202011002287 | 7/2012 |
| GB | 1280144 | 7/1972 |
| GB | 2214728 | 6/1989 |
| GB | 2214728 | 9/1989 |
| JP | 9-308070 | 11/1997 |
| JP | 2001-295819 | 10/2001 |
| JP | 2013-230012 | 11/2013 |

OTHER PUBLICATIONS

Spring manual design, second edition, Society of Automotive Engineers Publications, Jan. 1, 1996, pp. 176-179, XP002207353.

* cited by examiner

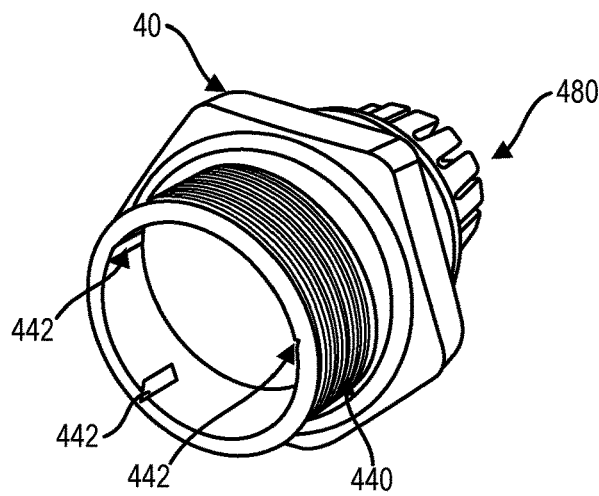
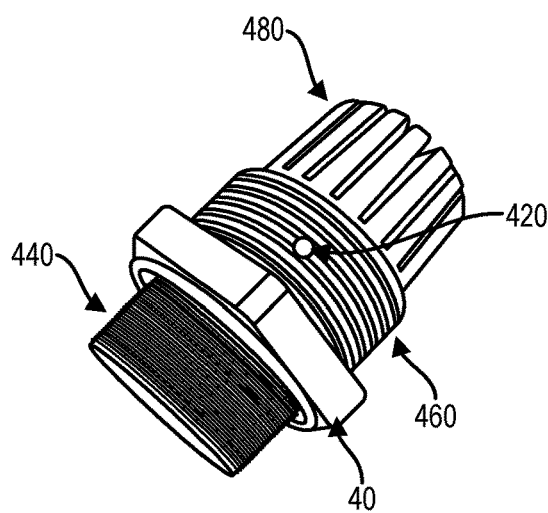
FIG. 4A   FIG. 4B
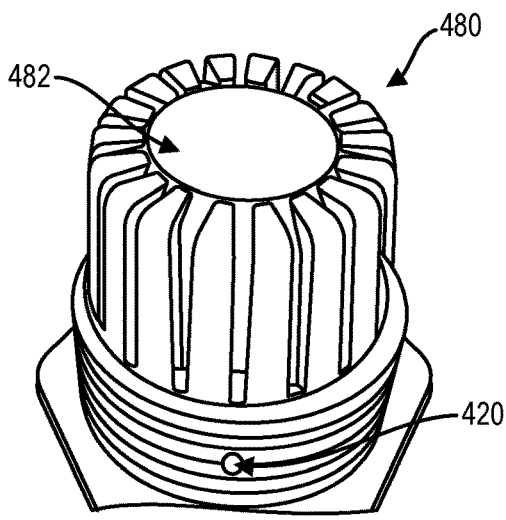
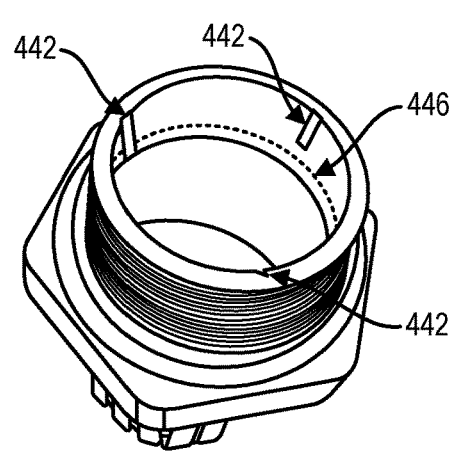
FIG. 4C   FIG. 4D
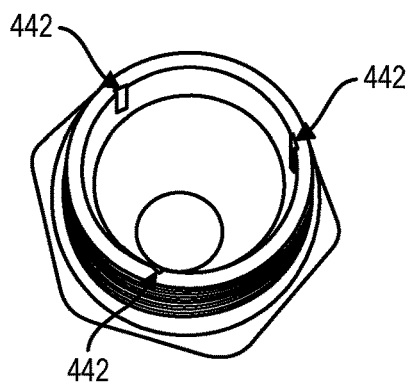
FIG. 4E

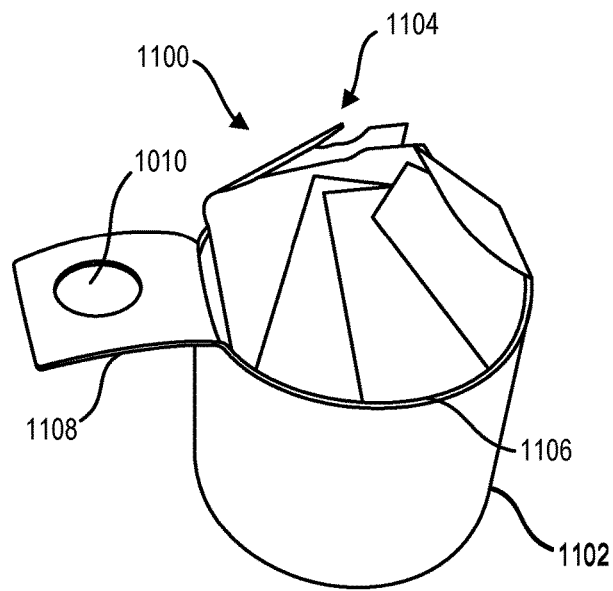
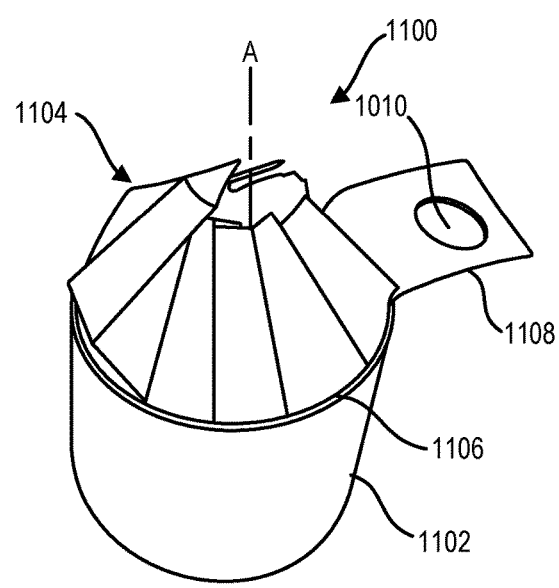
FIG. 11A  FIG. 11B
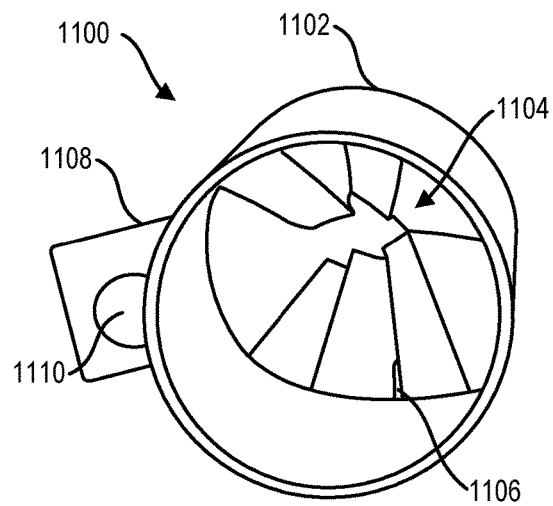
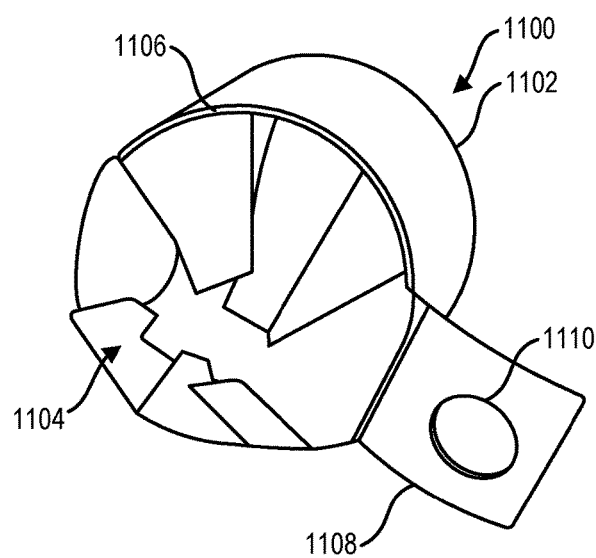
FIG. 11C  FIG. 11D

A-A

CABLE GLAND FOR GROUNDING A CABLE

CROSS-REFERENCE TO RELATED APPLICATIONS

This application claims benefit of U.S. Divisional application Ser. No. 16/137,170, filed Sep. 20, 2018, titled CABLE GLAND WITH PRESSURE DOME TIGHTENING MECHANISMS AND METHOD FOR EARTHING A CABLE, which claims benefit of U.S. Non-Provisional application Ser. No. 15/787,657, filed Oct. 18, 2017, titled CABLE GLAND AND METHOD AND APPARATUS FOR EARTHING A CABLE, now U.S. Pat. No. 10,090,653 issued Oct. 2, 2018, which claims benefit U.S. Provisional Application Ser. No. 62/409,720, filed Oct. 18, 2016, titled CABLE CONNECTOR (CABLE GLAND) FOR EARTHING, BONDING & ELECTROMAGNETIC CAPABILITY WITH ARMORED OR METAL CLAD CABLES. The contents of the identified earlier-filed applications are hereby incorporated by reference into the present application.

BACKGROUND

1. Technical Field

The disclosed subject matter relates generally to cable glands, also referred to as cable connectors, and more particularly to cable glands for earthing, bonding, and electromagnetic capability with armored, metal-clad, and metallic-sheathed cable types.

2. Background

Industrial project designs and installations utilize armored, metal-clad, and metallic-sheathed cables as replacements to fixed rigid-conduit type installations. Conduit systems have historically been used to provide mechanical and environmental protection for cables. These metallic conduit systems are required to be earthed or bonded to provide protection against electrical short-circuit faults. Many different earthing and bonding products exist to meet these needs.

Armored, metal clad and metallic-sheathed cables are an alternative to these rigid-conduit systems, providing flexible metallic jackets which contain the individual cable conductors, providing mechanical and environmental protection, much the same as traditional rigid conduit systems. Armored, metal-clad, and metallic-sheathed cables must also be connected to a device to provide sealing at the point of the cable connection to an electrical enclosure such as a junction box or terminal box. The general purposes of these devices known as cable glands or cable connectors are 1) to protect the cable and the enclosure from environmental elements such as rain and dust, 2) to provide strain relief through cable retention, 3) to provide earthing or bonding as protection against potential short-circuit faults, and 4) to provide electromagnetic capability (EMC), which involves addressing all the issues that may cause unwanted effects such as electromagnetic interference or even physical damage in operational equipment (i.e. interference mitigation). To provide this protection against short-circuit faults and to provide EMC, only metallic cable glands meet these market needs, and there is resistance to the use of non-metallic components in this field. Thus, buyers are left with the high price, heavy weight, and cumbersome installation requirements of using metallic cable glands.

SUMMARY

In accordance with an aspect of the disclosed subject matter, a cable gland is provided comprising: a washer sealant; a second washer; a first washer; an adjustable earthing coil; an outer housing; a gland body; wherein the gland body comprises—a sealing connector disposed in the gland body; a tapered area to be received in the outer housing; and a first set of threads adjacent to the tapered area on the gland body—wherein the outer housing has one or more apertures; and wherein the outer housing, once connected to the gland body, and rotated around the first set of threads on the gland body, is configured to compress the tapered area, allowing the sealing connector to tighten around a cable inserted into the cable gland. The cable gland provides the functions of an environmental seal and also provides for cable retention and strain relief that is critical for the sustained connection of the cable conductors to the termination point(s).

In accordance with another aspect of the disclosed subject matter, a method of grounding cables threaded through a non-metallic cable gland that is comprised of a gland body, an outer housing, one or more washers, and an adjustable earthing coil, is provided comprising the steps of: inserting the adjustable earthing coil in one end of the cable gland, allowing an integrated tab of the adjustable earthing coil to protrude out of the cable gland; opening cable receiving apertures at each end of the cable gland; expanding the adjustable earthing coil to a circumference wide enough to receive a cable; inserting the cable through a first aperture of the cable gland, through the cable gland, and out a second aperture of the cable gland; tightening the cable receiving aperture that is opposite of the end where the adjustable earthing coil was inserted, tight enough to hold and secure the cable gland in place on the cable; inserting an anti-short bushing around the cable, but between the armor, metal-cladding, or metal-sheathing of the cables and the individual conductors of the cable, in the area that will connect with the adjustable earthing coil; contracting the adjustable earthing coil inside the cable gland so that it tightens around the cable in the area on the cable that is exposed for grounding; and connecting the integrated tab of the adjustable earthing coil to a grounding element outside of the cable gland.

In another embodiment, the cable gland comprises a gland body comprising: a central axis; an interior surface; an exterior surface; a first distal end; a second distal end opposite the first distal end; and a plurality of extensions proximate the second distal end, the plurality of extensions comprises a plurality of inner surfaces inclined towards the central axis; an elastomer seal connected to the interior surface proximate the plurality of extensions, the elastomer seal configured to abut the plurality of inner surfaces; a compression member configured to rotate the plurality of extensions, whereby rotation of the plurality of extensions compresses the elastomer seal; and an earthing insert mounted in the gland body proximate the first distal end.

In another embodiment, the cable gland includes a first set of threads disposed on the exterior surface proximate the first distal end; an o-ring disposed around the exterior surface proximate the first set of threads; and a nut demountably attached to the first set of threads for compressing the o-ring against the gland body.

In another embodiment, the plurality of inner surfaces includes a plurality of cavities configured to engage the elastomer seal.

In yet another embodiment, the elastomer seal includes a set of channels disposed along an exterior seal surface of the elastomer seal, the set of channels extending from a first seal end towards a second seal end; a set of tapered end faces disposed between the set of channels proximate the first seal end; and a set of exterior surface protrusions disposed on the set of tapered end faces configured to engage the plurality of inner surfaces. In another embodiment, the elastomer seal may include a set of tongues disposed around a circumference of the exterior seal surface, the set of tongues configured to engage a set of grooves disposed around the interior surface of the cable gland.

In another embodiment the elastomer seal may comprise an annular ring extending from the first seal end towards a central seal axis; and a plurality of thickened bodies disposed on the annular ring; wherein the plurality of thickened bodies are radially aligned with the set of tapered end faces.

In yet another embodiment, the compression member includes a plurality of tabs disposed around an interior compression surface of the compression member. In another embodiment, at least one of the plurality of tabs comprise an inclined surface configured to intermittently engage the plurality of extensions when the compression member is rotated about the plurality of extensions.

In another embodiment, the plurality of extension of the cable body include a plurality of helical fingers disposed about the central axis. And in yet another embodiment, the cable gland comprises an interior slot disposed about a first interior diameter proximate the first distal end.

In another embodiment of the disclosed subject matter, the earthing insert includes a grounding spring which comprises a coiled member spiraling inwardly towards a central spring axis; wherein the coiled member forms a central coil region about the central spring axis; a set of tabs extending outwardly and away from an exterior coil perimeter surface, the set of tabs configured to engage the interior slot; and a grounding tab connected to a top edge of the grounding spring proximate an interior distal end of the grounding spring; wherein the grounding tab extends outwardly from the central spring axis. At least one of the set of tabs extending upwardly from the exterior coil perimeter surface, and at least one of the set of tabs extending downwardly from the exterior coil perimeter surface.

In an embodiment, the grounding tab includes a lower member connected to the coiled member; an upper member connected to the lower member opposite the coiled member; and a hole disposed through the grounding tab; wherein the hole is positioned between the lower member and the upper member. The earthing insert may be constructed of electrically conductive material.

In another embodiment of the disclosed subject matter, a grounding spring includes a coiled member spiraling inwardly towards a central spring axis; wherein the coiled member forms a central coil region about the central spring axis; a set of tabs extending outwardly and away from an exterior coil perimeter surface, wherein at least one of the set of tabs extending upwardly from the exterior coil perimeter surface, wherein at least one of the set of tabs extending downwardly from the exterior coil perimeter surface; and a grounding tab connected to a top edge of the grounding spring proximate an interior distal end of the grounding spring; wherein the grounding tab extends perpendicular from the central spring axis. The grounding tab may include a lower member connected to the coiled member; an upper member connected to the lower member opposite the coiled member; and a hole disposed through the grounding tab; wherein the hole is positioned between the lower member and the upper member. The grounding spring may be constructed of electrically conductive material.

In another embodiment of the disclosed subject matter, a grounding spring includes a coiled member, a restraining tab connected to the coiled member at a first coil distal end, and a planar grounding tab connected to the coiled member at a second coil distal end. The coiled member spirals inwardly towards a central spring axis S forming a central coil region to receive a cable therethrough.

In another embodiment, a method of grounding a cable includes the steps of (1) providing a cable gland comprising: a gland body having a first set of threads disposed along an exterior surface of the gland body at a first distal end of the gland body; a second set of threads disposed along the exterior surface of the gland body; a central body disposed between the first set of threads and the second set of threads; and a plurality of extensions disposed proximate the second set of threads and extending to a second distal end, the plurality of extensions configured to rotate towards a central axis of the gland body; an elastomer seal connected to an interior surface of the gland body, the elastomer seal abutting the plurality of extensions; whereby rotation of the plurality of extensions towards the central axis reduces an interior diameter of the elastomer seal; a grounding spring having an central coil region, the grounding spring frictionally connected to an interior surface of the gland body; and a compression body configured to thread onto the second set of threads and rotate the plurality of extensions towards the central axis; (2) expanding the central coil region of the grounding spring; (3) inserting a cable through the compression body, the cable gland, and the central coil region; (4) contracting the central coil region about the cable; whereby the grounding spring is in electrical communication with a metallic portion of the cable; (5) threading the compression body on the second set of threads; whereby the plurality of extensions are rotated towards the central axis and subsequently compress the elastomer seal about the cable creating an air-tight seal; and (6) connecting the grounding spring to a ground terminal; thereby electrically grounding the metallic portion of the cable.

In a further embodiment, the method of grounding an cable includes the steps of inserting the first set of threads through an aperture disposed through a planar body; and threading a nut onto the first set of threads and compressing a seal positioned between the gland body and the planar body; thereby forming an air-tight seal.

An objective of the disclosed subject matter is to provide an improved cable gland. Another objective of the disclosed subject matter is to provide an improved earthing coil to assist in grounding cables. Yet another objective of the disclosed subject matter is to provide an improved method for earthing cables.

BRIEF DESCRIPTION OF THE DRAWINGS

The subject matter will now be illustrated in more detail, but not limited, by reference to the specific embodiment shown in the accompanying drawings, with greater emphasis being placed on clarity rather than scale:

FIG. 4A is a perspective view of a gland body according to an embodiment of the disclosed subject matter.

FIG. 4B is a perspective view of a gland body according to an embodiment of the disclosed subject matter.

FIG. 4C is a perspective view of a gland body according to an embodiment of the disclosed subject matter.

FIG. 4D is a perspective view of a gland body according to an embodiment of the disclosed subject matter.

FIG. 4E is a perspective view of a gland body according to an embodiment of the disclosed subject matter.

FIG. 11A is a perspective view of an adjustable earthing coil according to an embodiment of the disclosed subject matter.

FIG. 11B is a perspective view of an adjustable earthing coil according to an embodiment of the disclosed subject matter.

FIG. 11C is a perspective view of an adjustable earthing coil according to an embodiment of the disclosed subject matter.

FIG. 11D is a perspective view of an adjustable earthing coil according to an embodiment of the disclosed subject matter.

DETAILED DESCRIPTION

The disclosed subject matter relates generally to cable glands, also referred to in the industry as cable connectors, and more particularly relates to cable glands for earthing, bonding, grounding, and electromagnetic capability with armored, metal-clad, and metallic-sheathed cable types. The terms "earthing," "bonding," and "grounding" are used interchangeably herein and generally relate to creating a zero potential difference between a metallic element and a neutral and/or grounded conductor.

Figure 1A:
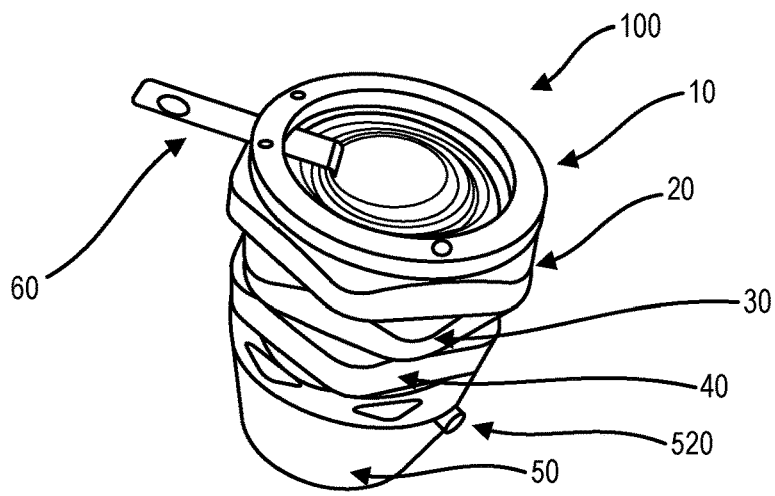
FIG. 1A is a perspective view of a cable gland according to an embodiment of the disclosed subject matter.
Figure 1B:
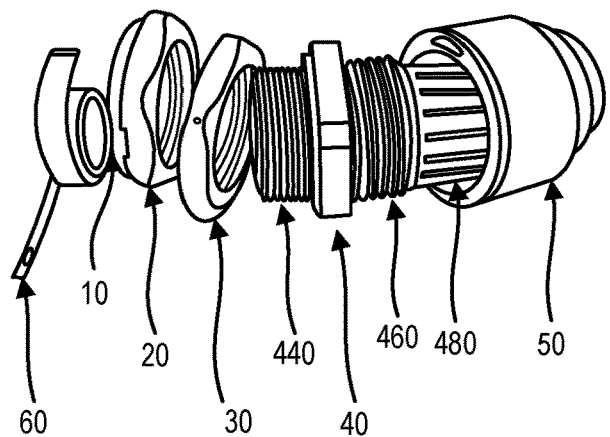
FIG. 1B is a perspective view of a cable gland according to an embodiment of the disclosed subject matter.
Figure 1C:
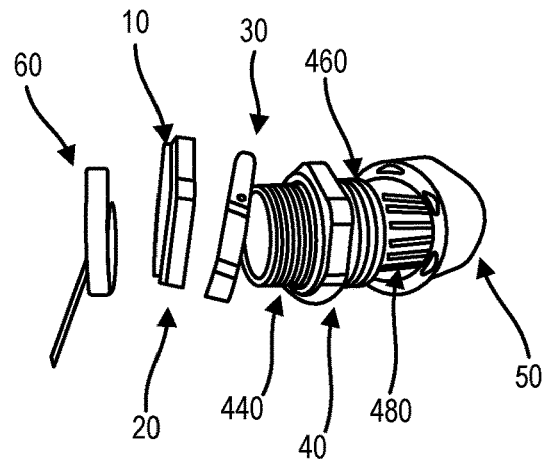
FIG. 1C is another perspective view of a cable gland according to an embodiment of the disclosed subject matter.

In FIG. 1A a perspective top view of an embodiment of a cable gland 100 according to the disclosed subject matter is represented. The cable gland 100 comprises a gland body 40, an outer housing 50 arranged externally at a tapered area 480 of the gland body 40, a first washer 30 arranged externally on the gland body 40, a second washer 20 arranged externally on the gland body 40, a washer sealant 10 arranged externally on the gland body 40, and an adjustable earthing coil 60 arranged internally in the gland body 40. The gland body 40 comprises a second set of threads 440 connected to one end of the gland body 40 and a first set of threads 460 connected to the opposite end of the gland body 40. In an embodiment of the disclosed subject matter, the substrate connection mechanism (or second set of threads) 440 forms a tightening or attachment mechanism to tighten or attach the cable gland 100 to a substrate attachment. Further, the gland body tightening mechanism (or first set of threads) 460 forms a tightening mechanism to tighten the outer housing 50 onto the gland body 40. In another embodiment of the disclosed subject matter, the first and second set of threads 460,440 are helical threads. As shown in FIGS. 1B and 1C, the gland body 40 further comprises a tapered area 480 adjacent to the first set of threads 460 that interacts with the outer housing 50.

Figure 2A:
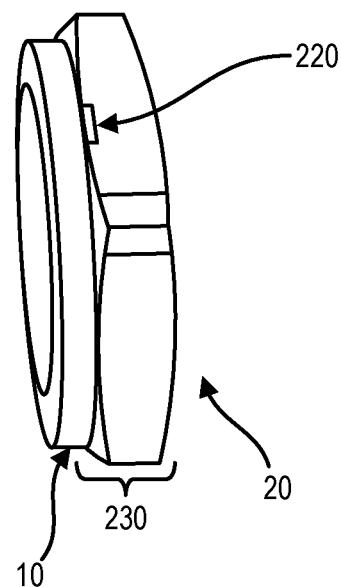
FIG. 2A is a perspective view of a double washer combo according to an embodiment of the disclosed subject matter.
Figure 2B:
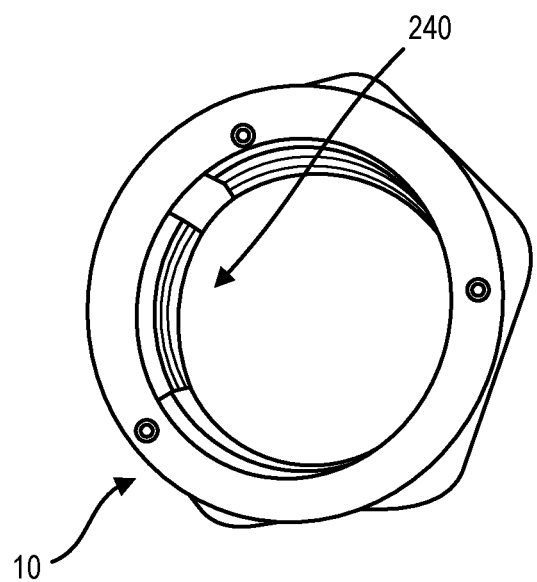
FIG. 2B is a perspective view of a double washer combo according to an embodiment of the disclosed subject matter.

The adjustable earthing coil 60 is secured within the cable gland 100 by a double-washer-sealant-combo 230, see FIGS. 2A-B. The double-washer-sealant-combo comprises a washer sealant 10 connected to a second washer 20. A first aperture 220 is disposed between the washer sealant 10 and second washer 20. The first aperture 220 is a fraction of the circumference of the washer sealant 10 and the second washer 20. The double-washer-sealant-combo 230 may be constructed of a unitary piece through injection molding.

Figure 3A:
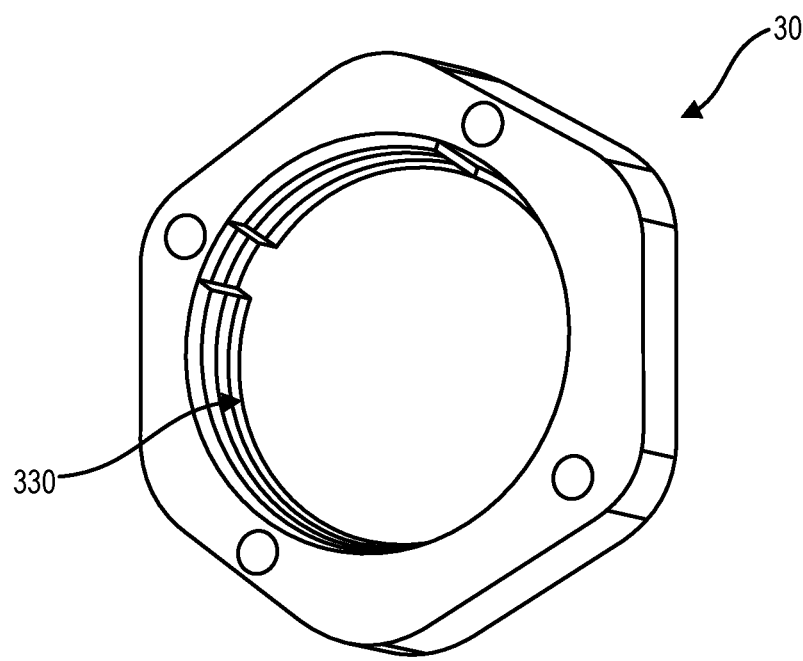
FIG. 3A is a perspective view of a washer according to an embodiment of the disclosed subject matter.
Figure 3B:
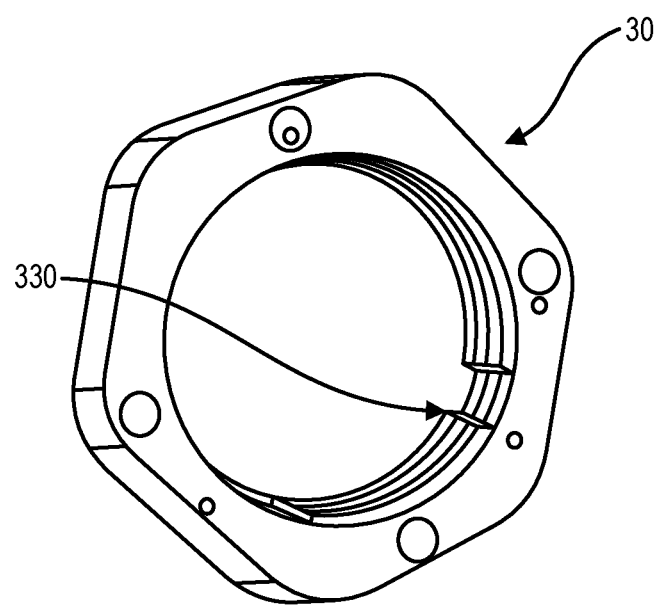
FIG. 3B is a perspective view of a washer according to an embodiment of the disclosed subject matter.

Referring to FIGS. 3A-B, in an embodiment of the disclosed subject matter, the first washer 30 comprises threads 330 disposed around the inner circumference of the first washer 30. The threads 330 configured to integrally thread onto the second set of threads 440 in order to secure the first washer 30 onto the gland body 40.

Referring to FIGS. 4A-E, in an embodiment of the disclosed subject matter, the gland body 40 is shown in various perspectives. FIG. 4C depicts a sealing connector 482 disposed within the tapered area 480 of the gland body 40. In an embodiment of the disclosed subject matter, the tapered area 480 comprises fingers 484 and finger-gaps 481 that allow the tapered area 480 of the gland body 40 to compress and expand. The fingers 484 are all spaced cylindrically and equal distance apart forming a portion of a cylinder or central bore 483. Thus, the fingers 484 all have substantially the same width 450, and the finger-gaps 481 also have substantially the same width. In the embodiment shown, the fingers 484 are connected to a peripheral edge 485 of the first set of threads 460 and extend away from the first set of threads along a central axis of the gland body 40 to their distal ends 486. The central bore 483 extends through the entire length of the gland body 40. The sealing connector 482 is disposed within the central bore 483 formed by the fingers 484 and the finger-gaps 481 and coats the circumference of the central bore 483. In one embodiment the sealing connector 482 is bonded around the inside circumference of the central bore 483 via 2-part injection mold and provides and environmental seal and protection against water, dust, potentially explosive, and/or potentially corrosive gases. The sealing connector 482 is composed of an elastomeric material configured to expand and compress while still maintaining its sealing capabilities. In an embodiment of disclosed subject matter, the sealing connector 482 is composed from a rubber material. The gland body 40, also has a release mechanism 420 disposed on the first set of threads 460 on the gland body 40. In an embodiment, the gland body 40 further comprises one or more grooves or notches 442 around the inside perimeter of the gland body 40, see FIG. 4D. In an embodiment, the grooves or notches 442 around the inside perimeter of the gland body 40 are formed from different shapes, depths, and widths. In another embodiment, the gland body 40 further comprises a thin ledge or shelf 446 wrapping around the inner circumference of the gland body 40.

Figure 5A:
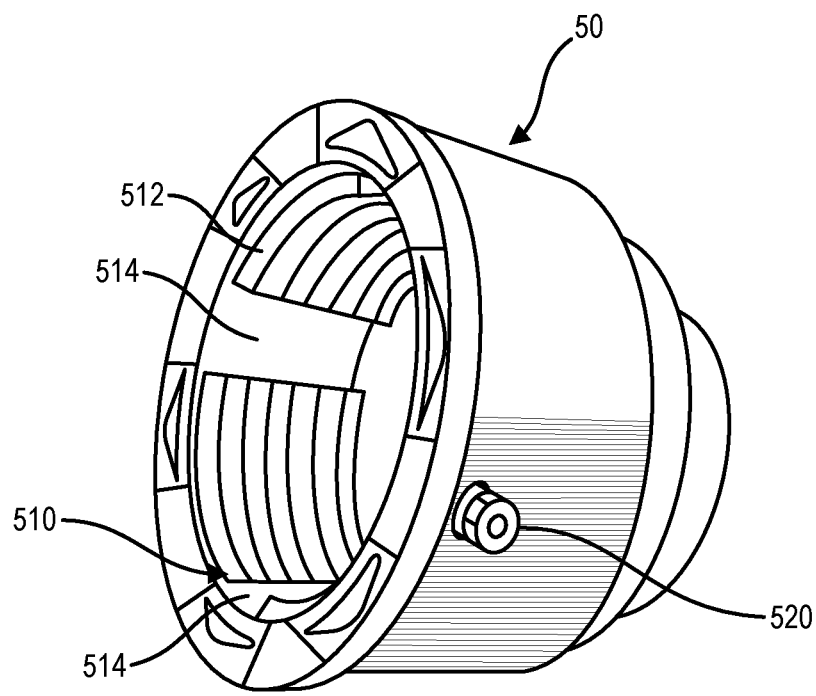
FIG. 5A is a perspective view of an outer housing according to an embodiment of the disclosed subject matter.
Figure 5B:
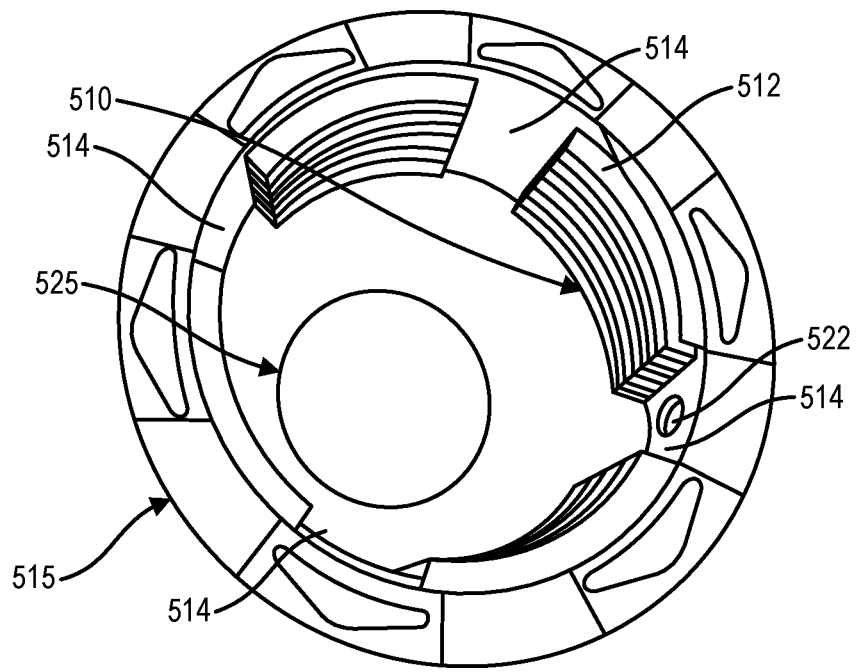
FIG. 5B is a perspective view of an outer housing according to an embodiment of the disclosed subject matter.

FIGS. 5A-B depicts the outer housing 50 that interacts with the gland body 40. The outer housing 50 is a cylindrical dome comprising apertures on each distal end of the outer housing 50. The compression opening end 515 has a circumference sized for receiving the tapered area 480 of the gland body 40. The cable connector opening end 525 has a smaller circumference than the compression opening end 515 for receiving a cable. The cable connector opening end 525 comprises a circumference that smaller than the widest circumference of the tapered area 480 on the gland body 40, thus preventing the tapered area 480 from completely passing through the cable connector opening end 525. In an embodiment, the interior surface of the outer housing 50 comprises a tightening mechanism 510. In an embodiment, the tightening mechanism 510 comprises a set of interior threads 512 for securing the outer housing 50 to the exterior of the first set of threads 460. In another embodiment, the tightening mechanism 510 comprises a set of slots 514 disposed along the interior surface of the outer housing 50 and perpendicular to the set of interior threads 512. In an embodiment of the disclosed subject matter, the set of slots 514 in the set of interior threads 512 serve to provide a clicking audible feature indicating tightening of the outer housing 50 around the fingers 484. In another embodiment of the disclosed subject matter, the set of slots 514 serve to resist loosening of the outer housing around the fingers 484. As the outer housing 50 is turned about the fingers 484, the distal edges of the set of interior threads 512 rotate and click around and into the finger-gaps 481. As the set of interior threads 512 are rotated about the first set of threads 460, the cable connector opening end 525 urges the fingers 484 closer together reducing the width of the finger-gaps 481, thereby reducing the inner diameter of the sealing connector 482.

In an embodiment, a cable may be centrally disposed within the sealing connector 482, whereby the sealing connector 482 compresses around the cable when the tightening mechanism 510 is secured to the first sets of threads 460. In another embodiment, the set of interior threads comprise helical threads. The outer housing 50 further comprises an alignment mechanism 520 for fixing the outer housing 50 to the gland body 40 or for notification that the outer housing 50 is properly aligned with and affixed to the gland body 40. In an embodiment, the alignment mechanism 520 comprises an aperture 522 extending through the outer housing 50. In an embodiment of the disclosed subject matter, the cable gland 100 further comprises an anti-short bushing 700, see FIGS. 8A and 8B.

Figure 6A:
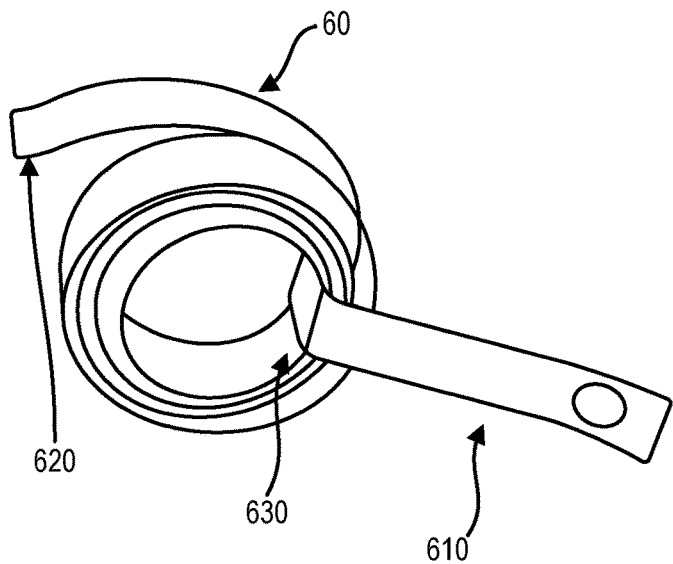
FIG. 6A is a perspective view of an adjustable earthing coil according to an embodiment of the disclosed subject matter.
Figure 6B:
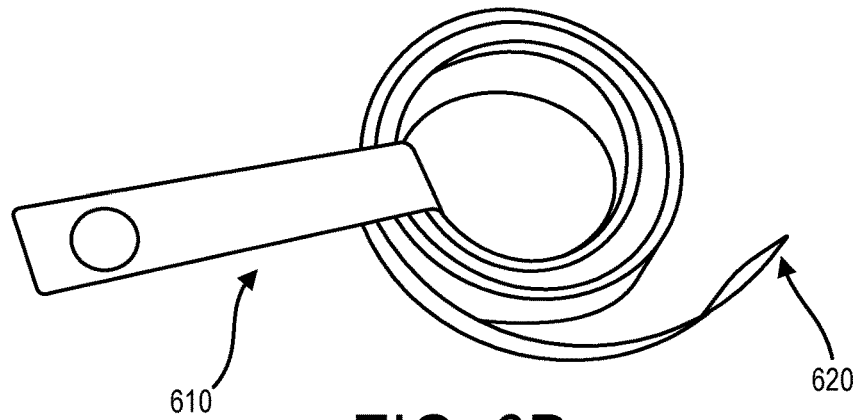
FIG. 6B is a perspective view of an adjustable earthing coil according to an embodiment of the disclosed subject matter.
Figure 6C:
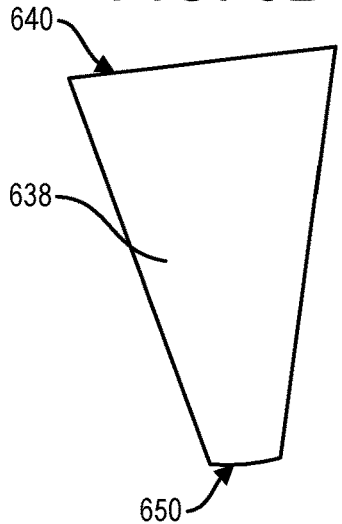
FIG. 6C is a side view of an adjustable earthing coil according to an embodiment of the disclosed subject matter.
Figure 7A:
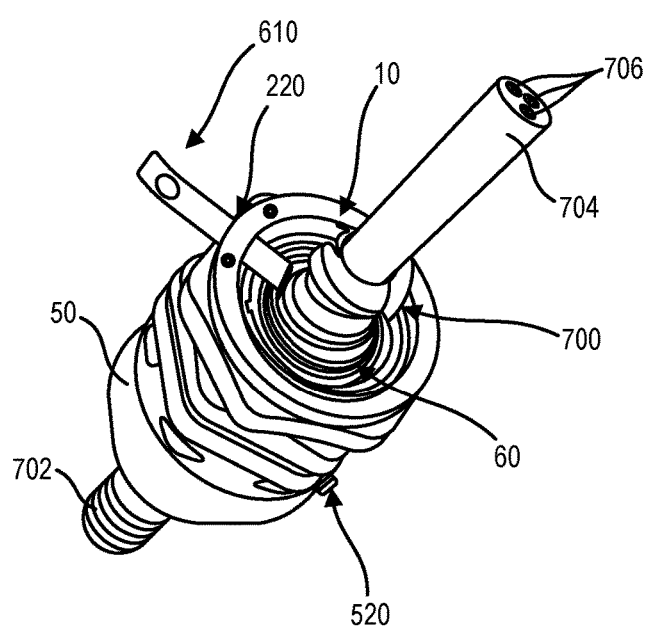
FIG. 7A is a perspective view of a cable gland with a cable wire running through it according to an embodiment of the disclosed subject matter.
Figure 7B:
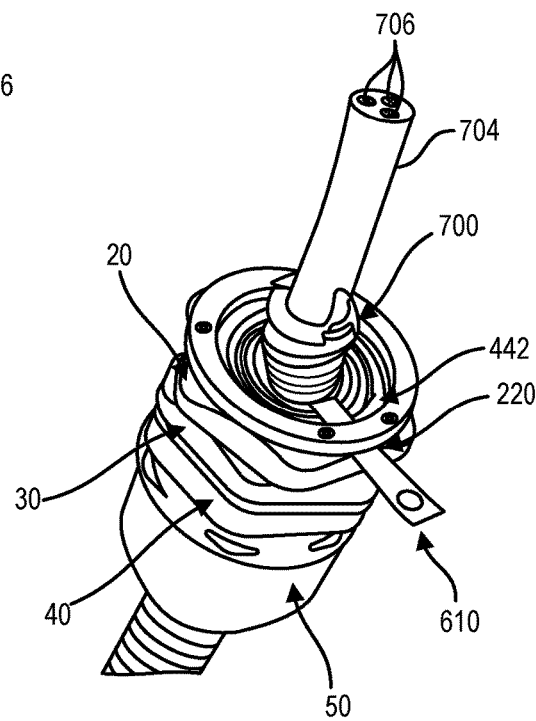
FIG. 7B is a perspective view of a cable gland with a cable wire running through it according to an embodiment of the disclosed subject matter.
Figure 7C:
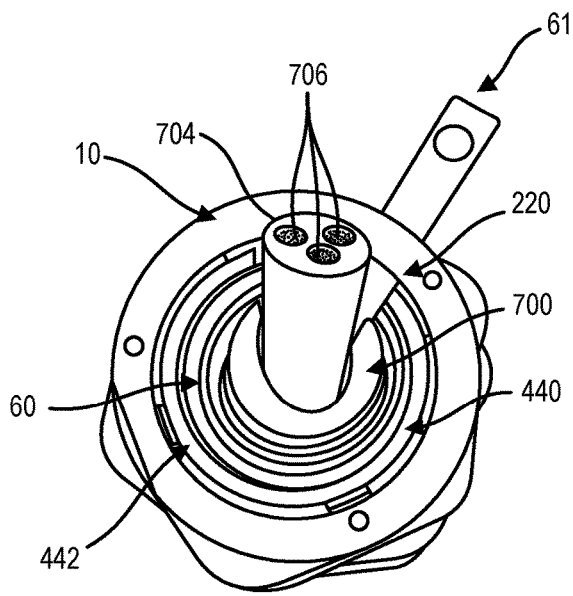
FIG. 7C is a perspective view of a cable gland with a cable wire running through it according to an embodiment of the disclosed subject matter.
Figure 7D:
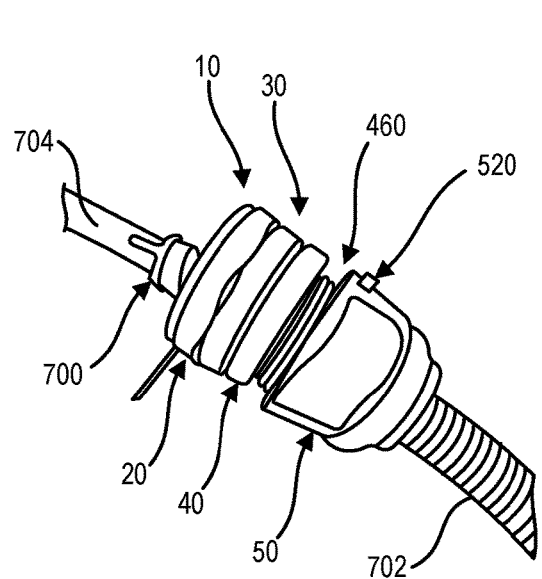
FIG. 7D is a side view of a cable gland with a cable wire running through it according to an embodiment of the disclosed subject matter.

FIGS. 6A and 6B depict an embodiment of an adjustable earthing coil 60 in a relaxed coiled form, while FIG. 6C depicts the adjustable earthing coil 60 in an expanded form. In another embodiment, the adjustable earthing coil 60 comprises a flat, tapered rectangular piece of material 638 having a first end 640 and a second end 650 opposite the first end 640, wherein the first end 640 is longer than the second end 650. The tapered rectangular piece of material 638 is configured to be coiled forming a flat curled ribbon. The first end 640 forms the inner layer of the adjustable earthing coil 60 while the second end 650 forms the outer layer of the adjustable earthing coil 60. A bend 620 is formed at one end of adjustable earthing coil 60 and bent in the opposite direction the coil is curled in, and an integrated tab 610 is attached to the adjustable earthing coil 60 at a connection point 630.

Referring to FIGS. 7A-D, in another embodiment of the disclosed subject matter, a cable gland is illustrated with plurality of wires 706 running through the cable gland. The plurality of wires 706 disposed within an insulated conduit 704. The insulated conduit 704 disposed within a metallic conduit 702; wherein the metallic conduit 702 provides physical protection of the plurality of wire 706. The metallic conduit 702 is secured to the gland body 40 through compression of the outer housing 50 by means of threading the outer housing 50 onto the first set of threads 460. The metallic conduit 702 is electrically connected to the adjustable earthing coil 60 by means of an anti-short bushing 700 disposed between the adjustable earthing coil 60 and the metallic conduit 702. The insulated conduit 704 extends outwardly and away from the anti-short bushing 700.

Figure 8A:
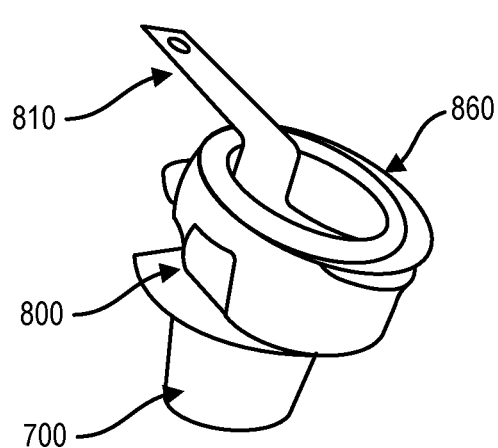
FIG. 8A is a perspective view of an earthing insert clamp according to an embodiment of the disclosed subject matter.
Figure 8B:
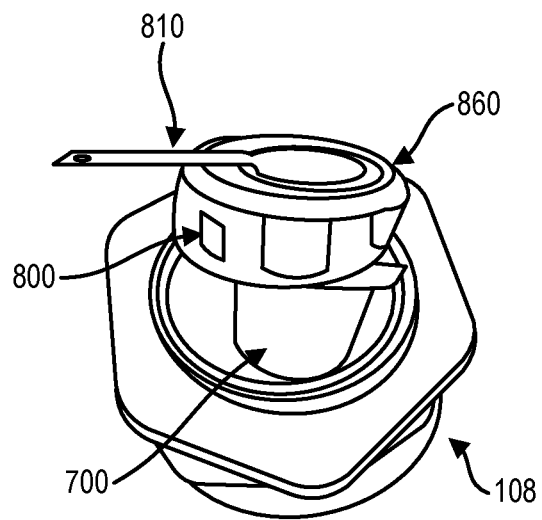
FIG. 8B is a perspective view of an earthing insert clamp according to an embodiment of the disclosed subject matter.
Figure 8C:
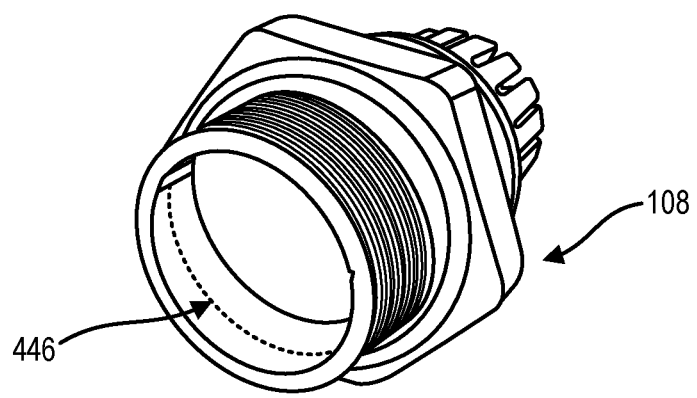
FIG. 8C is a perspective view of a gland body according to an embodiment of the disclosed subject matter.
Figure 9A:
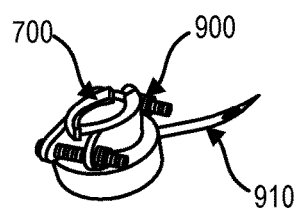
FIG. 9A is a perspective view of an adjustable earthing insert clamp according to an embodiment of the disclosed subject matter.
Figure 9B:
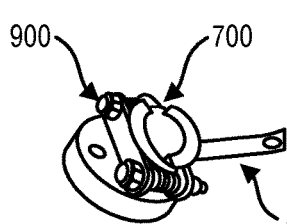
FIG. 9B is a perspective view of an adjustable earthing insert clamp according to an embodiment of the disclosed subject matter.
Figure 9C:
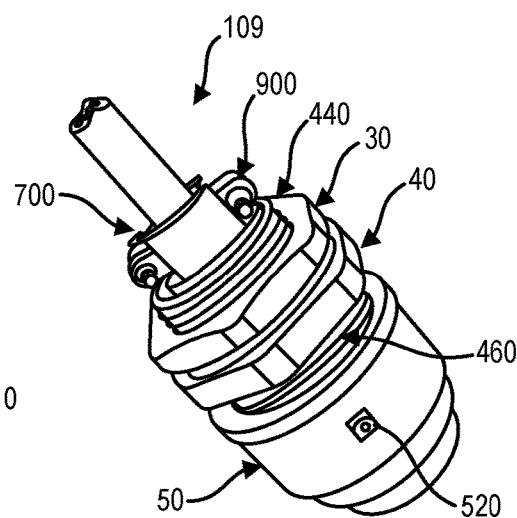
FIG. 9C is a perspective view of a cable gland with an adjustable earthing insert clamp inserted into the cable gland and a cable wire running through the cable gland according to an embodiment of the disclosed subject matter.
Figure 9D:
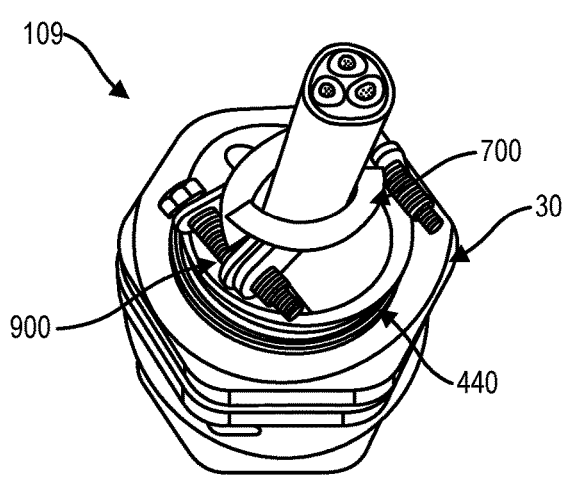
FIG. 9D is a perspective view of a cable gland with an adjustable earthing insert clamp inserted into the cable gland and a cable wire running through the cable gland according to an embodiment of the disclosed subject matter.
Figure 9E:
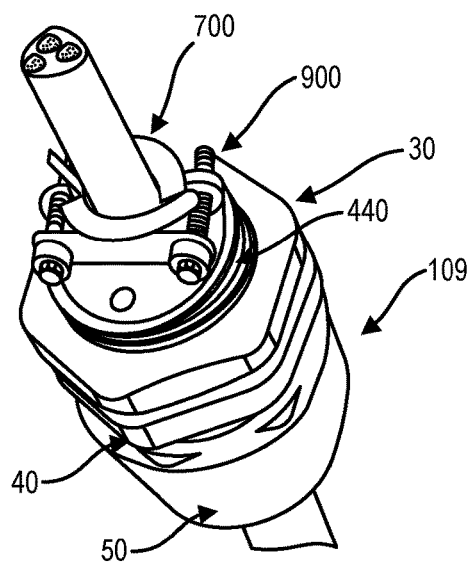
FIG. 9E is a perspective view of a cable gland with an adjustable earthing insert clamp inserted into the cable gland and a cable wire running through the cable gland according to an embodiment of the disclosed subject matter.
Figures 10A, 10B:
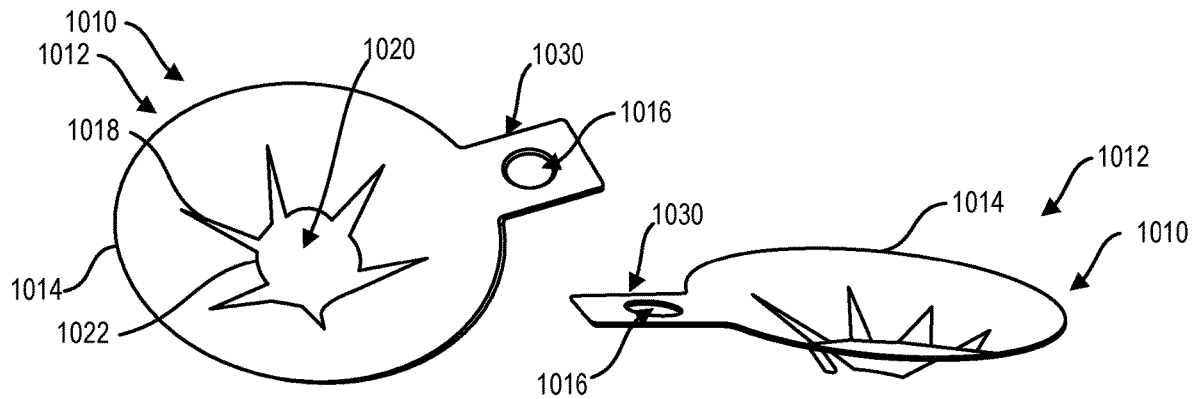
FIG. 10A is a perspective view of an adjustable earthing coil according to an embodiment of the disclosed subject matter.
FIG. 10B is a perspective view of an adjustable earthing coil according to an embodiment of the disclosed subject matter.
Figures 10C, 10D:
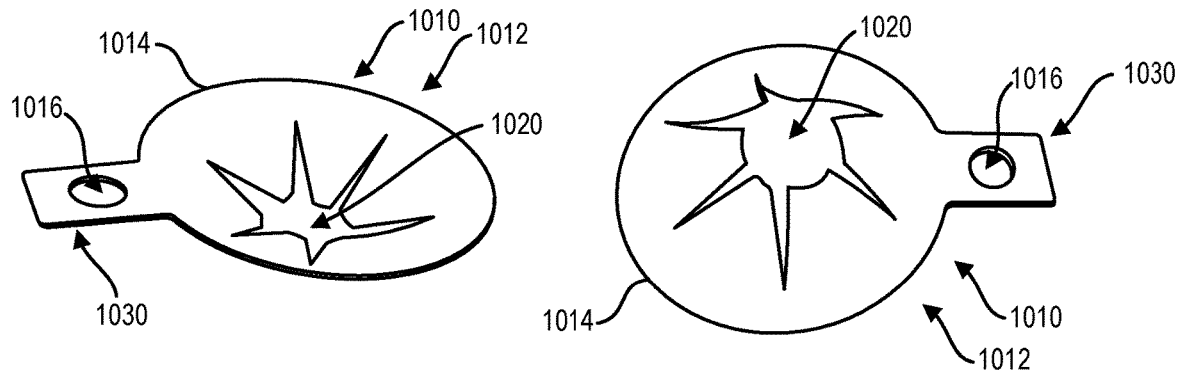
FIG. 10C is a perspective view of an adjustable earthing coil according to an embodiment of the disclosed subject matter.
FIG. 10D is a perspective view of an adjustable earthing coil according to an embodiment of the disclosed subject matter.
Figure 10E:
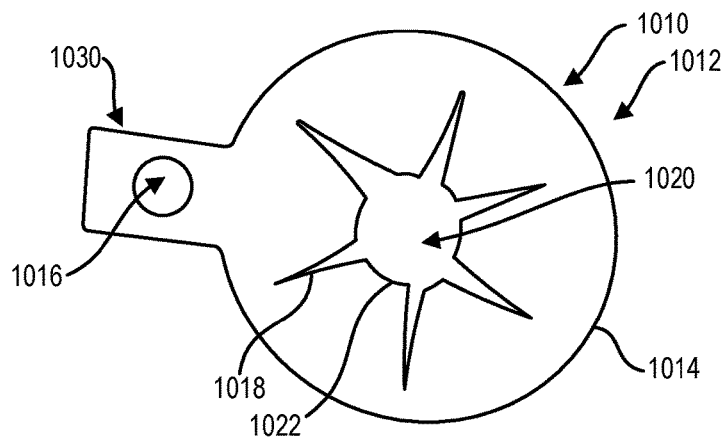
FIG. 10E is a perspective view of an adjustable earthing coil according to an embodiment of the disclosed subject matter.

Referring to FIGS. 8A-C, in another embodiment of the disclosed subject matter, an adjustable earthing insert 800 is used in the cable gland 108. The cable gland 108 is comprised of the first washer 30, the outer housing 50, the adjustable earthing insert 800, the gland body 40, and the anti-short bushing 700. In an embodiment of the disclosed subject matter, cable gland 108 further comprises a release mechanism 420 on the gland body 40, see FIG. 4C, and an alignment mechanism 520 on the outer housing 50, see FIG. 5A.

In an embodiment, the adjustable earthing insert 800 is comprised of a constant force spring 860 which is further comprises of a flat, rectangular piece of material that is wound in a circular shape along the inside perimeter of a cable clamp insert, each coil wrapping around the previous coil forming a flat curled ribbon. In an embodiment, the constant force spring 860 is mechanically attached to the cable clamp insert of the adjustable earthing insert 800. In another embodiment, the constant force spring 860 fits into a groove or opening in the cable clamp insert of the adjustable earthing insert 800 and is fixed into place. In another embodiment, an integrated tab 810 is attached to the constant force spring 860 at a connection point. In an embodiment, the integrated tab 810 is attached to the connection point via a mechanical, soldered, or adhesive connection.

Figure 16:
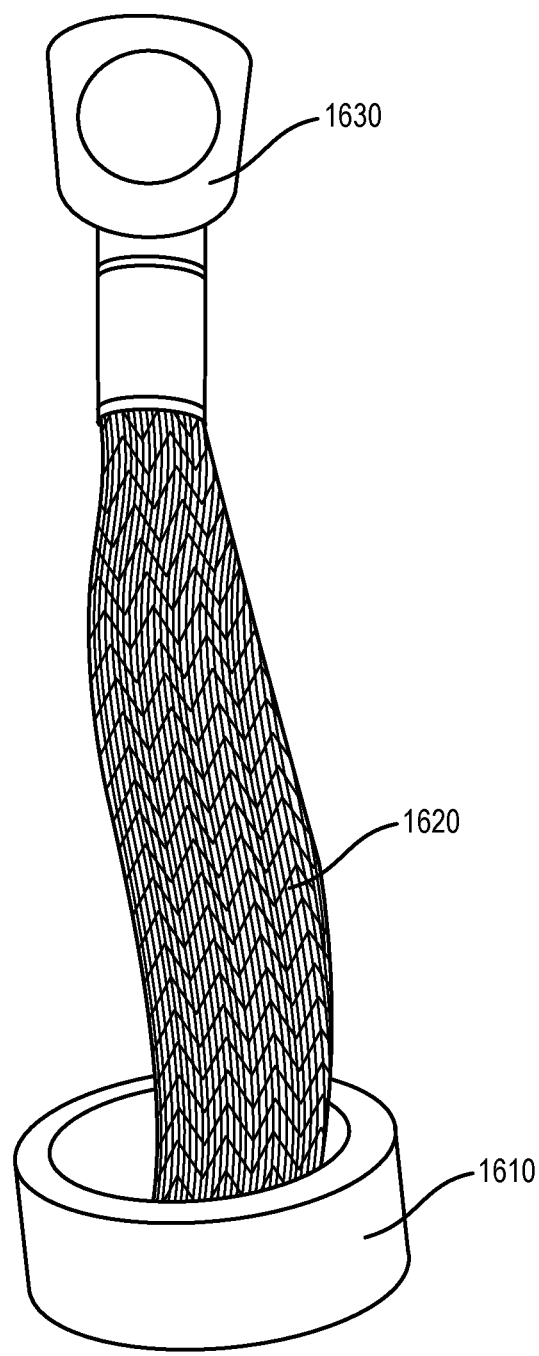
FIG. 16 is a perspective view of a constant force spring, an earthing strap, and an integrated tab according to an embodiment of the disclosed subject matter.

In yet another embodiment, an earthing strap 1620 is attached to the integrated tab 810. In an embodiment, the earthing strap 1620 is attached to the constant force spring 860, see FIG. 16. In an embodiment, a first end of the earthing strap 1620 is attached to the integrated tab (not pictured) at a connection point. In another embodiment, the first end of the earthing strap 1620 is attached to the constant force spring 860 at a connection point. In an embodiment the earthing strap 1620 is attached via a mechanical, soldered, or adhesive connection. In an embodiment, the earthing strap 1620 is an earthing braid or earthing cable and is made out of conductive metals. In another embodiment, an anti-short bushing 700 is also attached to the adjustable earthing insert 800. The anti-short bushing 700 is attached to the edge circumference of the constant force spring 860 that comes into contact with a cable that is threaded through the cable gland.

Referring to FIGS. 9A-E, in an embodiment of the disclosed subject matter, an adjustable earthing insert clamp 900 is illustrated as used in a cable gland 109. The cable gland 109 comprises: the first washer 30, the outer housing 50, the adjustable earthing insert clamp 900, the gland body 40, and the anti-short bushing 700. In an embodiment of the disclosed subject matter, cable gland 109 further comprises an release mechanism 420 on the gland body 40, see FIG. 4C, and an alignment mechanism 520 on the outer housing 50.

In an embodiment, the adjustable earthing insert clamp 900 further comprises an integrated tab 910 attached to the adjustable earthing insert clamp 900 at a connection point. In an embodiment, the integrated tab 910 is attached to the connection point via a mechanical, soldered, or adhesive connection point. In an embodiment, an earthing strap 1770 (shown in FIG. 17) is attached to the adjustable earthing insert clamp 900. In an embodiment, a first end of the earthing strap 1770 is attached to the integrated tab 910 at a connection point. In another embodiment, the first end of the earthing strap 1770 is attached to the adjustable earthing insert clamp 900 at a connection point. In an embodiment the earthing strap 1770 is attached via a mechanical, soldered, or adhesive connection. In an embodiment, the earthing strap 1770 is an earthing braid or earthing cable and is made out of conductive metals. In an embodiment, an anti-short bushing 700 is also attached to the adjustable earthing insert clamp 900 to the edge circumference of the adjustable earthing insert clamp 900 that comes into contact with a cable that is threaded through the cable gland 109.

Referring to FIGS. 10A-E, in another embodiment of the disclosed subject matter, an adjustable earthing member 1010 comprising: a disk-shaped body 1012 having a peripheral edge 1014; a tab 1030 connected to from the peripheral edge 1014, the tab 1030 extending outwardly and away from the peripheral edge 1014; a second aperture 1016 disposed through the tab 1030; a third aperture 1020 centrally disposed though the disk-shaped body 1012; a set of slots 1018 extending outwardly from the third aperture 1020 through the disk-shaped body 1012 forming a set of tabs 1022 evenly disposed around the third aperture 1020, wherein the set of tabs 1022 are configured to deform outwardly and away from the third aperture 1020.

Referring to FIGS. 11A-D, in another embodiment of the disclosed subject matter, an adjustable earthing member 1100 comprises: a body 1102 having a central axis A (shown in FIG. 11B), the body having a cylindrical shape; a set of flaps 1104 disposed around a first peripheral edge 1106 of the body 1102; the set of flaps 1104 configured to deform towards the central axis A; a grounding flap 1108 connected to the first peripheral edge 1106, the ground flap 1200 extending outwardly and away from the central axis A; a fourth aperture 1110 disposed through the grounding flap 1108. The body 1102, set of flaps 1104, and grounding flap 1108 may be constructed of a single piece of material.

Figure 12:
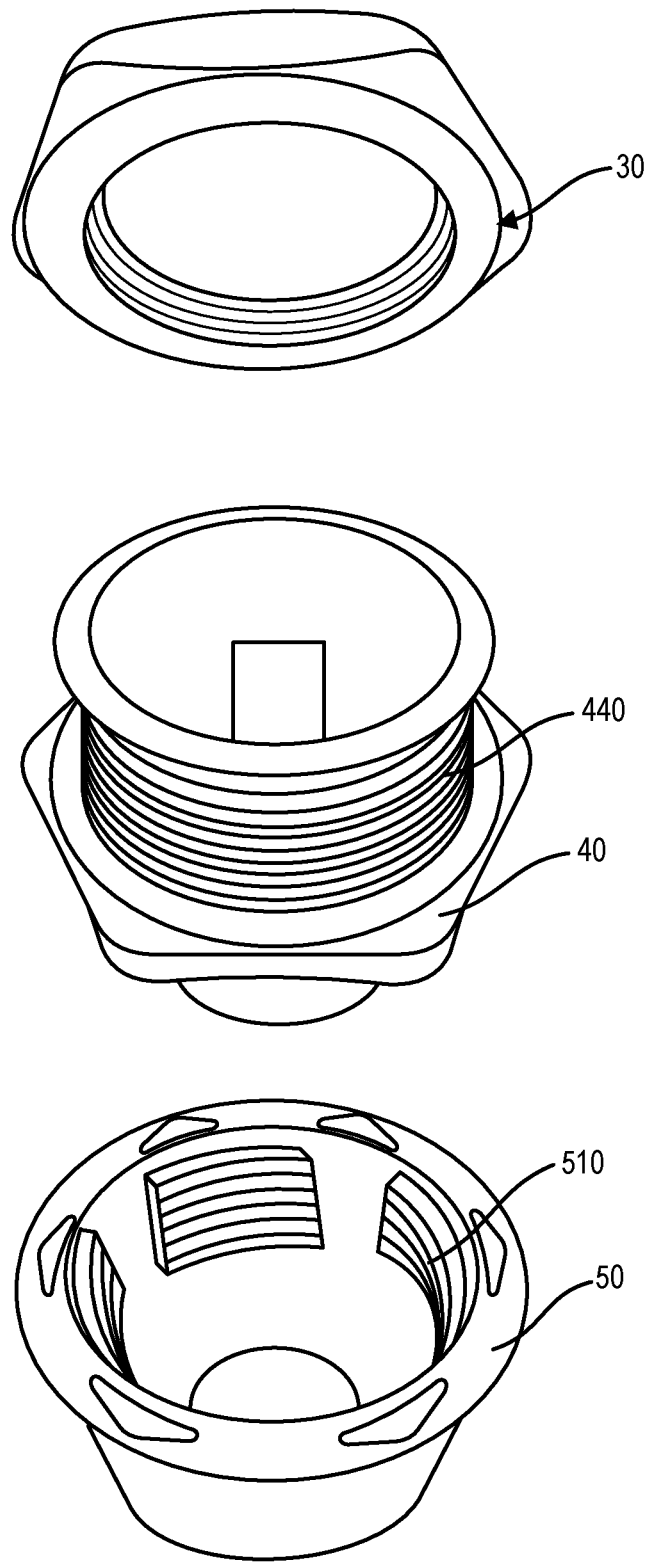
FIG. 12 is a view of an outer housing according to an embodiment of the disclosed subject matter.
Figure 13:
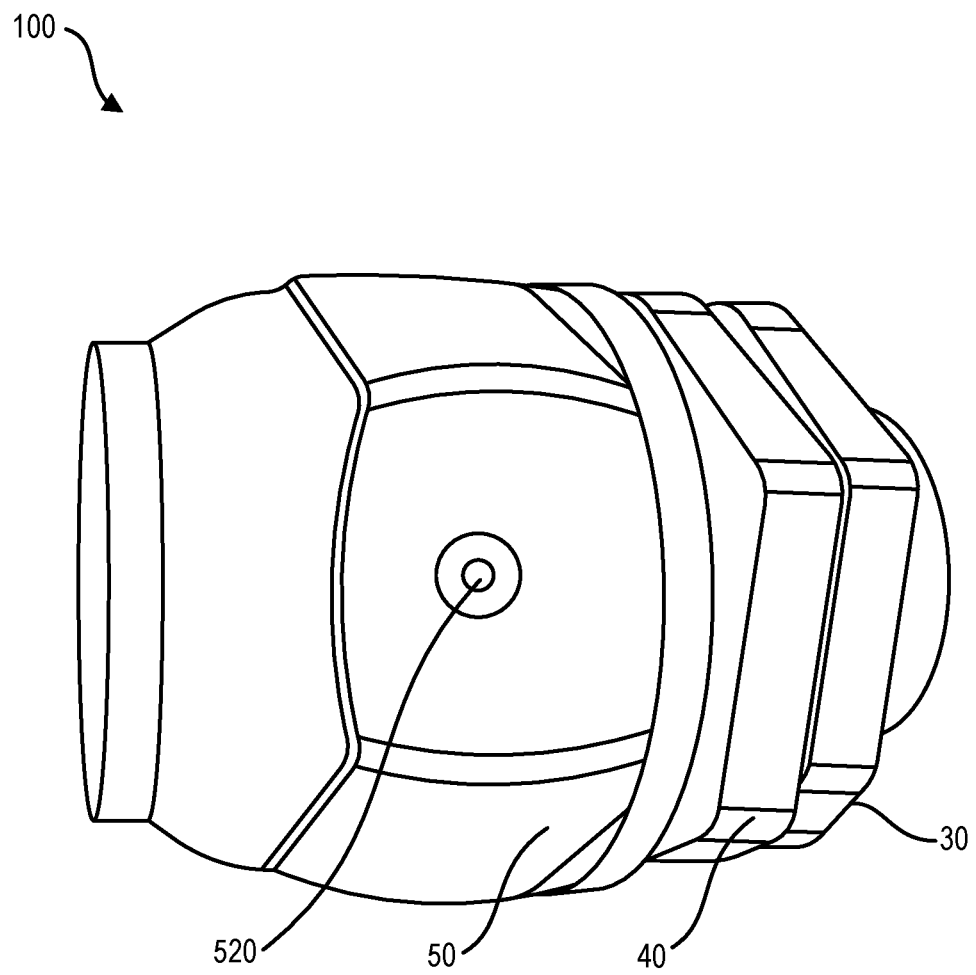
FIG. 13 is a perspective view of a cable gland according to an embodiment of the disclosed subject matter.
Figure 14A:
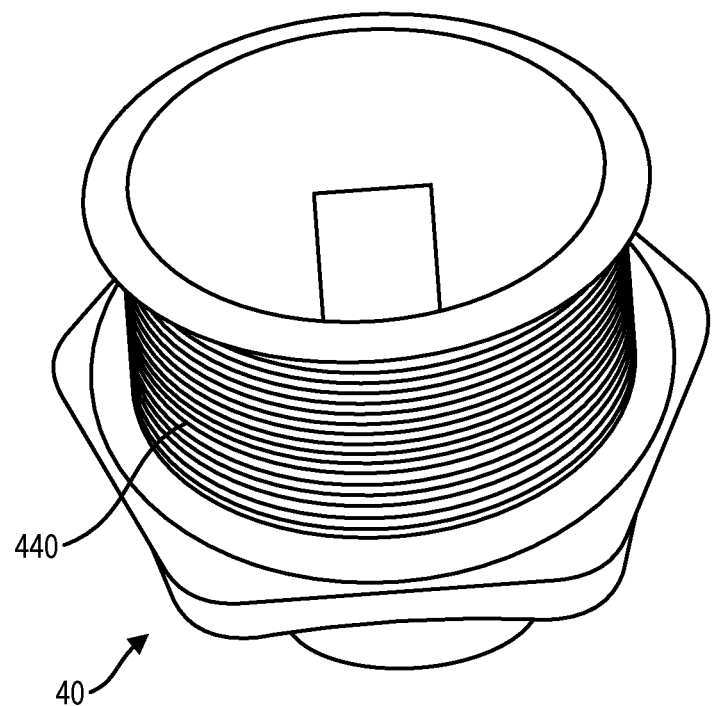
FIG. 14A is a perspective view of a gland body according to an embodiment of the disclosed subject matter.
Figure 14B:
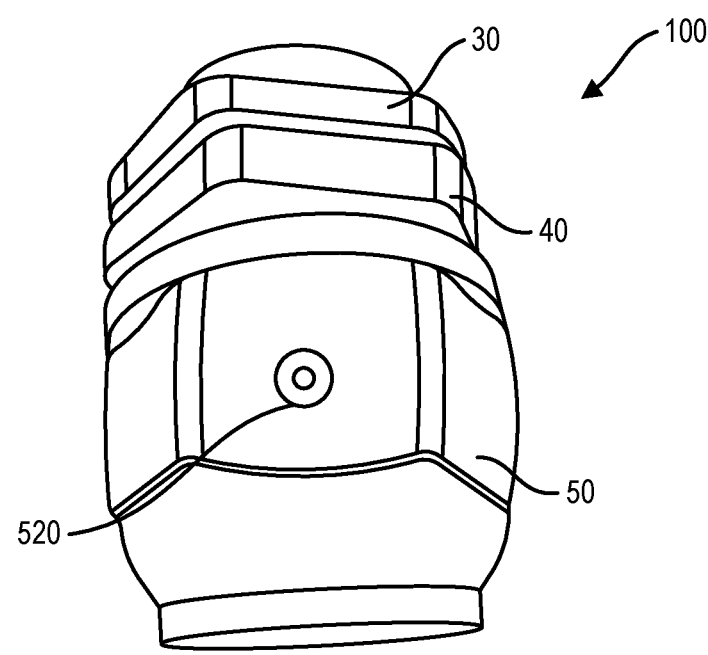
FIG. 14B is a perspective view of a cable gland according to an embodiment of the disclosed subject matter.

In an embodiment each set of flaps 1104 except one is folded approximately 45 degrees towards the central axis A, where one of set of flaps 1104 is folded outwards approximately 90 degrees in the opposite direction away from the central axis A, forming the grounding flap 1108. In another embodiment, each flap of the set of flaps 1104 except one is folded in the range of approximately 35 to 55 degrees towards the central axis A. In another embodiment, the grounding flap 1108 is folded outwardly approximately 80-100 degrees in the opposite direction of the central axis A Referring to FIG. 12, in another embodiment of the disclosed subject matter, the cable gland is shown in a disassembled state comprising a first washer 30; a gland body 40 having a second set of threads 440 disposed on the exterior of the gland body 40; wherein the first washer 30 is configured to thread onto the second set of threads 440; and an outer housing having an tightening mechanism 510; wherein the tightening mechanism 510 configured to secure the outer housing 50 to the gland body 40.

Referring to FIGS. 13, 14A-B, and 18 in another embodiment of the disclosed subject matter, In one embodiment of the disclosed subject matter, the cable gland 100 is assembled by connecting the outer housing 50 to the tapered area 480 of the gland body 40 and rotating or tightening the outer housing 50 around the first set of threads 460 on the gland body 40. The outer housing 50 is configured to compress the tapered area 480 of the gland body 40, allowing the sealing connector 482 inside the gland body 40, to tighten around a cable. In an embodiment of disclosed subject matter, the finger-gaps 481 compress or expand as the outer housing 50 is tightened or loosened about the gland body 40. The sealing connector 482 also compresses and expands as the finger-gaps 481, to which it is connected to, compresses or expands. In addition, the sealing connector 482 maintains its sealing capabilities as it compresses or expands. In another embodiment of the disclosed subject matter, the release mechanism 420 on the gland body 40 comprises a spring button. Once the outer housing 50 has been adjusted to a predetermined torque, the alignment mechanism 520 on the outer housing 50 will align with the release mechanism 420 on the gland body. The release mechanism 420 interacts with the alignment mechanism 520 on the outer housing 50 and changes from a depressed position to a raised position. The release mechanism 420 further aids in maintaining the outer housing's 50 location in relation to the gland body 40. In an embodiment, the raised position of the release mechanism 420 provides a visual indicator that the cable gland 100 has been tightened to a predetermined torque.

In another embodiment of, the release mechanism 420 on the gland body 40 comprises one or more apertures in the tapered area 480. The outer housing 50 also has one or more apertures. The outer housing 50 interacts with the gland body 40 and is torqued to a predetermined tightness; the one or more apertures in the outer housing 50 are configured to align with the one or more apertures in the gland body 40 and configured to receive at least one set screw. When the apertures align, at least one set screw is installed and holds the outer housing 50 and the gland body 40 together in place. In an embodiment, the at least one set screw serves as a visual indicator that the cable gland 100 has been sufficiently torqued and serves as a visual indicator that the assembly is complete. If a set screw is not properly engaged, the set screw will protrude and an installer can ascertain that the set screw has not been properly engaged or the cable gland 100 has not been sufficiently torqued.

In another embodiment, the at least one set screw will have a dip or a pain bubble on the threads to provide another visual indication as to whether or not the cable gland 100 has been sufficiently torqued. The threads of the at least one set screw is painted a bright color, and when sufficiently tightened, the threads would no longer be visible, thus providing a visual indicator that the cable gland 100 has been sufficiently torqued and the at least one set screw sufficiently tightened. In yet another embodiment, the at least one set screw is hollow with a paint bubble at the end of the threads.

Figure 15:
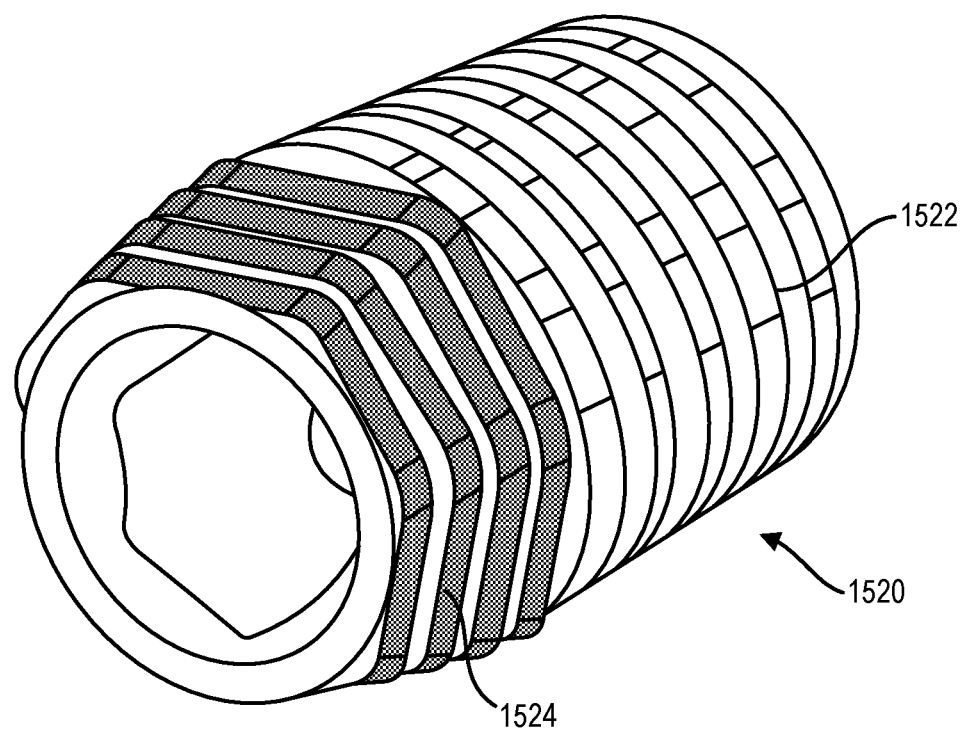
FIG. 15 is a perspective view of a gland body according to an embodiment of the disclosed subject matter.

Referring to FIG. 15, in another embodiment of the disclosed subject matter, the gland body 40 has an alternate method of visually indicating that the cable gland 100 has been sufficiently torqued. There is a colored length 1524 of threads 1522 of the cable body 1520 that is colored. This colored length 1524 corresponds to a minimum tightness that is needed to secure the cable gland 100 to a cable inserted in the cable gland 100. An installer would tighten the outer housing 50 past the colored length 1524. This would serve as a visual indicator that the cable gland 100 has been sufficiently tightened. These colored lengths will vary depending on the outside diameter of the cable.

After sufficiently tightening the cable gland 100 around a cable, the first washer 30 is connected to the gland body 40. In an embodiment, the first washer 30 has threads 330 around the inner circumference of the first washer 30, see FIG. 3A. To connect the first washer 30 to the gland body 40, the threads 330 of the first washer 30 interact with a second set of threads 440 located on the gland body 40. After the first washer 30 is connected to the gland body 40, the double-washer-sealant-combo 230 is connected to the gland body 40. In an embodiment, the double-washer-sealant-combo 230 has threads 240 around the inner circumference of the double-washer-sealant-combo 230, see FIG. 2A-B. To connect the double-washer-sealant-combo 230 to the gland body 40, threads 240 interact with the second set of threads 440 located on the gland body 40. Once the double-washer-sealant-combo 230 is connected to the gland body 40, the adjustable earthing coil 60 is inserted inside the double-washer-sealant-combo 230 and also inside the gland body 40. The adjustable earthing coil 60 is held in place by first inserting the integrated tab 610 of the adjustable earthing coil 60 into the first aperture 220 in the double-washer-sealant-combo 230, from the inside circumference of the double-washer-sealant-combo 230, through the double-washer-sealant-combo 230, and out, so that the integrated tab 610 protrudes out on the outside of the cable gland 100 while the remainder of the adjustable earthing coil 60 is held in place inside the cable gland 100, see FIGS. 7A-D. The adjustable earthing coil 60 is held in place secondly, when the bend 620 at the end of the coil lodges into the at least one or more grooves or notches 442 in the gland body as shown in FIG. 4D.

In an embodiment of the disclosed subject matter, the adjustable earthing coil 60 expands and contracts when the bend 620 at the end of the adjustable earthing coil 60 lodges into the at least one or more grooves or notches 442 in the gland body 40 as the double-washer-sealant-combo 230 is rotated around the second set of threads 440 on the gland body 40. The adjustable earthing coil 60 expands as force is applied rotating the double-washer-sealant-combo 230 around the second set of threads 440 on the gland body 40 in the direction opposite of the direction the adjustable earthing coil 60 is coiled. The adjustable earthing coil 60 automatically contracts once the force being applied rotating the double-washer-sealant-combo 230 is released. One that force is released, the adjustable earthing coil 60 immediately contracts and coils back up to its original tightness, snapping firmly around the cable armor, metal-cladding, or metal-sheathing to provide the connection for proper earthing or bonding, that is in the cable gland 100, rotating the double-washer-sealant-combo 230 back in the opposite direction the force was being applied. In an embodiment, an anti-short bushing 700 is connected to the cable to prevent the cable from cutting or shorting over time from repeated expanding or contracting of the adjustable earthing coil 60 or from repeated contact with edges of different parts of the cable gland 100. In an embodiment, the cable gland 100 is made up of a non-metallic material.

In an embodiment of the disclosed subject matter, the adjustable earthing coil 60 is a constant force spring. When the constant force spring is fully rolled up, the constant force spring is relaxed. When the constant force spring is unrolled, a restoring force is generated working to force the constant force spring back into its relaxed rolled up position.

In another embodiment of the disclosed subject matter, the first washer 30 is connected to the gland body 40, and then the adjustable earthing insert 800 is inserted into the gland body 40 of the cable gland 100. In an embodiment, the adjustable earthing insert 800 is held in place first by the firm fit and snap in of the adjustable earthing insert 800 into the gland body 40, and secondly by lodging into the ledge or shelf 446 in the inner circumference of the gland body as illustrated in FIG. 8C.

Referring to FIG. 8A, in an embodiment of the disclosed subject matter, the constant force spring 860 in the adjustable earthing insert 800 expands and contracts the constant force spring 860 as it is rotated around the inside of the adjustable earthing insert 800 and the gland body 40. More specifically the adjustable earthing insert 800 expands as force is applied rotating the constant force spring 860 around the inside of the gland body 40 in the direction opposite of the direction the constant force spring 860 or adjustable earthing coil 60 is coiled. The constant force spring 860 and adjustable earthing coil 60 are similar and can be referenced interchangeably. The constant force spring 860 automatically contracts once the force rotating it is released. One that force is released, the constant force spring immediately contracts and coils back up to its original tightness, snapping firmly around the cable that is in the cable gland 100. In an embodiment, the maximum force generated when the coil is completely rolled out remains constant no matter how many times the coil has been rolled and unrolled. In its relaxed state, the material's inner circumference coil rolls up to as small as the circumference the smallest available cable diameter. In another embodiment, the material's inner circumference coil rolls up to at least approximately 2-4 millimeters.

In an embodiment of the disclosed subject matter, the adjustable earthing coil 60 serves as the electrical connection point to a cable. The integrated tab 610 serves as a connection point between the adjustable earthing coil 60 and an earthing strap 1620, see FIG. 16. The earthing strap 1620 is attached to integrated tab 610 of the adjustable earthing coil 60 at a first end 1610 of the earthing strap 1620. The second end 1630 of the earthing strap 1620 is attached to an earthing or bonding point of an electrical equipment. In an embodiment, the earthing strap 1620 is attached to the adjustable earthing coil 60 via a mechanical, soldered, or adhesive connection point creating a single, integrated earthing and bonding device. In an embodiment, the earthing strap 1620 is a braided material or earthing braid or earthing cable and is made out of conductive metals. In an embodiment, the adjustable earthing coil 60 is a constant force spring. In another embodiment of the disclosed subject matter, the adjustable earthing coil 60 is configured to create a spiral cone upwards within the body of the cable gland 100, along the cable inserted in the cable gland 100. The spiral cone of the adjustable earthing coil 60 forms a cone or a sleeve. The sleeve is configured to receive sealant. Alternatively, an independent sleeve is used to receive a sealant. The purpose of the cone or sleeve is to hold the sealant and to inhibit the potential migration of flammable gases or liquids into and through the interior of the cable to an area that has exposed electrical arcing, mitigating a potential explosion. In an embodiment, the sealant is an epoxy, resin, putty, or a different type of sealant.

Figure 17:
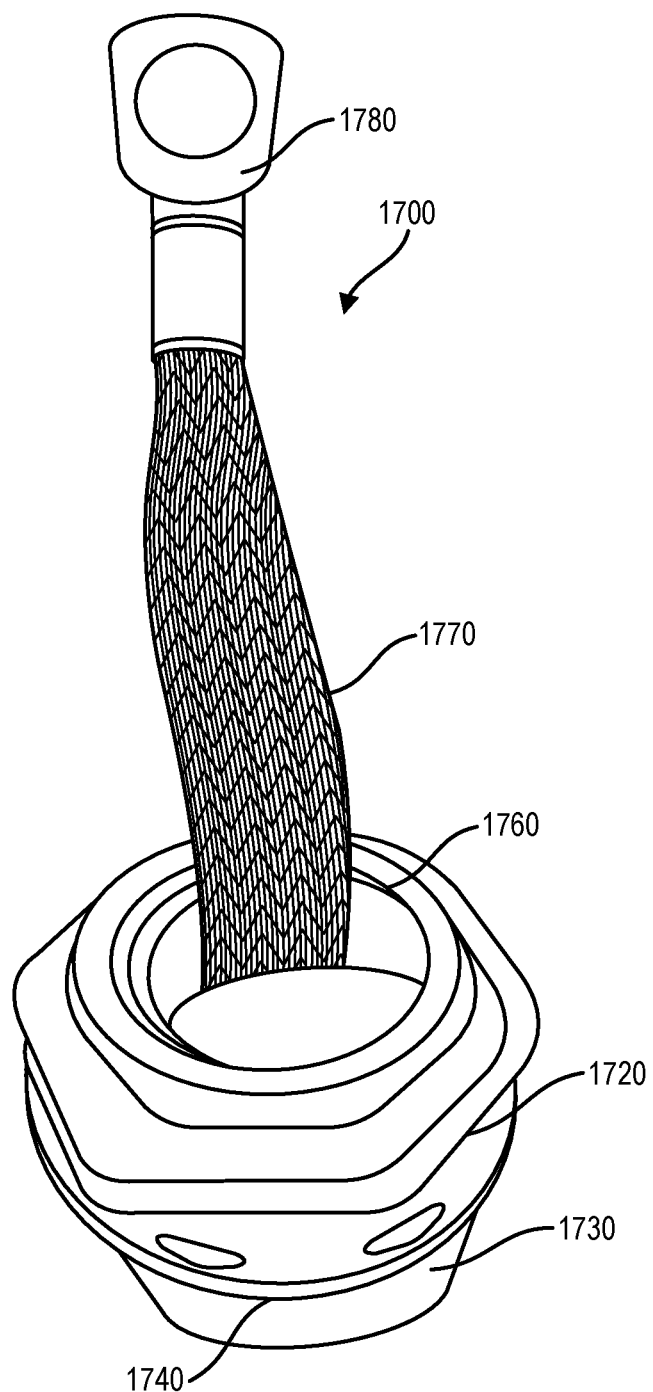
FIG. 17 is a perspective view of a cable gland as it is used with the constant force spring according to an embodiment of the disclosed subject matter.
Figure 18:
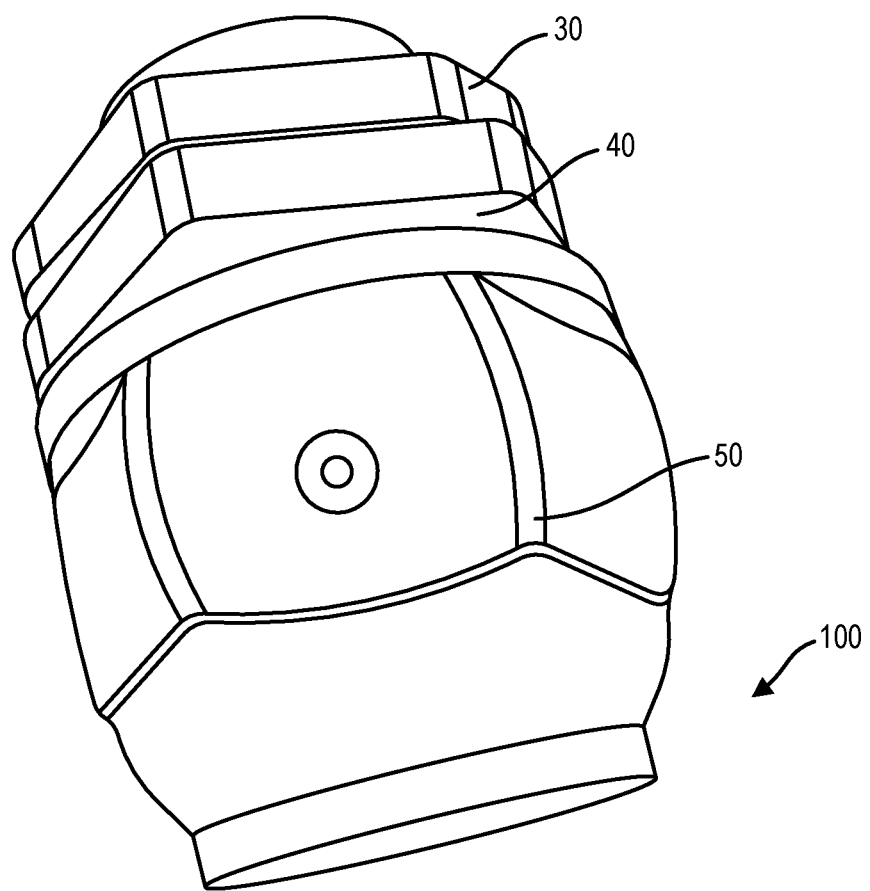
FIG. 18 is a perspective view of a cable gland according to an embodiment of the disclosed subject matter.

FIG. 17 shows a cable gland 1700 in an embodiment of the disclosed subject matter. The earthing strap 1770 has a first end that is attached to the integrated tab (not pictured) of the adjustable earthing coil 1760 that is fitted inside the gland body 1720, and a second end 1780 that will be attached to the earthing or bonding point of an electrical equipment. In an embodiment of the disclosed subject matter, the adjustable earthing coil 1760 extends along the cable inserted in the cable gland 1700, and forms a cone or a sleeve. The sleeve is configured to receive epoxy or a different type of sealant. Alternatively, an independent sleeve is used to receive a sealant.

In an embodiment of the disclosed subject matter, a method for grounding a cable passing through the cable gland 100 that is comprised of a washer sealant 10, a second washer 20, a first washer 30, an adjustable earthing coil 60, an outer housing 50, a gland body 40; wherein the gland body 40 comprises a sealing connector 482 disposed in the gland body 40, a tapered area 480 to be received in the outer housing 50, and a first set of threads 460 adjacent to the tapered area on the gland body; wherein the outer housing 50 has one or more apertures 220; comprises the steps of:
1) inserting the adjustable earthing coil 60 in one end of the cable gland 100, allowing an integrated tab 610 attached to the adjustable earthing coil 60 to protrude out of the cable gland 100;
2) opening cable receiving apertures at each end of the cable gland 100;
3) expanding the adjustable earthing coil 60 to a circumference wide enough to receive a cable;
4) inserting the cable through a first aperture in the cable gland 100, threading the cable through the cable gland 100, and out of a second aperture in the cable gland 100;
5) tightening the cable receiving aperture that is opposite of the end where the adjustable earthing coil 60 was inserted, tight enough to hold and secure the cable gland 100 in place on the cable;
6) inserting an anti-short bushing 700 around the cable in the area that will interact with the adjustable earthing coil 60;
7) contracting the adjustable earthing coil 60 inside the cable gland 100 so that it tightens around the cable in the area on the cable that is exposed for grounding; and
8) connecting the adjustable earthing coil 60 to a grounding element outside of the cable gland 100.

In an embodiment of the disclosed subject matter, the method of expanding the adjustable earthing coil 60 comprises lodging the end of the adjustable earthing coil 60 into at least one or more grooves or notches 442 in the gland body 40 of the cable gland 100 and rotating the cable gland in the direction opposite of the direction the adjustable earthing coil is curled in.

In an embodiment of the disclosed subject matter, the method of tightening the end of the cable gland 100 that is opposite to where the adjustable earthing coil 60 is inserted comprises rotating the outer housing 50 of the cable gland 100 around the first set of threads 460.

In an embodiment of the disclosed subject matter, the method of contracting the adjustable earthing coil 60 comprises lodging the end of the adjustable earthing coil 60 into the at least one or more grooves or notches 442 in the gland body 40 of the cable gland 100 and releasing and pressure being applied to the adjustable earthing coil 60 that is forcing it to rotate in the direction opposite of the direction the adjustable earthing coil 60 is curled in. In another embodiment one or more grooves or notches 442 are in the gland body 40. In another embodiment the grooves are comprised of different shapes, depths, and widths.

In another embodiment, the method of contracting the adjustable earthing coil 60 comprises lodging the end of the adjustable earthing coil 60 into the at least one or more grooves or notches 442 in the gland body 40 of the cable gland 100 and rotating second washer 20 around the second set of threads 440 on the cable gland 100, in the same direction that the adjustable earthing coil 60 is curled in.

In another embodiment of the disclosed subject matter, the method of connecting the adjustable earthing coil 60 to a grounding element outside the cable gland 100 comprises attaching a first end of an earthing strap 1620 to an integrated tab 610 that is attached to the adjustable earthing coil 60, and attaching the second end of the earthing strap 1620 to an earthing point outside the cable gland 100.

In another embodiment of the disclosed subject matter, the method of connecting the adjustable earthing coil 60 to a grounding element outside the cable gland 100 comprises attaching the first end of an earthing strap 1620 to the adjustable earthing coil 60 via a mechanical, soldered, or adhesive connection point creating a single, integrated earthing and bonding device, and attaching the second end of the earthing strap 1620 to an earthing point outside the cable gland 100.

Figure 19A:
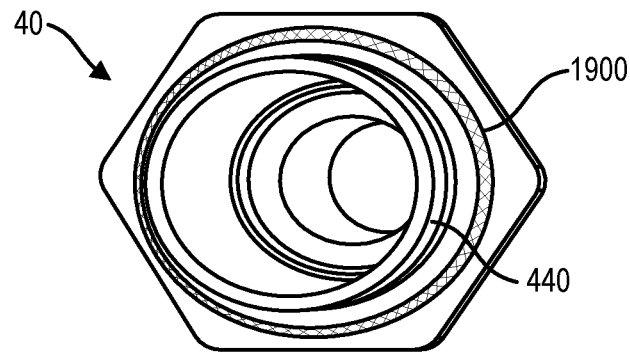
FIG. 19A is a perspective view of a gland body according to an embodiment of the disclosed subject matter.
Figure 19B:
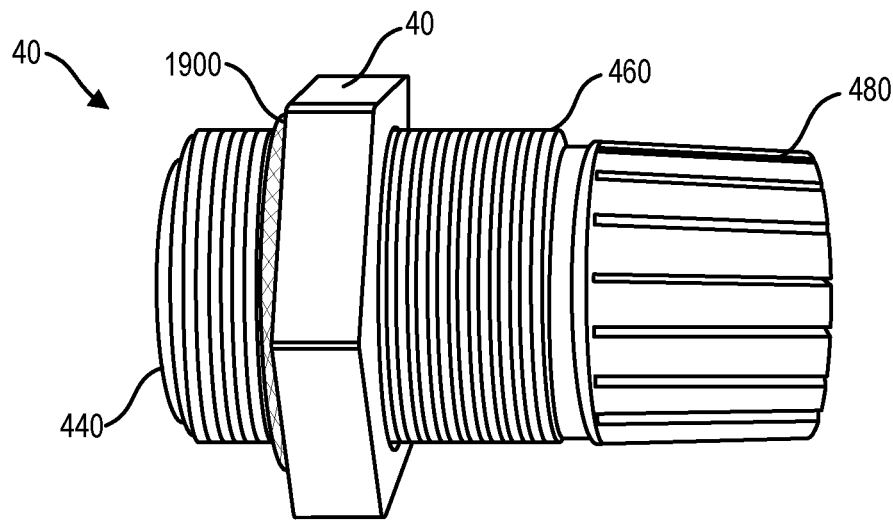
FIG. 19B is a side perspective view of a gland body according to an embodiment of the disclosed subject matter.
Figure 19C:
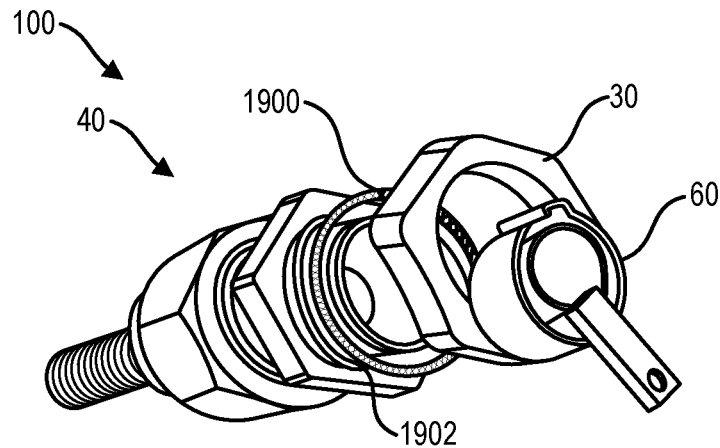
FIG. 19C is an exploded view of a cable gland according to an embodiment of the disclosed subject matter.

FIGS. 19A-C illustrate perspective views of another embodiment of disclosed subject matter. The gland body 40 further comprises a component ring 1900 disposed within a circular groove 1902 in the gland body 40. The component ring 1900 may be constructed of elastomeric material, such as rubber. The component ring 1900 is configured to provide an air-tight seal between gland body 40 and first washer 30 when first washer 30 is threaded onto the second set of threads 440. The first washer 30 configured to compresses and hold a body (e.g., an electrical enclosure, not shown) between the first washer 30 and component ring 1900 forming the air-tight seal.

In an embodiment of disclosed subject matter, the component ring 1900 is an o-ring configured to fit securely around the base of the second set of threads 440 within the circular groove 1902. In an embodiment, the inner diameter of the component ring 1900 is greater the outside diameter of the second set of threads 440. In an embodiment, the diameter of the component ring 1900 is approximately 0.06 to 0.07 inches.

FIG. 19C depicts a partially disassembled view of the cable gland 100 according to an embodiment of the disclosed subject matter. The component ring 1900 is disposed around the second set of threads 440, followed by the first washer 30 disposed upon the second set of threads 440.

Figure 20:
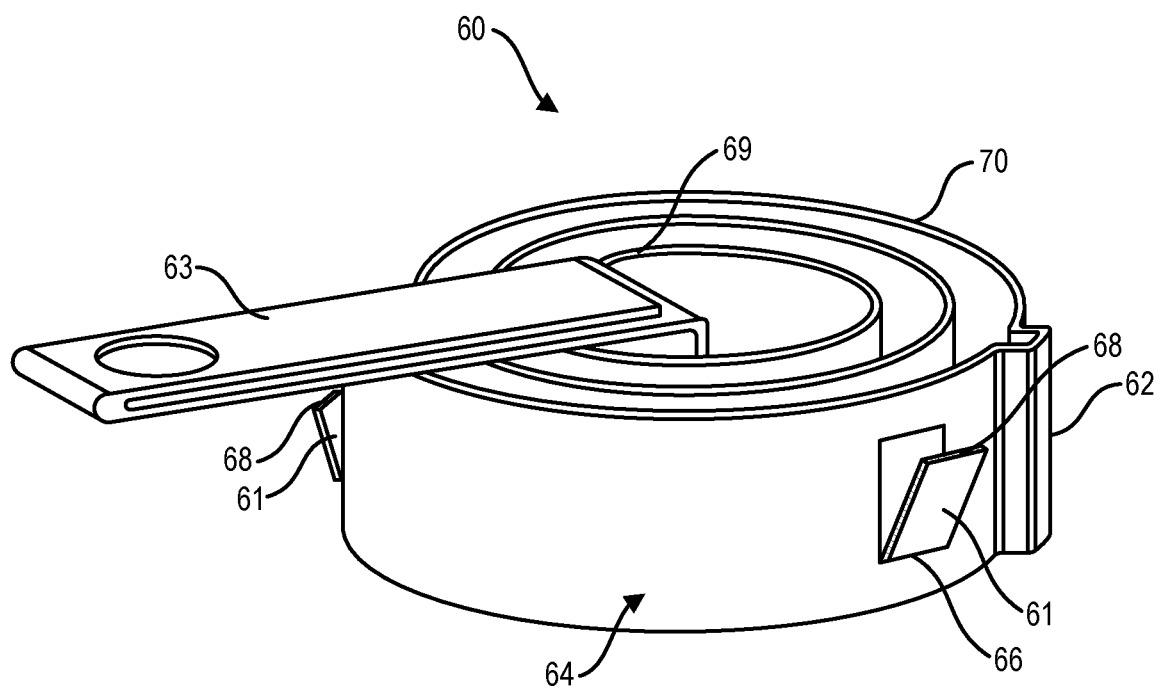
FIG. 20 is a perspective view of an adjustable earthing coil according to an embodiment of disclosed subject matter.

Referring to FIG. 20, in an embodiment of the disclosed subject matter, an adjustable earthing coil 60 comprises a set of tabs 61 extending away from an exterior surface 64 of the adjustable earthing coil 60. The coil further comprises a top edge 70 and an oppositely disposed bottom edge 72. The set of tabs 61 configured to axially restrain the adjustable earthing coil 60 within the gland body 40 by engaging a set of distal edges 68 of the set of tabs 61 with a ledge or shelf 446 (shown in FIGS. 21A-B) disposed along the interior of the gland body 40. The set of tabs 61 of the adjustable earthing coil 60 extend outwardly and towards the top edge 70 of the adjustable earthing coil 60. The set of tabs 61 extend outwardly from the exterior surface 64 along a set of edges 66. The adjustable earthing coil 60 further comprises an adjustable earthing insert seat 62 having a bent or a protruding portion on the exterior surface 64. In an embodiment of the disclosed subject matter, the adjustable earthing coil 60 further comprises an earthing insert handle 63. The earthing insert handle 63 is comprised of the same material as the adjustable earthing coil 60 and connects to an interior spiral 69 of the adjustable earthing coil 60. In an embodiment of the disclosed subject matter, the earthing insert handle 63 is approximately 0.02 inches thick. In addition, the adjustable earthing coil 60 is coiled at an approximately 0.52 radian. The adjustable earthing insert seat 62 is approximately 0.099 inches wide and extends out from the adjustable earthing coil 60 at a radius of approximately about 0.57 inches from the center of the adjustable earthing coil 60.

Figure 21A:
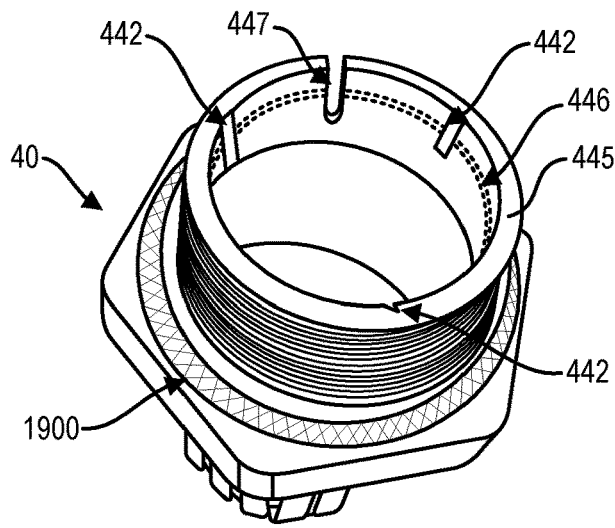
FIG. 21A is a perspective view of a gland body according to an embodiment of the disclosed subject matter.
Figure 21B:
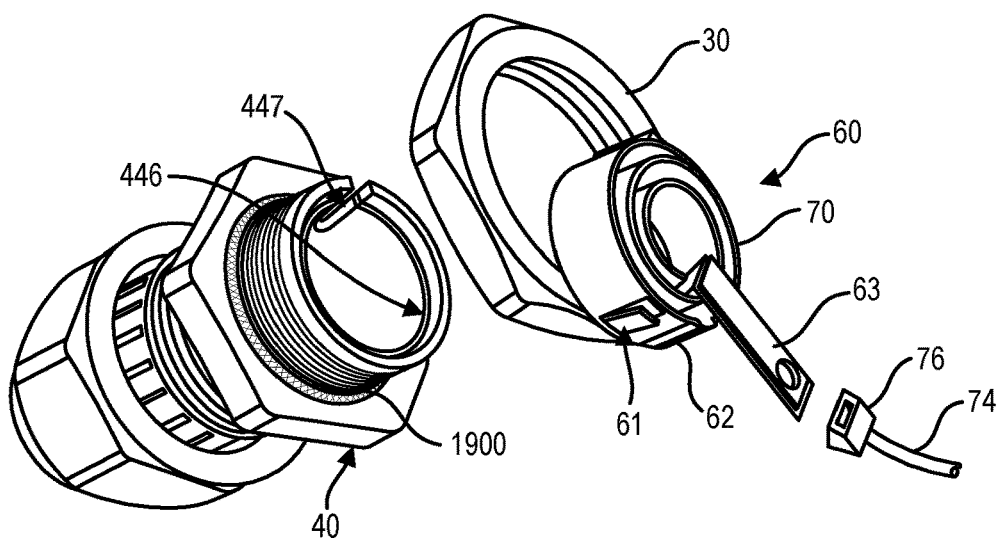
FIG. 21B is an exploded view of a cable gland according to an embodiment of the disclosed subject matter.
Figure 21C:
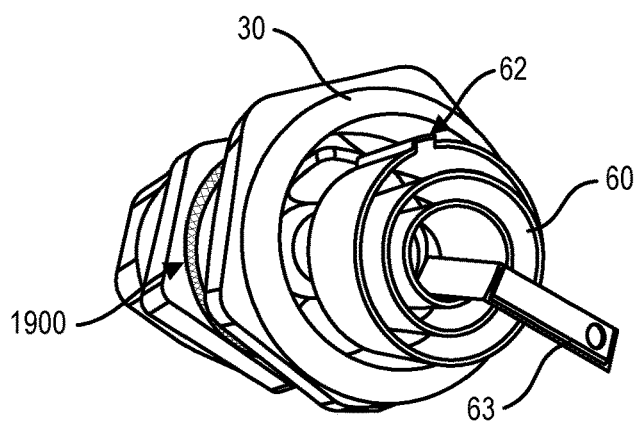
FIG. 21C is an exploded view of a cable gland according to an embodiment of the disclosed subject matter.

Referring to FIGS. 21A-C, in an embodiment of the disclosed subject matter, the adjustable earthing coil 60 is configured to be inserted into and restrained inside the gland body 40 by engaging the set of tabs 61 within the ledge or shelf 446. The earthing insert handle 63 is configured to extend outwardly and away from the gland body 40. The set of tabs 61 of the adjustable earthing coil 60 extend outwardly and towards the top edge 70 of the adjustable earthing coil 60. The adjustable earthing coil 60 is pressed into the gland body 40 until the set of tabs 61 engage the inner ringed ledge or shelf 446. In an embodiment of the disclosed subject matter, a grounding wire 74 is electrically connected to the earthing insert handle 63 via a connecting mechanism 76.

Referring to FIG. 21B, in an embodiment of the disclosed subject matter, the gland body 40 comprises a slot 447 extending from a peripheral edge 445 of the gland body 40, the slot 447 disposed parallel to the central axis of the gland body 40. The slot 447 is approximately perpendicular to the ledge or shelf 446. Once the adjustable earthing coil 60 is inserted into the gland body 40, the adjustable earthing coil 60 is rotated until the adjustable earthing insert seat 62 engages the slot 447. The engagement of the adjustable earthing insert seat 62 into the slot 447 radially secures the adjustable earthing coil 60 into a fixed position and prevents radial slippage between the adjustable earthing coil 60 and gland body 40.

Figure 22:
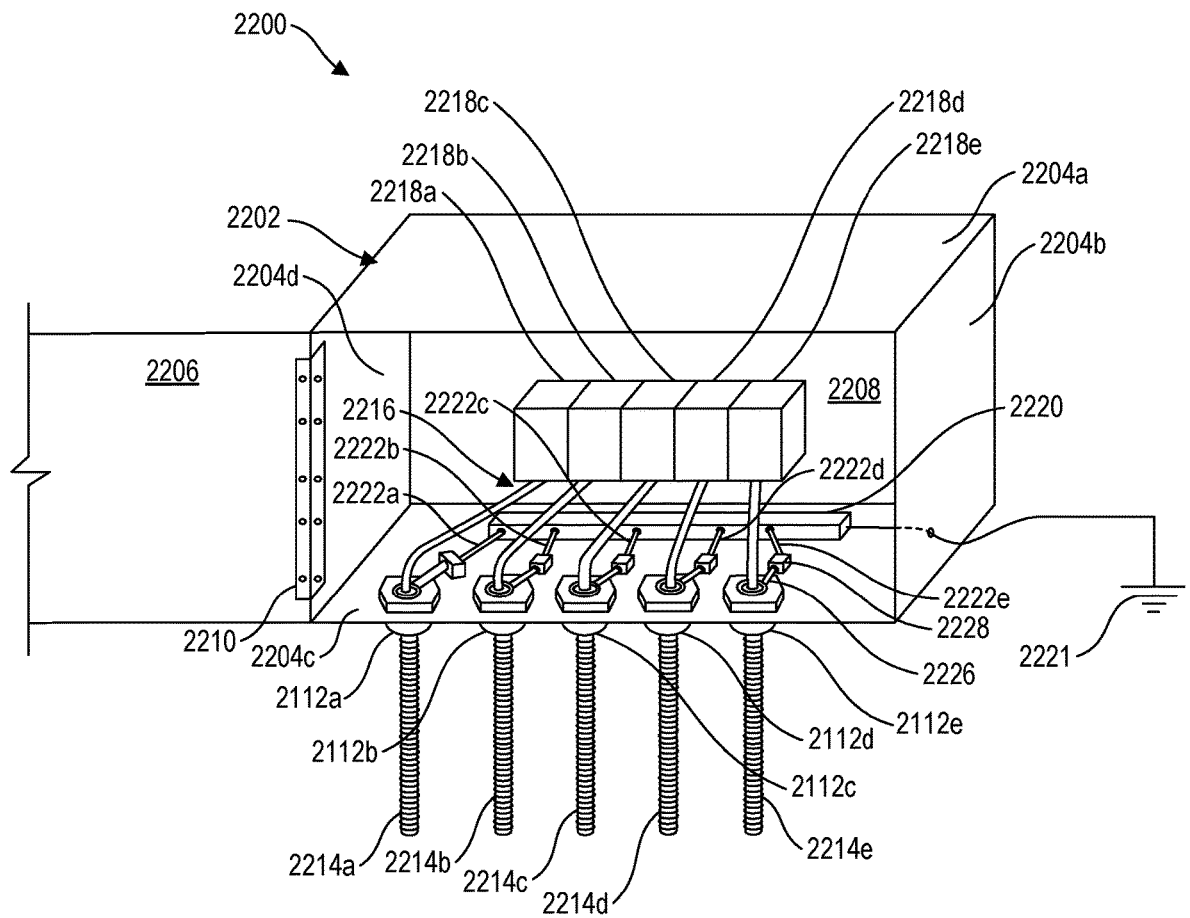
FIG. 22 is a perspective view of a cable box system comprising a cable gland according to an embodiment of the disclosed subject matter.

FIG. 22 illustrates an electrical earthing system 2200 comprising: An electrical enclosure 2202, the electrical enclosure 2202 comprising a set of side walls 2204*a-d*, a front wall 2206 rotatably connected to at least one of the set of side walls 2204*a-d*, a back wall 2208 connected to the set of side walls 2204*a-d* opposite the front wall 2206, and a hinge piece 2210 configured to rotatably connect the front wall 2206 at least one of the set of side walls 2204*a-d*. The electrical earthing system 2200 further comprises a set of cable glands 2212*a-e* connected to at least one of the set of side walls 2204*a-d*, the set of cable glands comprising a set of adjustable earthing coils 2224 and a set of tabs 2226; wherein the set of tabs 2226 are connected to and extend away from the set of adjustable earthing coils 2224. The electrical earthing system 2200 further comprises a set of cables 2214*a-e* sealably connected to the set of cable glands 2212*a-e*; a set of wires 2116 internal to the set of cables 2214*a-e*, the set of wires 2216 terminating at a set of terminal blocks 2218*a-e*. The electrical earthing system 2200 further comprising a grounding system 2220 internal to the electrical enclosure and connected to a ground terminal 2221, the grounding system 2220 comprising a set of grounding wires 2222*a-e* electrically connected to the ground terminal 2221; wherein the set of grounding wires 2222*a-e* are connected to the set of tabs via a connection mechanism 2228. The set of cables 2214 may further comprise a set of metallic jackets (not shown); wherein the set of metallic jackets provide mechanical protection to the set of wires external to the electrical enclosure 2202. The set of metallic jackets are electrically bonded to the grounding system 2220 by electrically connecting or bonding the set of metallic jackets to the set of adjustable earthing coils 2224.

Figure 23:
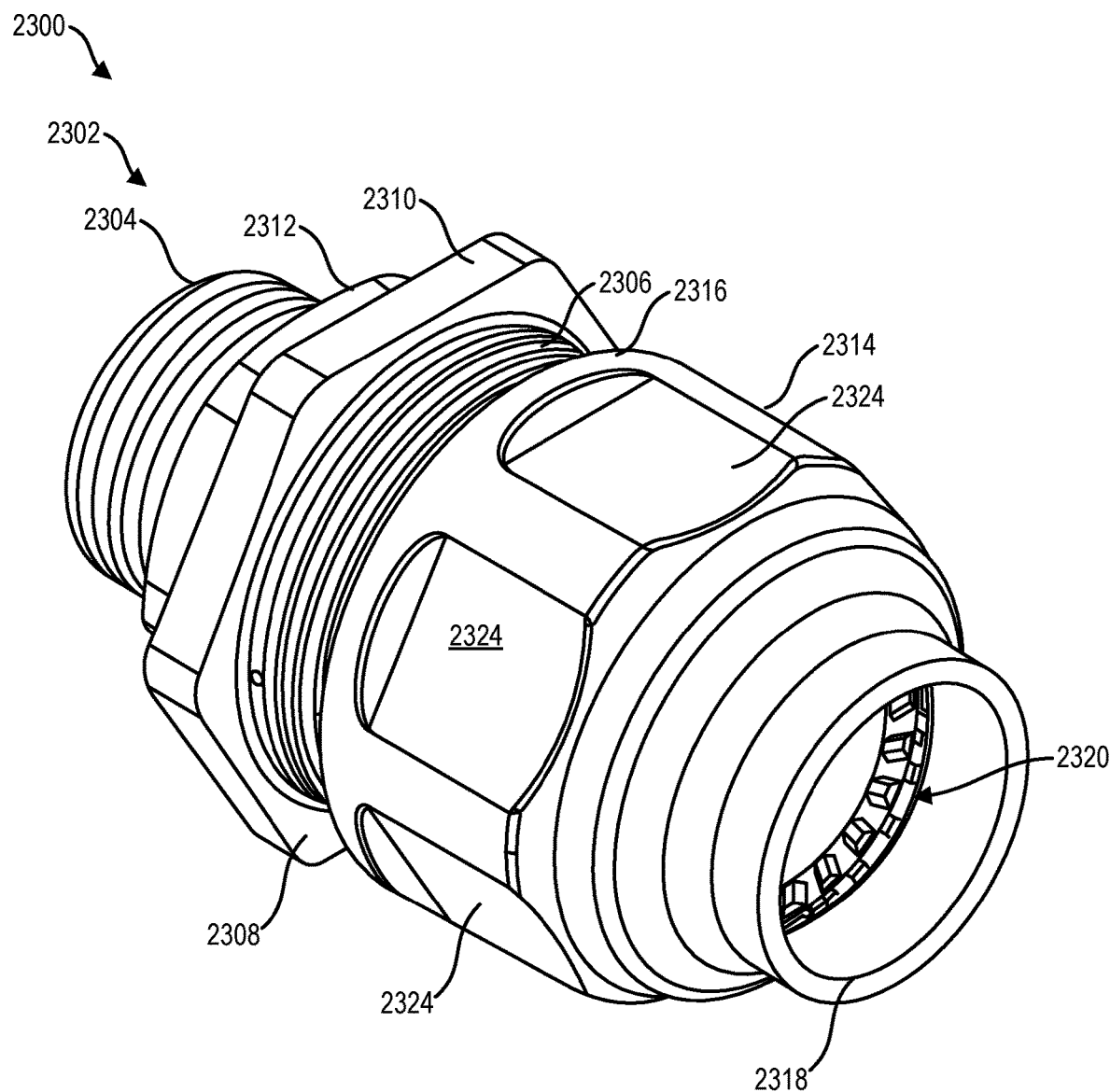
FIG. 23 is a perspective view of a cable gland according to an embodiment of the disclosed subject matter.
Figure 24:
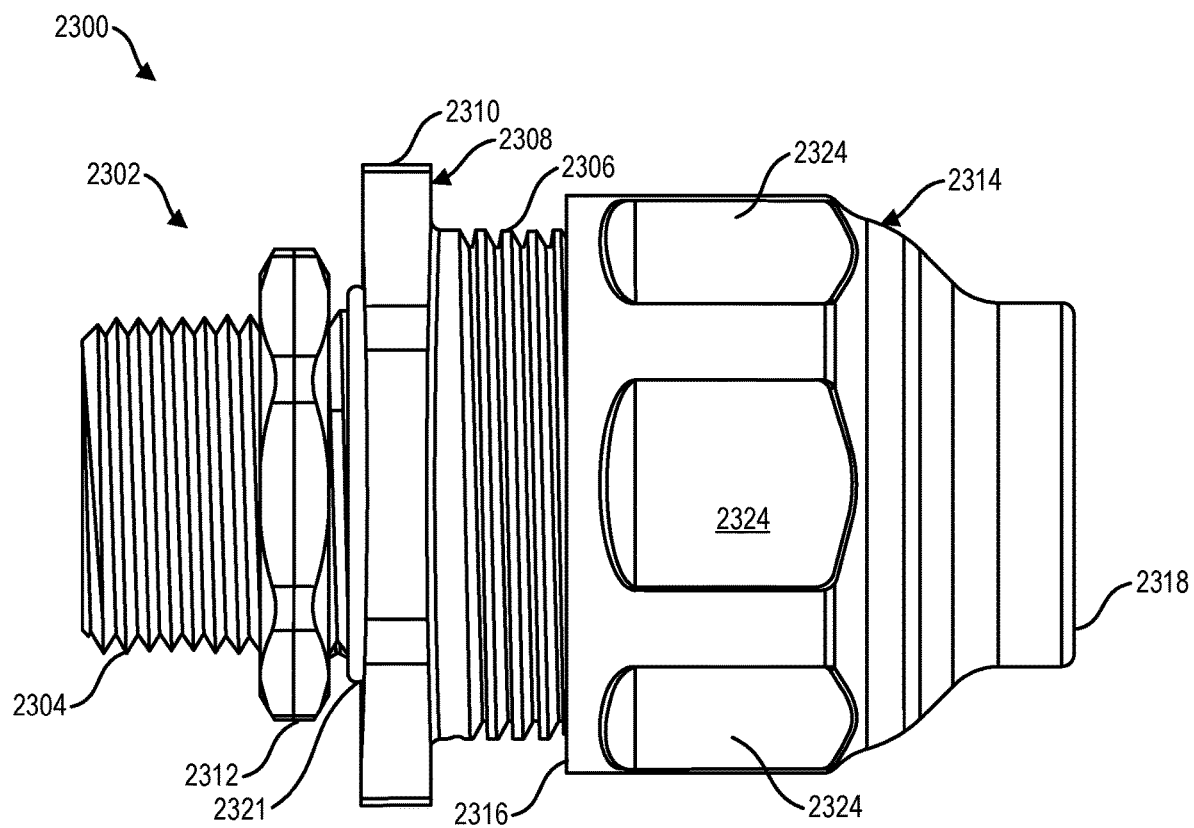
FIG. 24 is a side view of a cable gland according to an embodiment of the disclosed subject matter.
Figure 25:
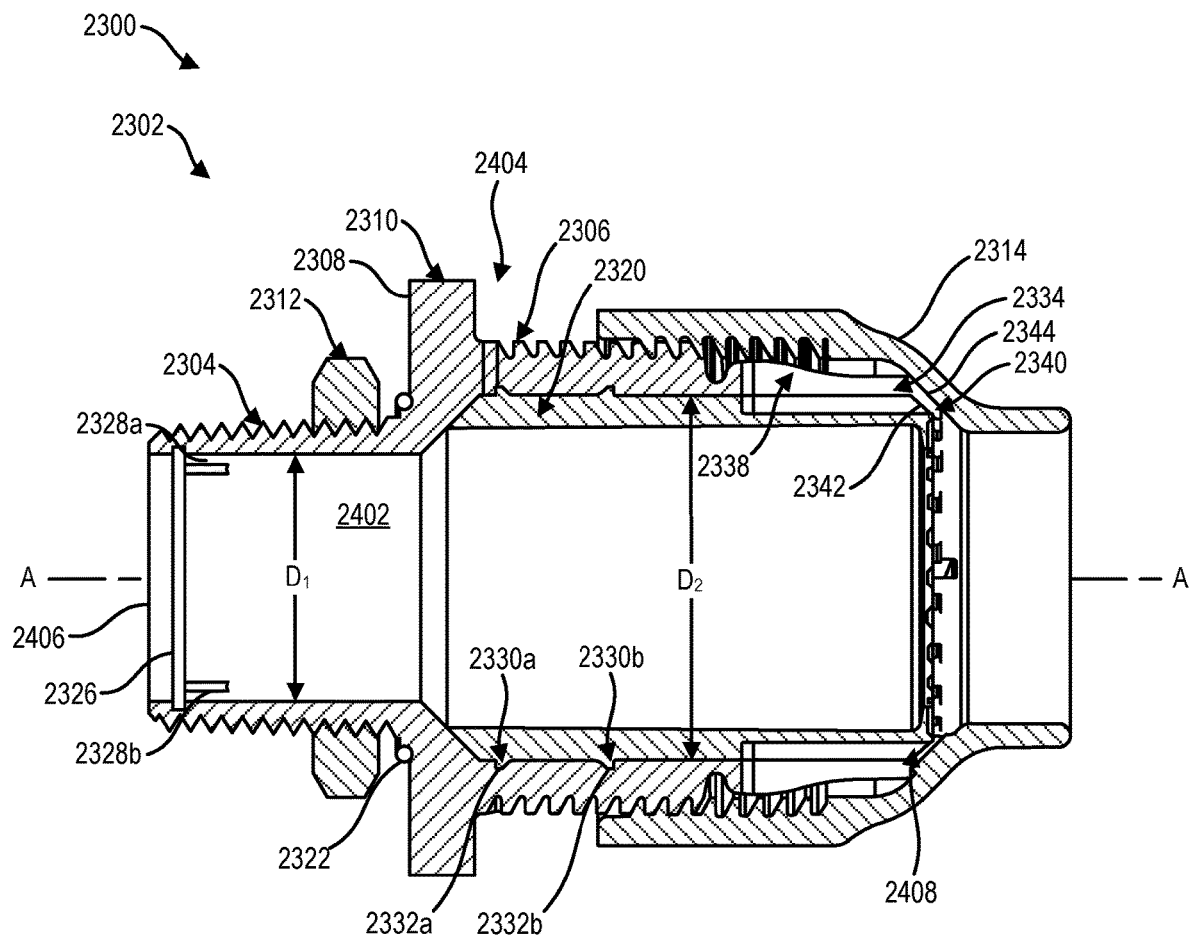
FIG. 25 is a sectional view of a cable gland according to an embodiment of the disclosed subject matter.
Figure 26:
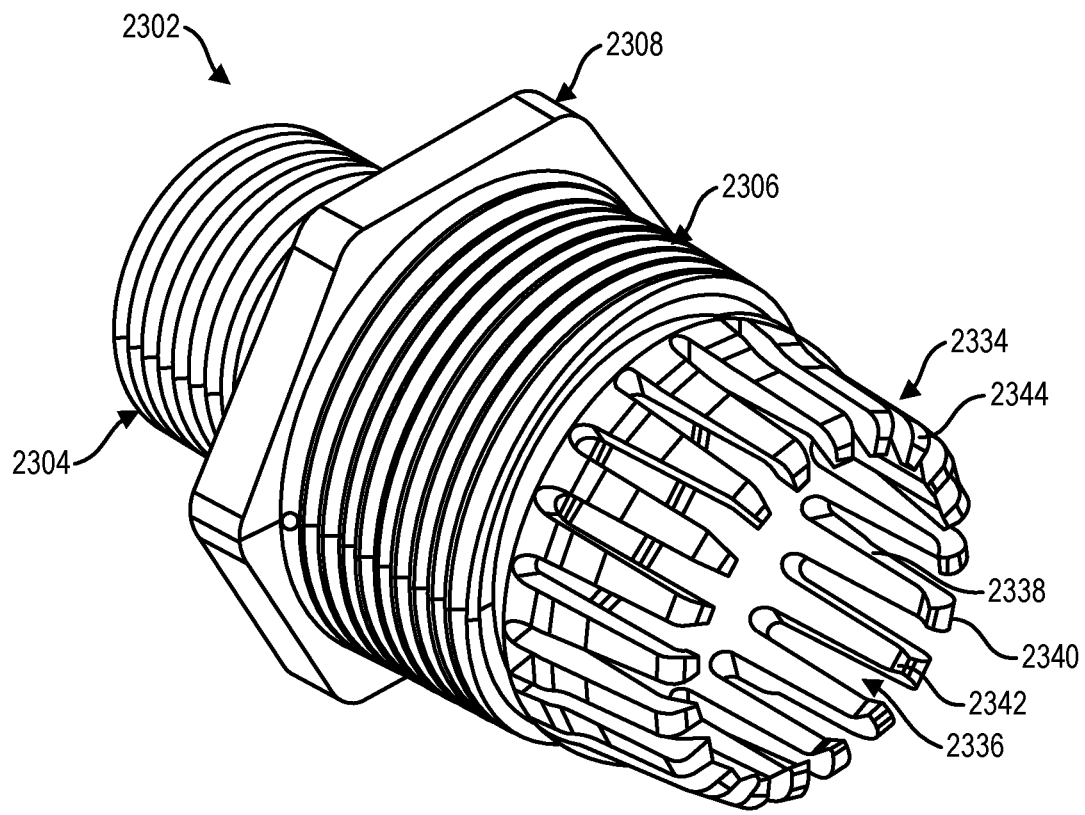
FIG. 26 is perspective view of a gland body according to an embodiment of the disclosed subject matter.
Figure 27:
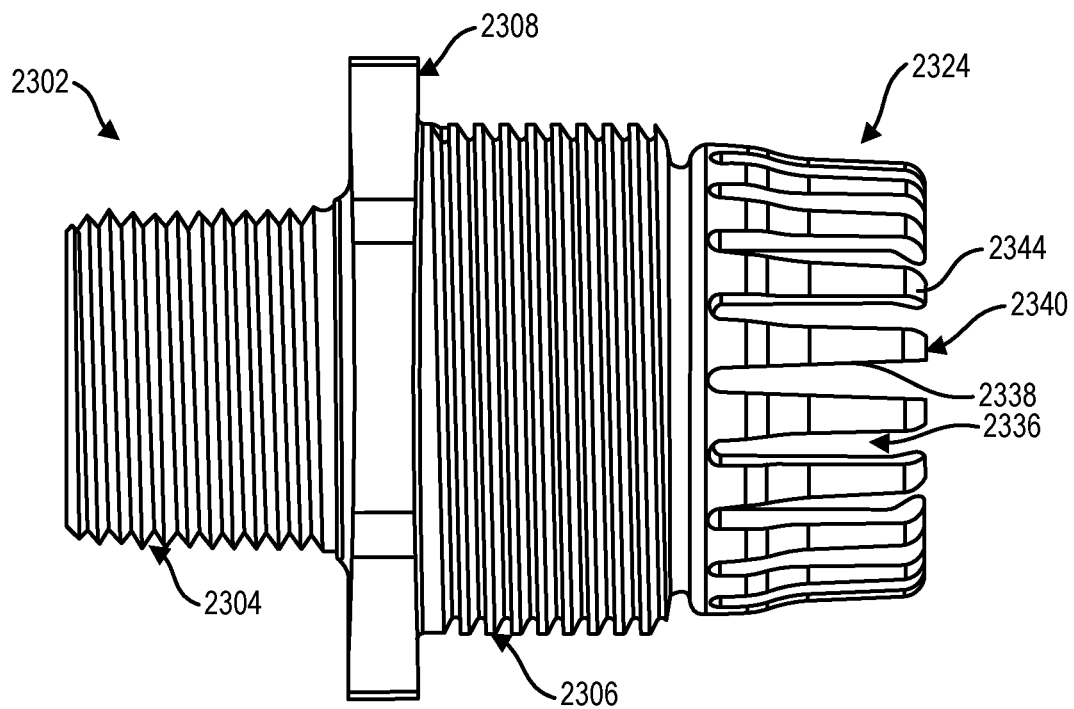
FIG. 27 is a side view of a gland body according to an embodiment of the disclosed subject matter.
Figure 28:
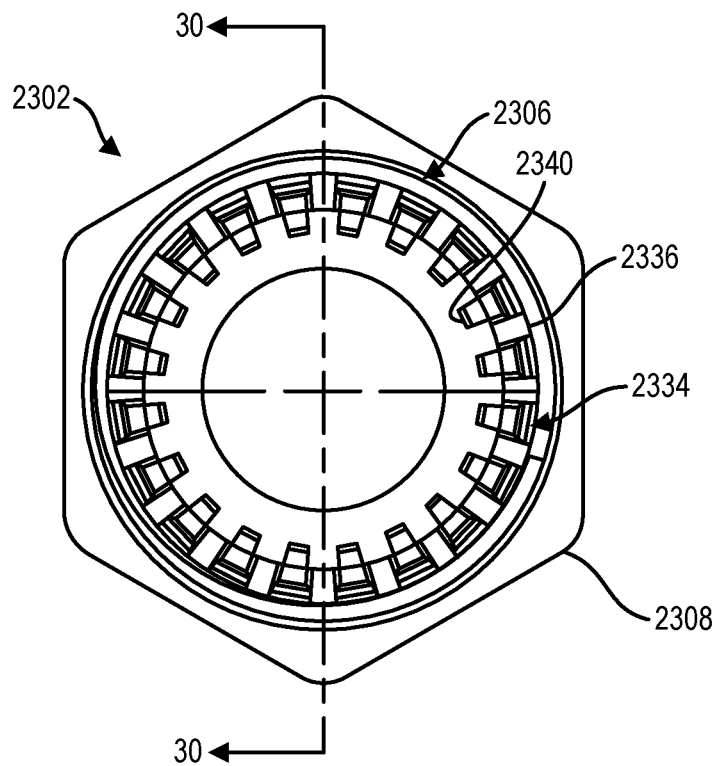
FIG. 28 is a side view of a gland body according to an embodiment of the disclosed subject matter.
Figure 29:
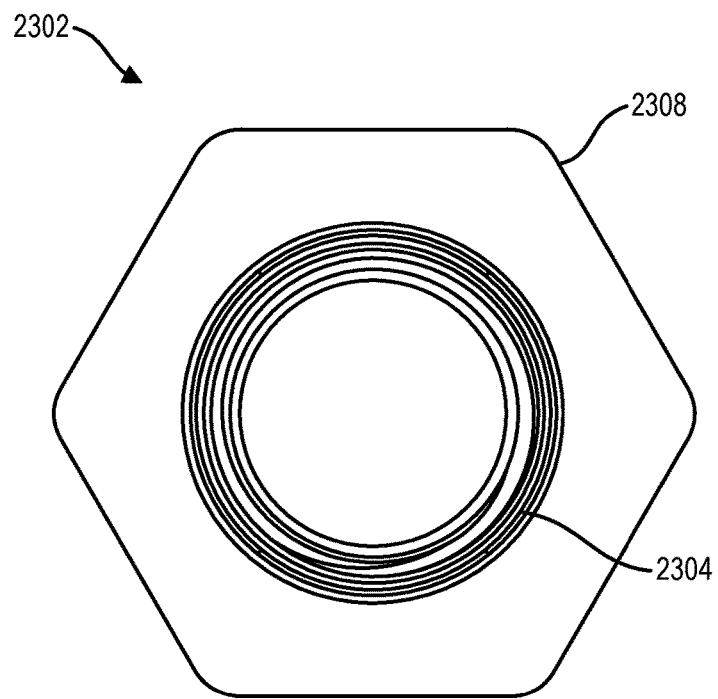
FIG. 29 is a side view of a gland body according to an embodiment of the disclosed subject matter.
Figure 30:
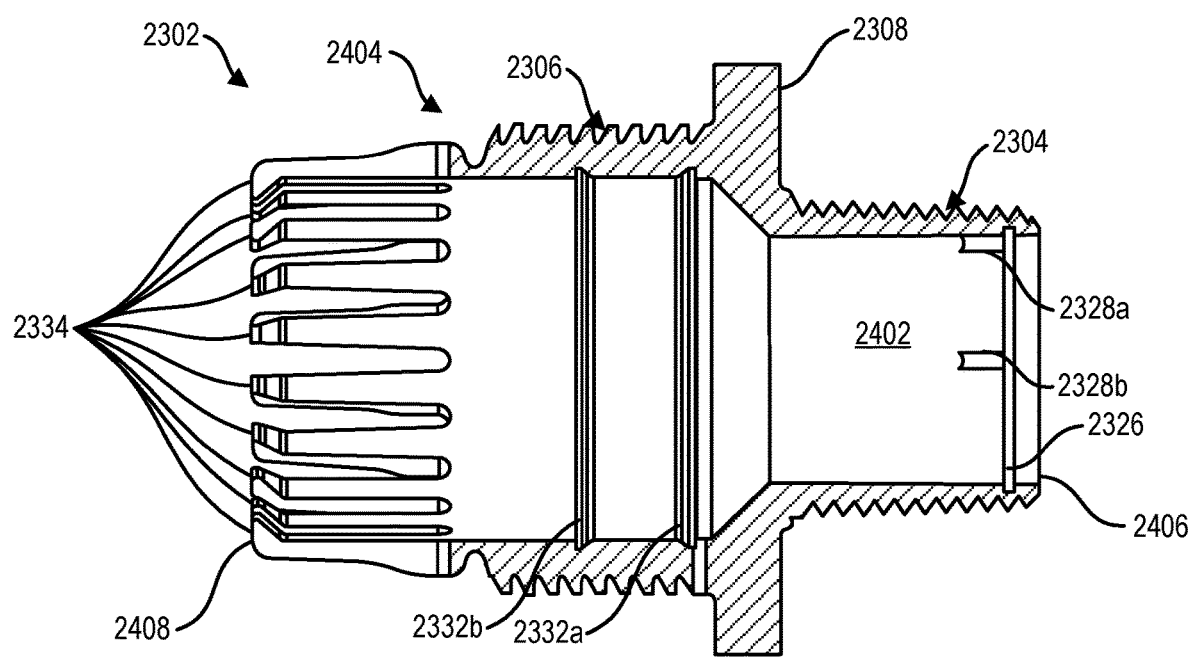
FIG. 30 is a sectional view of a gland body according to an embodiment of the disclosed subject matter.

Referring to FIGS. 23-25, in an embodiment of the disclosed subject matter, a cable gland 2300 comprises a gland body 2302 having a first set of threads 2304 disposed on the exterior of the gland body 2302 at one end and a second set of threads 2306 disposed on the exterior of the gland body at an opposite end. The gland body 2302, being generally cylindrical in shape, and may comprise separate interior diameters ($D_1, D_2$). The first set of threads 2304 and the second set of threads 2306 may be separated by a central body 2308 extending outwardly and away from the gland body 2302. A peripheral edge 2310 of the central member may be configured in the shape a hexagon to assist in rotating the gland body about a central axis. The peripheral edge 2310 may be configured in other shapes such as, by way of example, a square or a circle. A nut 2312 demountable attached to the first set of threads 2304. An o-ring 2322 is attached to the exterior surface of the cable gland 2300 proximate the first set of threads 2304, the o-ring 2322 configured to abut the central body 2308. The o-ring may be constructed of elastomeric material such as, by way of example, rubber.

The cable gland 2300 further comprises a compression member 2314 having a first opening 2316 and a second opening 2318 being oppositely disposed the first opening 2316; wherein the diameter of the second opening 2318 is smaller than the diameter of the first opening 2316. The compression member 2314 is configured to engage the second set of threads 2306 proximate the first opening 2316. The interior of the compression member 2314 is tapered between the first opening 2316 and the second opening 2318 in order to compress an elastomer seal 2320 disposed within the cable gland 2300 when the compression member 2314 is threaded upon the second set of threads 2306. The compression member 2314 may comprise a plurality of planer surfaces 2324 disposed about the exterior of the compression member 2314 and proximate the first opening 2316. The plurality of planer surfaces 2324 configured to assist in the tightening the compression member 2314 to the second set of threads 2306 by, for example, providing parallel surfaces for a wrench to grip the plurality of planer surface 2324 and rotate the compression member 2314. The compression member 2314 may be dome shaped.

Referring to FIG. 25, in an embodiment of the disclosed subject matter, a cross sectional view of cable gland 2300 is illustrated. In addition to the features illustrated in FIGS. 23-24, an interior slot 2326 may be disposed about a first interior diameter $D_1$ of the gland body 2302 proximate a first distal end 2406. The interior slot 2326 configured to axially restrain an earthing member (not shown) to the gland body 2302. The gland body 2302 may further comprise a plurality of linear notches 2328*a,b* disposed adjacent the interior slot 2326; the plurality of linear notches 2328*a,b* configured to restrain rotational movement of an earthing member (not shown) about the central axis A of the gland body 2302.

The interior diameter of the gland body 2302 transitions from the first interior diameter $D_1$ to the second interior diameter $D_2$ at a position proximate the central body 2308. The transition may be linear (as shown), abrupt, or curved. In an embodiment, the second interior diameter $D_2$ is greater than first interior diameter $D_1$ to accommodate the thickness of the elastomer seal 2320. However, it may desirable that the first interior diameter $D_1$ is equal to second interior diameter $D_2$ depending on the application. The elastomer seal 2320 abuts the interior surface of the gland body 2302 and is axially restrained to the interior of the gland body 2302 through use of a set of tongues 2330a,b configured to engage a set of grooves 2332a,b. The set of tongues 2330a,b disposed around the circumference of an exterior surface of the elastomer seal 2320. The set of grooves 2332a,b disposed around the interior circumference of the gland body 2302 proximate the second set of threads 2306.

Referring to FIGS. 25-30, in an embodiment of the disclosed subject matter, the gland body 2302 comprises an interior surface 2402, an exterior surface 2404, a first distal end 2406, and a second distal end 2408 opposite the first distal end 2406. The gland body 2302 further comprises a plurality of extensions 2334 proximate the second distal end 2408. The plurality of extensions 2334 configured to engage the elastomer seal 2320; whereby rotation of the plurality of extensions 2334 towards the central axis A of gland body results in radial compression of the elastomer seal 2320. The plurality of extensions 2334 may be equally disposed around the circumference of the gland body and separated from each other by uniform gap 2336. In an embodiment, the plurality of extensions 2334 comprise twenty separate extensions disposed every 18-degrees about the circumference of the gland body 2302. Other number of extensions may be provided depending on the application and dimensions of the cable gland.

Figure 31:
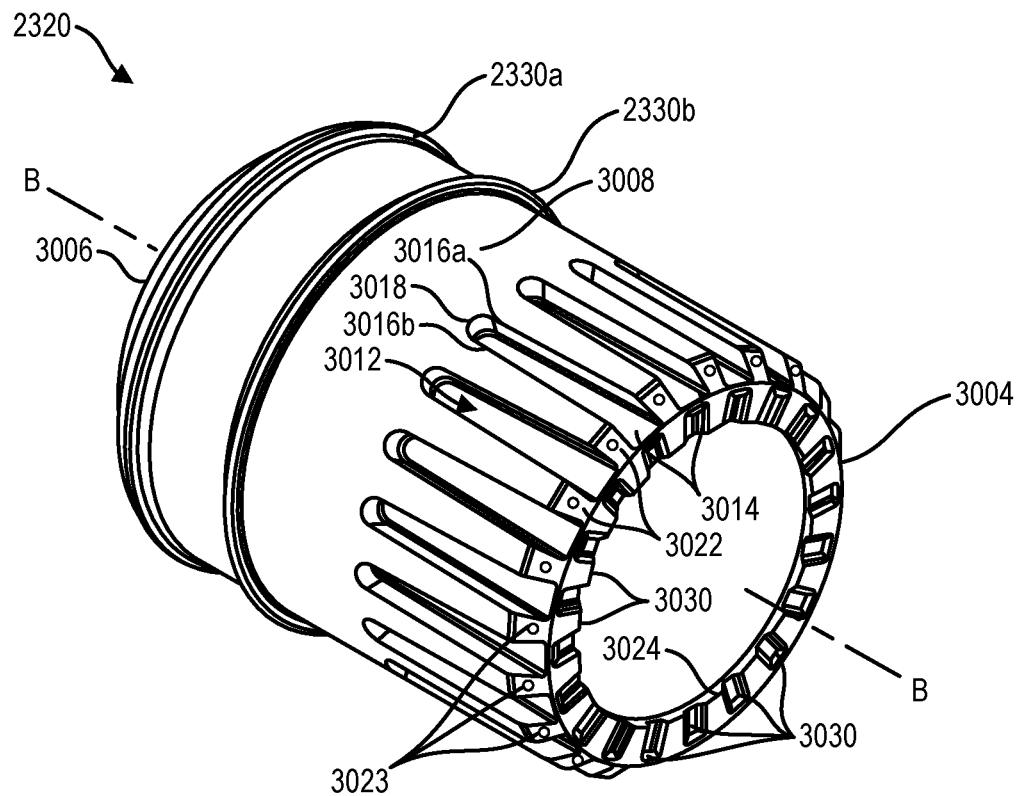
FIG. 31 is a perspective view of an elastomer seal according to an embodiment of the disclosed subject matter.

The plurality of extensions 2334 comprising: a plurality of first members 2338 generally parallel to the central axis A; and a plurality of inclined members 2340 extending outwardly from the plurality of first members 2338 and inclined towards the central axis A. The plurality of inclined members 2340 is configured to abut the elastomer seal 2320 proximate a first seal end 3004 (shown in FIG. 31) of the elastomer seal 2320.

In an embodiment of the disclosed subject matter, the plurality of inclined member 2340 comprise a plurality of inner surfaces 2342 and a plurality of outer surfaces 2344. In an embodiment, each of the plurality of inner surfaces 2342 is in inclined approximately 45 degrees towards the central axis A. The plurality of inner surfaces 2342 is configured to abut the elastomer seal 2320, and the plurality of outer surfaces 2344 is configured to abut the compression member 2314; whereby movement of the compression member 2314 towards the central body 2308 results in movement of the elastomer seal 2320 towards the central axis A.

Figure 32:
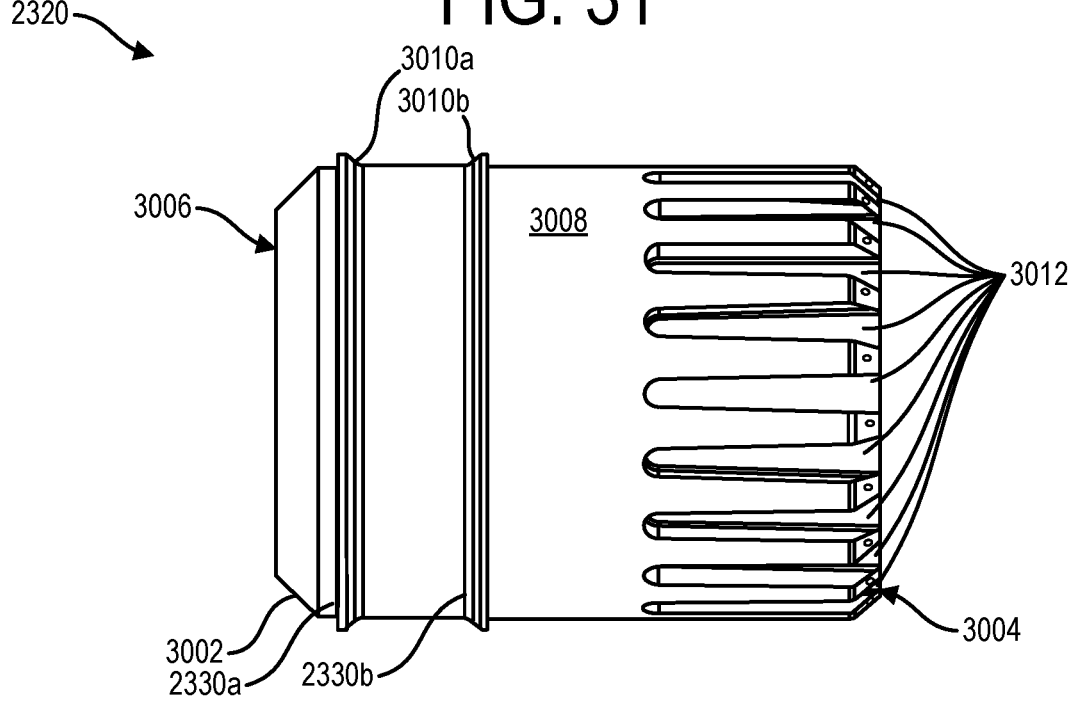
FIG. 32 is a side view of an elastomer seal according to an embodiment of the disclosed subject matter.
Figure 33:
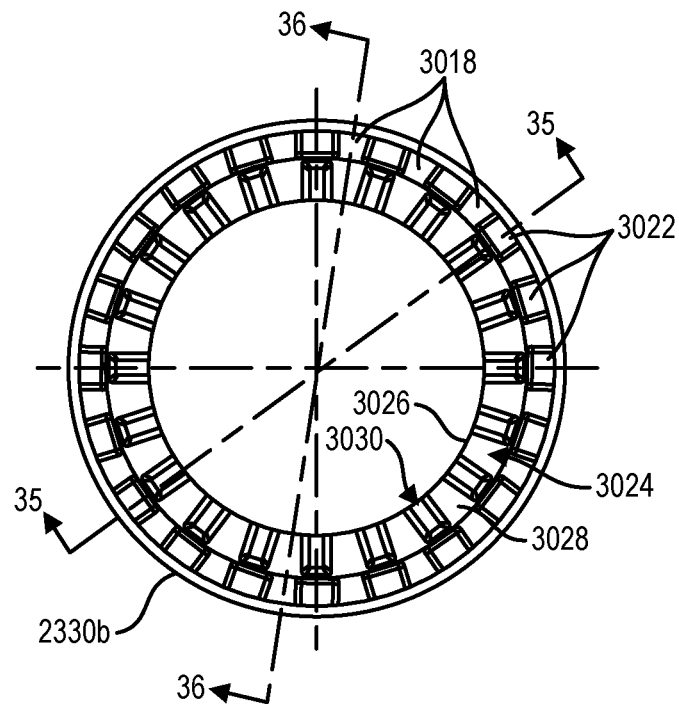
FIG. 33 is a side view of an elastomer seal according to an embodiment of the disclosed subject matter.
Figure 34:
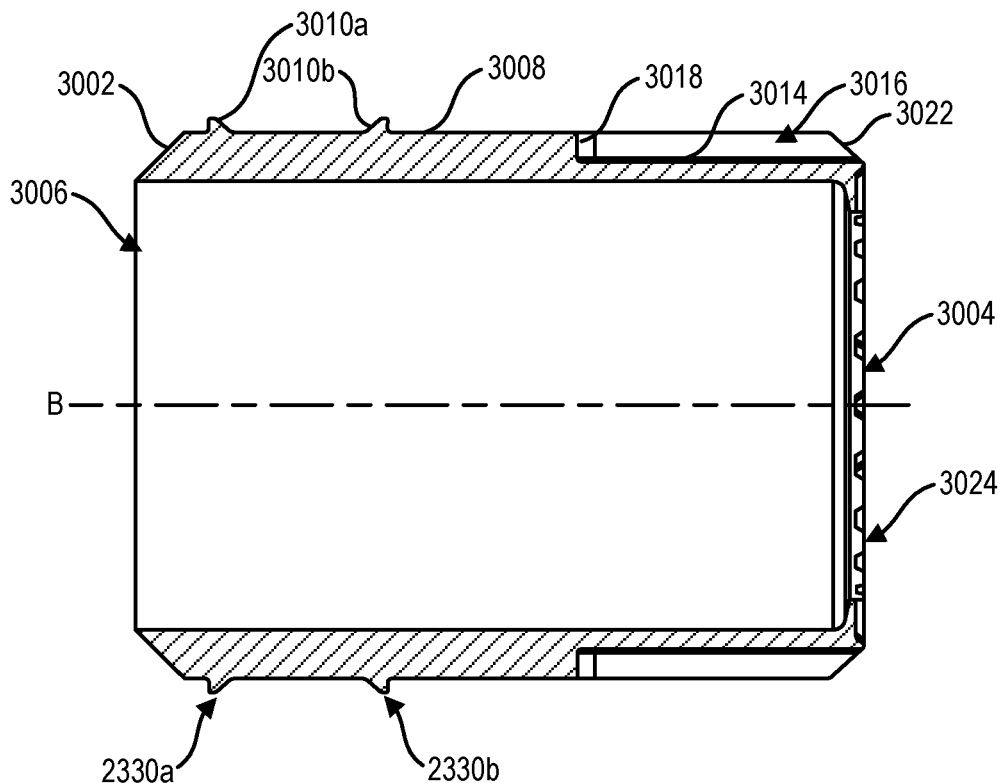
FIG. 34 is a sectional view of an elastomer seal according to an embodiment of the disclosed subject matter.
Figure 35:
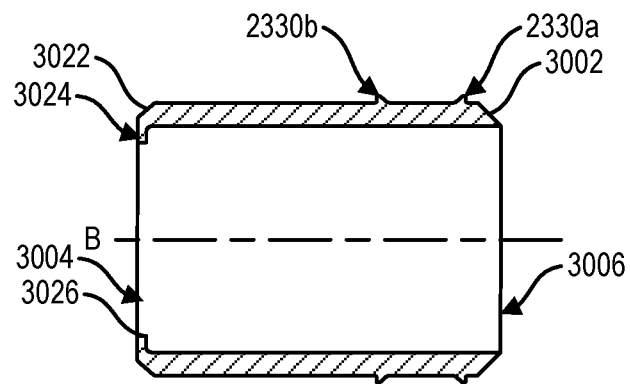
FIG. 35 is a sectional view of an elastomer seal according to an embodiment of the disclosed subject matter.
Figure 36:
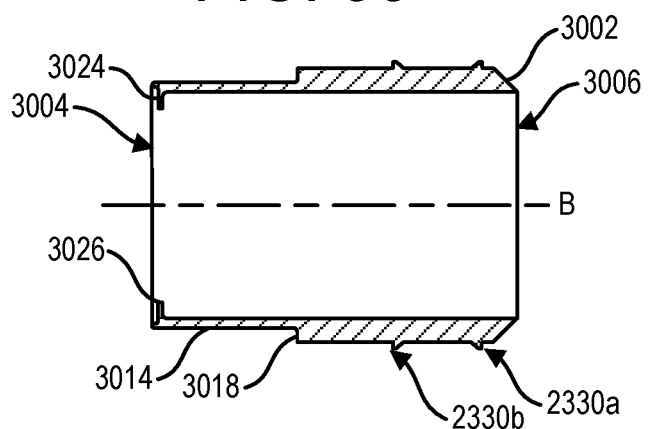
FIG. 36 is a sectional view of an elastomer seal according to an embodiment of the disclosed subject matter.
Figure 37:
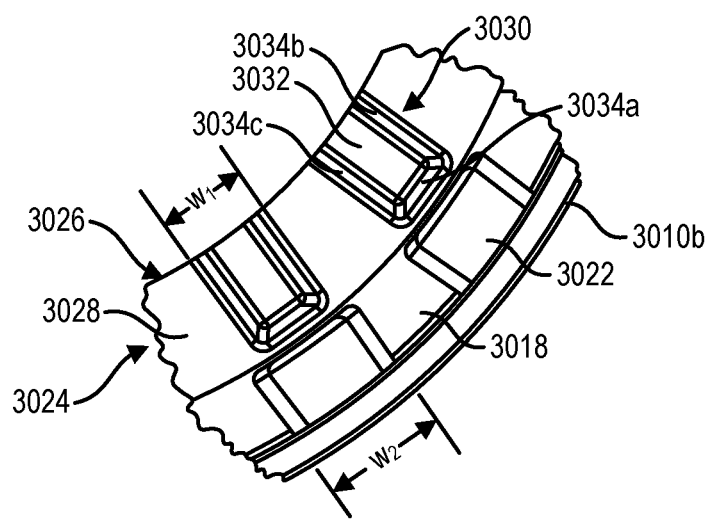
FIG. 37 is a detail view of an elastomer seal according to an embodiment of the disclosed subject matter.

In an embodiment of the disclosed subject matter, each of the plurality of extensions 2334 comprise a plurality of cavities (not shown) disposed upon the plurality of inner surfaces 2342. The plurality of cavities is configured to engage a set of exterior surface protrusions 3023 disposed upon the elastomer seal 2320 (shown on FIGS. 31-32). The engagement of the set of exterior surface protrusions 3023 within the plurality of cavities resists the rotation of the elastomer seal 2320 with the gland body 2302.

Referring to FIGS. 31-37, in an embodiment of the disclosed subject matter, the elastomer seal 2320, being generally tubular in shape, is illustrated having a first seal end 3004, a second seal end 3006, an exterior seal surface 3008, and a central seal axis B; wherein the exterior seal surface 3008 of the elastomer seal 2320 is configured to abut the interior surface 2402 of the gland body 2302. The elastomer seal 2320 comprises a beveled edge 3002 extending between the second seal end 3006 and the exterior seal surface 3008. A set of tongues 2330a,b is disposed around the exterior seal surface 3008 of the elastomer seal 2320; the set of tongues 2330a,b configured to engage a set of grooves 2332a,b (shown on FIGS. 25 and 30). The set of tongues 2330a,b comprising a set of inclined surfaces 3010a,b disposed approximately 45-degrees from the exterior seal surface 3008. In an embodiment of the disclosed subject matter, each of the inclined surfaces of the set of inclined surfaces 3010a,b are disposed opposite each other. The set of inclined surfaces 3010a,b may be disposed at other angles relative to the exterior seal surface 3008 in order to assist in engagement with the set of grooves 2332a,b. In a further embodiment, the elastomer seal 2320 is bonded to the interior of the gland body 2302 to provide an airtight environmental seal. The elastomer seal 2320 may be constructed of an elastomeric material such as, by way of example, rubber.

The elastomer seal 2320 further comprises a set of channels 3012 disposed along the exterior seal surface 3008. Each channel of the set of channels 3012 extends from the second seal end 3006 towards the first seal end 3004 and terminates prior to the set of tongues 2330a,b at a curved rear wall 3018. Each channel of the set of channels 3012 is bounded by a bottom surface 3014, two side walls 3016a,b; and a curved rear wall 3018.

A set of fingers 3020 extend along the exterior seal surface 3008 from the first seal end 3004. Each finger of the set of fingers 3020 is bounded by the two side walls 3016a,b. The set of fingers 3020 further comprise a set of tapered end faces 3022 disposed between the two side walls 3016a,b and proximate the first seal end 3004. The set of tapered end faces 3022 further disposed between the set of channels 3012 proximate the first seal end 3004. The set of tapered end faces 3022 are configured to engage the plurality of inner surfaces 2342 of the plurality of extensions 2334 (shown in FIG. 26) to assist in the compression of the elastomer seal 2320 when the set of fingers 2030 is rotated toward the central axis A of the gland body 2302 through compression of the compression member 2314 upon the set of fingers 3020. The set of tapered end faces 3022 may comprise a set of exterior surface protrusions 3023; wherein each of protrusion of the set of exterior surface protrusions 3023 is disposed on each end face of the set of tapered end faces 3022 and extend outwardly from the set of tapered end faces 3022. In an embodiment, the set of exterior surface protrusions 3023 comprises a curved exterior surface, such as a dome, configured to restrain the elastomer seal 2320 from rotation within the gland body 2302 by engaging a plurality of cavities (not shown) on the plurality of inner surfaces 2342 of the plurality of extensions 2334. The plurality of cavities are configured to receive and abut the set of exterior surface protrusions 3023.

In an embodiment of the disclosed subject matter, the elastomer seal 2320 comprises an annular ring 3024 connected to the first seal end 3004. The annular ring 3024, having an exterior ring surface 3028, extends towards the central seal axis B of the elastomer seal 2320 and terminates at a circular seal edge 3026. A plurality of thickened bodies 3030 are connected to the exterior ring surface 3028; the plurality of thickened bodies 3030 radially aligned with the set of tapered end faces 3022. A first width $W_1$ of each of the plurality of thickened bodies 3030 may be less than or equal to a second width $W_2$ of each of the set of tapered end faces 3022. The plurality of thickened bodies 3030 comprising a top surface 3032 generally parallel with the exterior ring surface 3028, and a plurality of side walls 3034a,b,c connected between the top surface 3032 and the exterior ring surface 3028. In an embodiment, one or more of the plurality of side walls 3034a,b,c extend downwardly and away from the top surface 3032 toward the exterior ring surface 3028.

Figure 38:
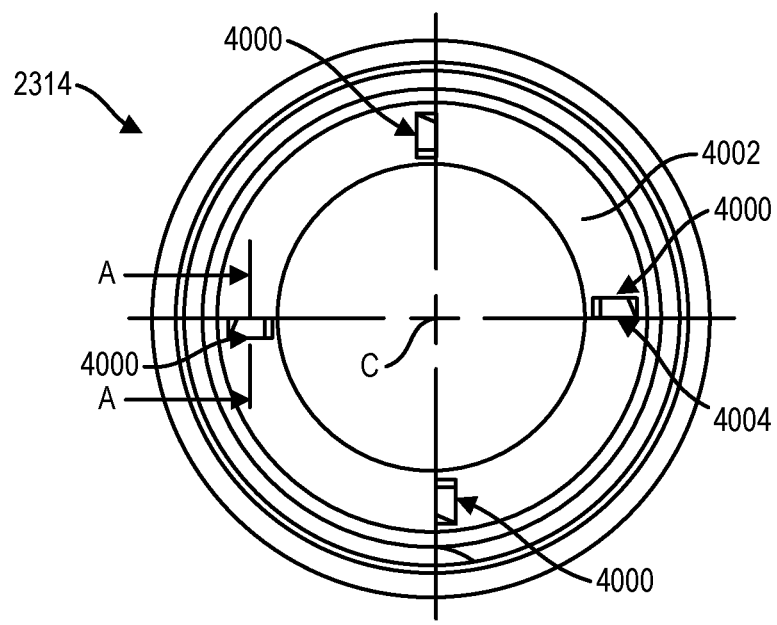
FIG. 38 is a side view of a compression member according to an embodiment of the disclosed subject matter.
Figure 38A:
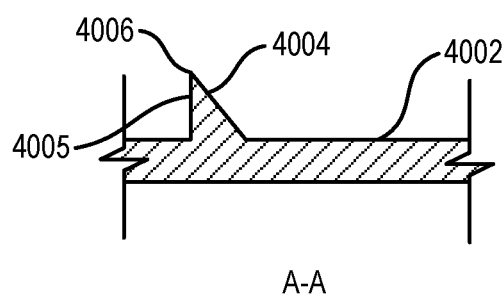
FIG. 38A is a partial sectional view the compression member according to an embodiment of the disclosed subject matter.

Referring to FIGS. 38 and 38A, in an embodiment of the disclosed subject matter, the compression member 2314 comprises a plurality of tabs 4000 equally disposed around an interior compression surface 4002 of compression member 2314. The plurality of tabs 4000 equally positioned about a central axis C of the compression member 2314. In an embodiment, the plurality of tabs 4000 are evenly spaced between 60-90 degrees about the central axis C. In an embodiment, the compression member 2314 comprises six tabs of the plurality of tabs 4000, spaced every sixty-degrees around the central axis C. Each of the plurality of tabs 4000 may comprise an inclined surface 4004 extending from the interior compression surface 4002 and terminating at an upper edge 4006. In an embodiment, the inclined surface 4004 may be disposed at a 45-degree angle with the interior compression surface 4002. Each of the plurality of tabs 4000 may further comprise and vertical surface 4005 extending between the upper edge 4006 and the interior compression surface 4002. The vertical surface 4005 configured to resist the counter-clockwise movement of the compression member 2314 about the plurality of extensions 2334 by resting between the plurality of tabs 4000.

The plurality of tabs 4000 are configured to intermittently engage the plurality of extensions 2334 when the compression member 2314 is rotated about the plurality of extensions 2334, such as, by way of example, when the compression member 2314 is threaded onto or off the second set of threads 2306. The plurality of tabs 4000 is configured to resist a counter-clockwise rotation of the compression member 2314 in order to assist in securing the compression member 2314 to the gland body 2302. The plurality of tabs 4000 configured to provide an audible sound, such as a clicking sound, during clockwise rotation of the compression member 2314 onto the second set of threads 2306. The audible sound generated after the plurality of extensions 2334 pass over the inclined surface 4004, pass off the upper edge 4406, and spring back into position against the interior compression surface 4002 of the compression member 2314.

Figure 39:
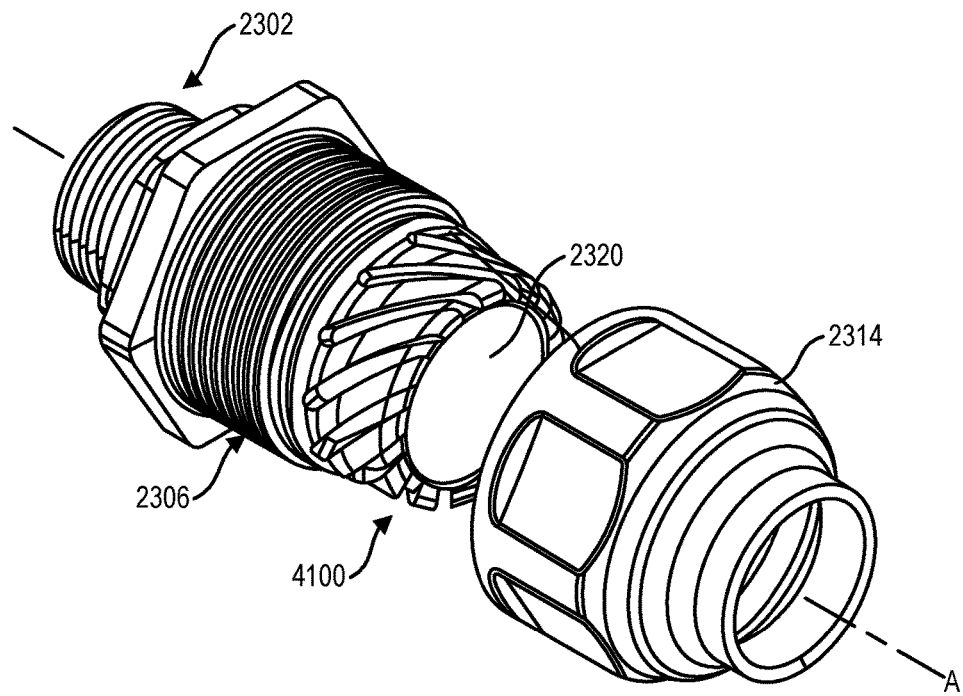
FIG. 39 is a perspective view a gland body and a compression member according to an embodiment of the disclosed subject matter.
Figure 40:
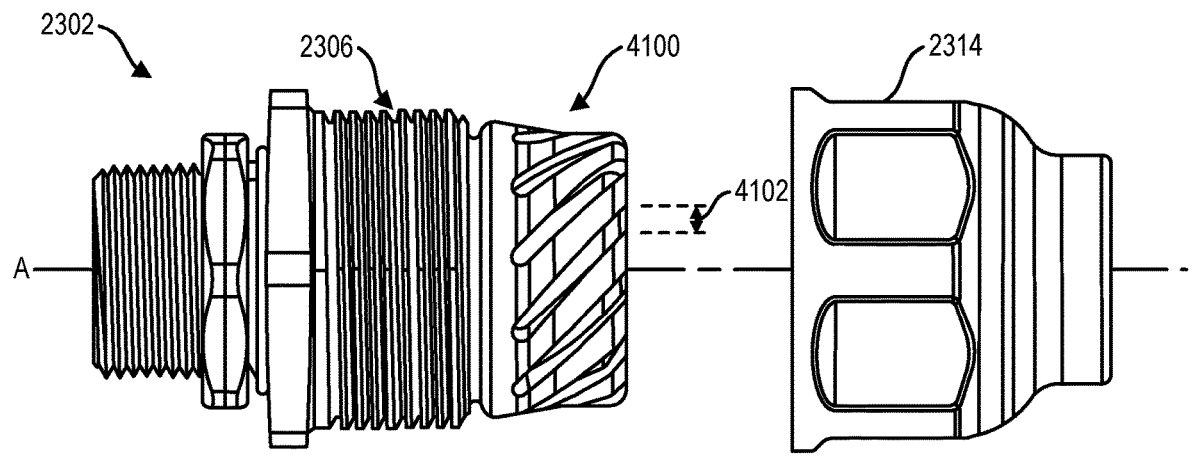
FIG. 40 is a side view a gland body and a compression member according to an embodiment of the disclosed subject matter.

Referring to FIGS. 39-40, in an embodiment of the disclosed subject matter, the plurality of extensions 2334 may comprises a plurality of helical fingers 4100 connected to the distal end of the gland body 3202 proximate the second set of threads 2306. The plurality of helical fingers 4100 are helically disposed about the central axis A. The plurality of helical fingers 4100 configured to engage the elastomer seal 2320; whereby rotation of the plurality of helical fingers 4100 towards the central axis A of the gland body 2302 results in radial compression of the elastomer seal 2320. The plurality of helical fingers 4100 may be equally disposed around the circumference of the gland body 2302 and separated from each other by second uniform gap 4102. In an embodiment, the plurality of helical fingers 4100 comprise 12 separate helical fingers disposed every 30-degrees about the circumference of the gland body 2302. Other embodiments may comprise more than or less than 12 helical fingers depending on the application. The plurality of helical fingers 4100 may extend outwardly from the gland body 2302 at angle of between 30-50 degrees from the gland body 2302, and preferable about 40 degrees from the gland body 2302. The helical arrangement of the plurality of helical fingers 4100 provides an increased range of movement over fingers arranged parallel to the central axis A. Additionally, the plurality of helical fingers 4100 are less prone to pinch the elastomer seal 2320 within the second uniform gap 4102 when the elastomer seal 2320 is compressed, thus reducing the possibility of an air gap forming between an exterior of a cable (not shown) and the elastomer seal 2320 when the plurality of helical fingers 4100 are compressed through rotation of the of the compression member 2314 onto the second set of threads 2306. In an embodiment of the disclosed subject matter, the second uniform gap 4102 ranges from 0.1 to 0.2 inches, and preferably about 0.13 inches.

Figure 41:
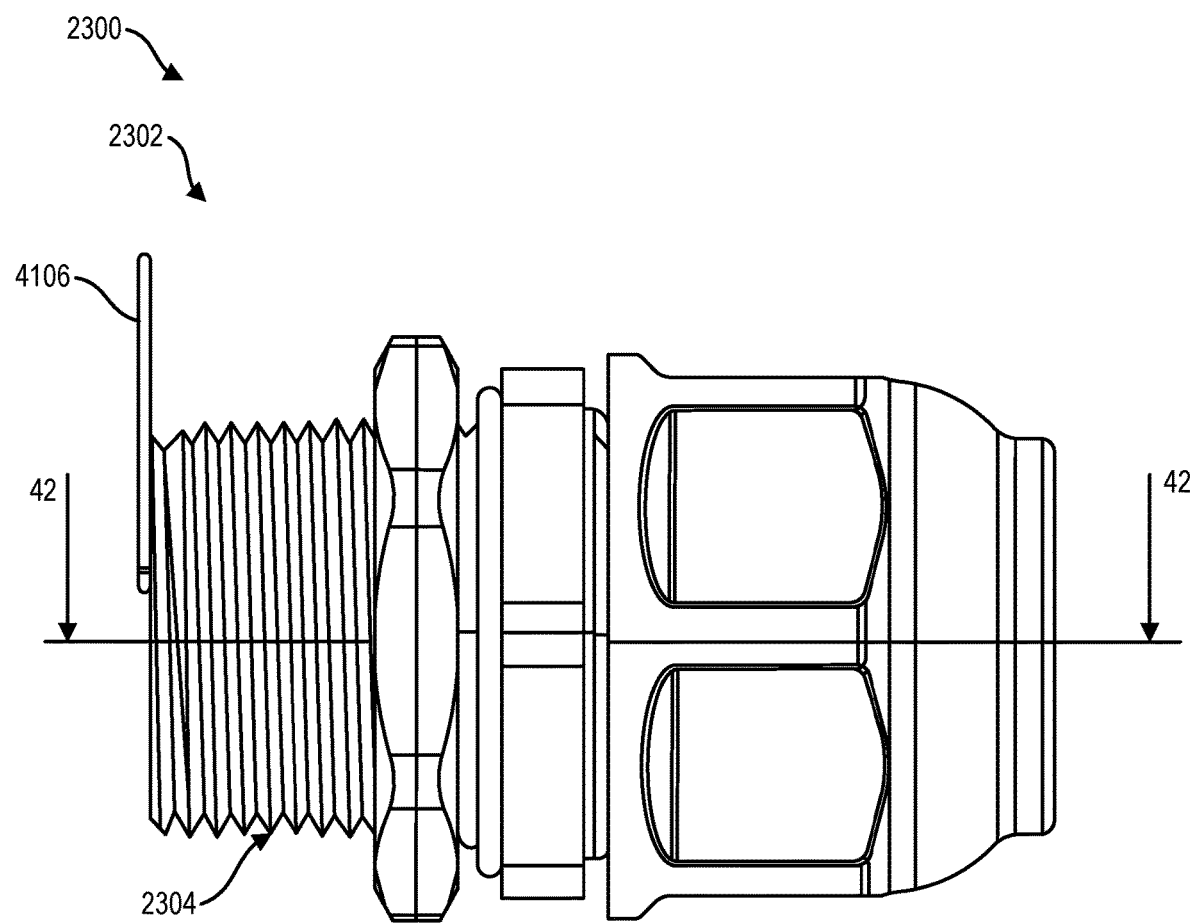
FIG. 41 is a side view of a cable gland according to an embodiment of the disclosed subject matter.
Figure 42:
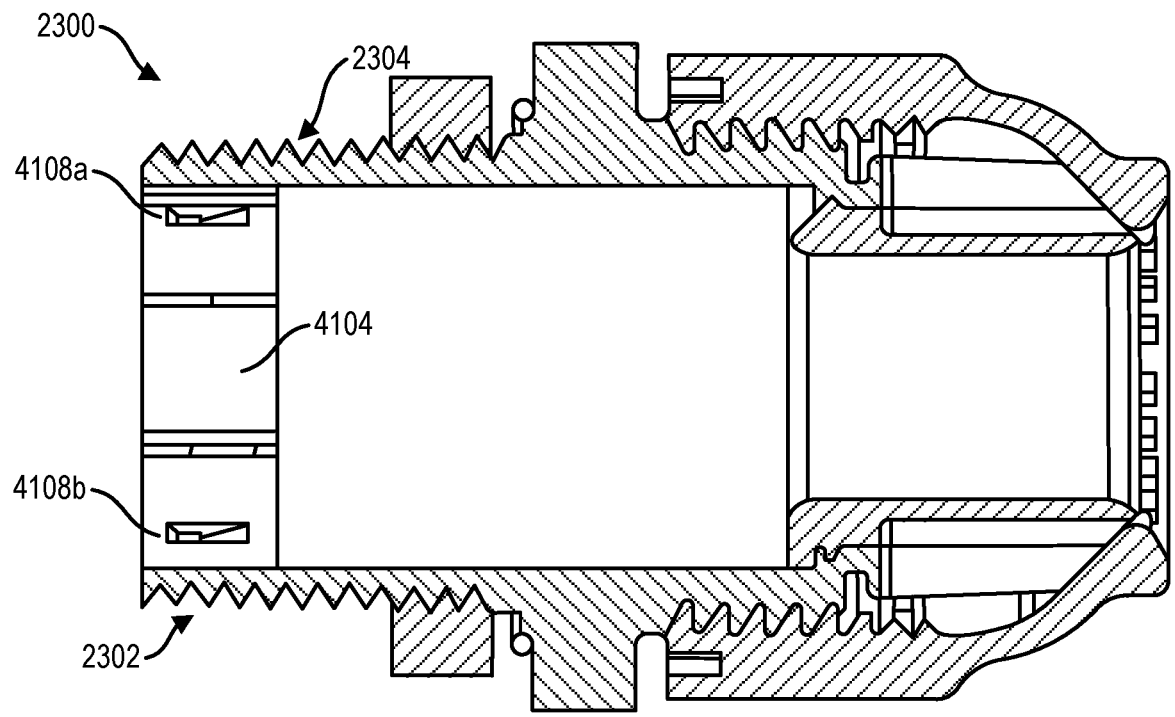
FIG. 42 is a sectional view of a cable gland according to an embodiment of the disclosed subject matter.
Figure 43:
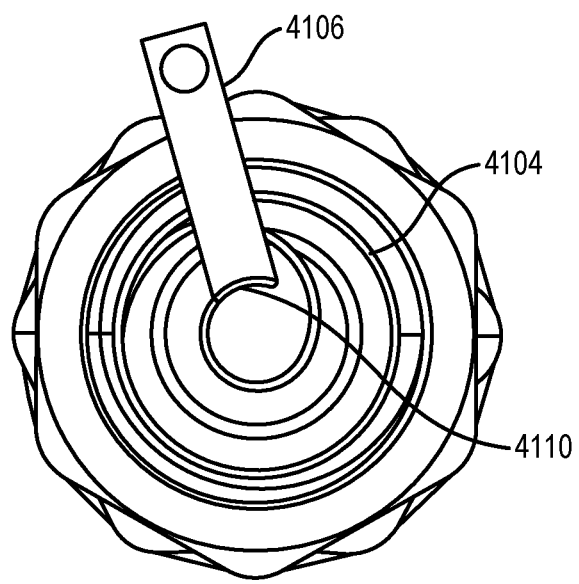
FIG. 43 is a side view of a cable gland according to an embodiment of the disclosed subject matter.

Referring to FIGS. 41-43, in an embodiment of the disclosed subject matter, a cable gland 2300 comprising an earthing insert 4104 disposed within the interior of the gland body 2302 proximate the first set of threads 2304; and a grounding tab 4106 connected to a coil distal end 4110 of the earthing insert 4104, the grounding tab 4106 extending radially away from gland body 2302. The earthing insert 4104 is frictionally engaged to the interior of the gland body 2302. The earthing insert 4104 is axially restrained to the interior of the gland body 2302 through engagement of a set of tabs 4108 extending outwardly from the earthing insert 4104, the set of tabs 4108 configured to be received within a plurality of linear notches 2328 (shown in FIG. 25) along the interior of the gland body 2302.

Figure 44A:
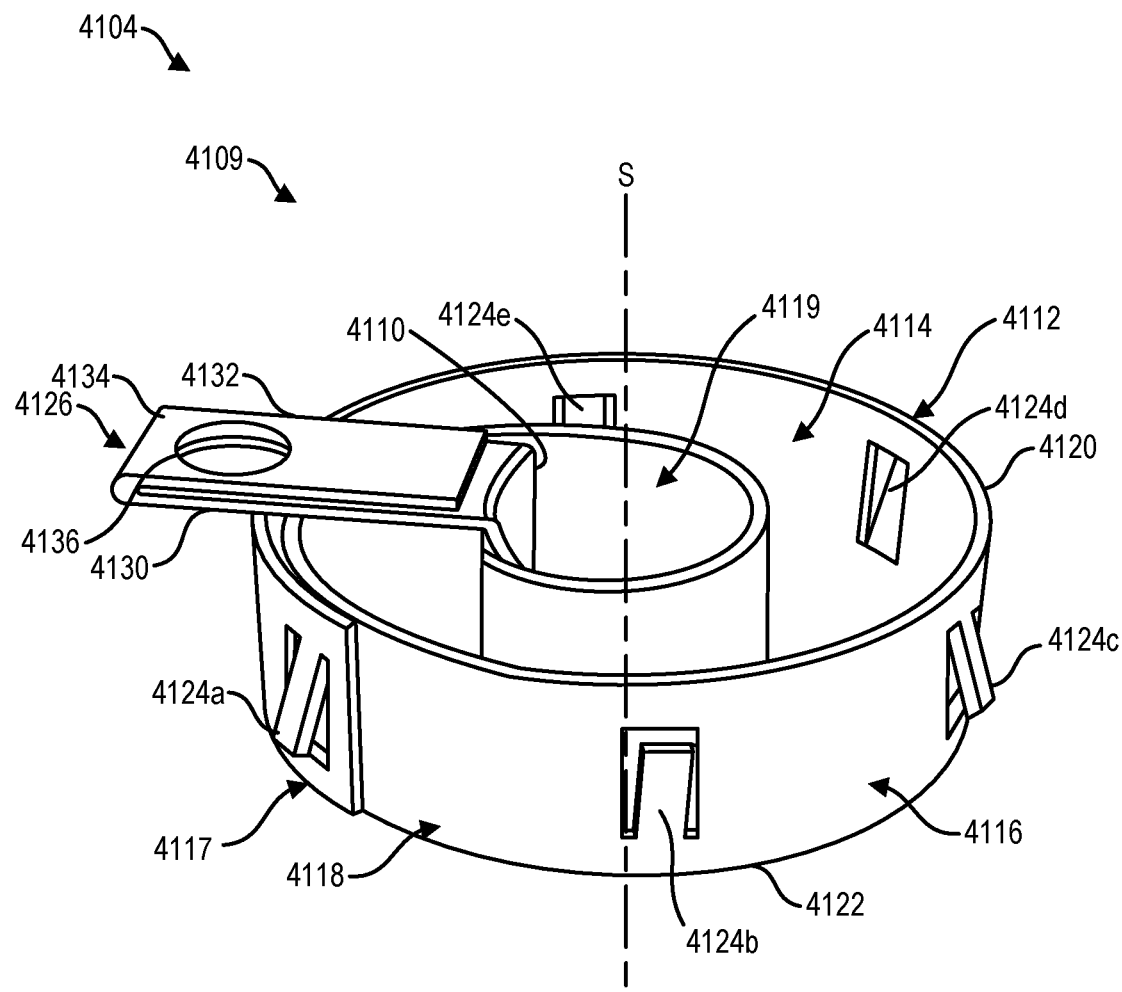
FIG. 44A is a perspective view of a earthing insert according to an embodiment of the disclosed subject matter.

Referring to FIG. 44A, in an embodiment of the disclosed subject matter, the earthing insert 4104 comprises a grounding spring 4109 having a central spring axis S. The grounding spring 4109 configured to be mounted in the gland body 2302 proximate the first distal end 2406 of the gland body 2302. The grounding spring 4109 comprises a coiled member 4112 being generally rectangular in shape and having an interior coiled surface 4114 and an exterior coiled surface 4116. A distal portion 4117 of the interior coiled surface 4114 abuts the exterior coiled surface 4116 forming an exterior coil perimeter surface 4118; wherein the exterior coil perimeter surface 4118, being generally cylindrical in shape, having a top edge 4120 and a bottom edge 4122. The coiled member 4112 extending inwardly in a spiraled fashion towards the central spring axis S forming a central coil region 4119 configured to engage a cable (not shown). The earthing insert 4104 is constructed of an electrically conductive material such as, by way of example, copper, aluminum or steel.

A set of tabs 4124a-e extend outwardly and away from the exterior coil perimeter surface 4118 at an angle between 5 to 45 degrees. Adjacent tabs of the set of tabs 4124a-e are configured at alternating inclinations, such that tabs 4124a, c,e extend outwardly towards the bottom edge 4122, and tabs 4124b,d extend outwardly towards the top edge 4120. At least one of the set of tabs extending upwardly from the exterior coil perimeter surface. At least one of the set of tabs extending downwardly from the exterior coil perimeter surface. The set of tabs 4124a-e are equally spaced about the exterior coil perimeter surface 4118, and may be spaced between 45 to 90 degrees about the central spring axis S. The set of tabs 4124a-e configured to engage the interior of the gland body and frictionally restrain the grounding spring 4109 to the gland body 2302.

A grounding tab 4126 is connected to the top edge 4120 proximate the coil distal end 4110. The grounding tab 4126 extending outwardly from the central spring axis S, and beyond the exterior coil perimeter surface 4118 at approximately 90 degrees. The grounding tab comprising a lower member 4130 connected to the top edge 4120, an upper member 4132 connected to the lower member 4130 at a distal end 4134 of the grounding tab 4126, and an end hole 4136 disposed through the upper member 4132 and the lower member 4130. The grounding tab 4126 is constructed of an electrically conductive material such as, by way of example, copper, aluminum or steel. In an embodiment, the grounding tab and earthing insert are constructed of the same conductive metal.

Figure 44B:
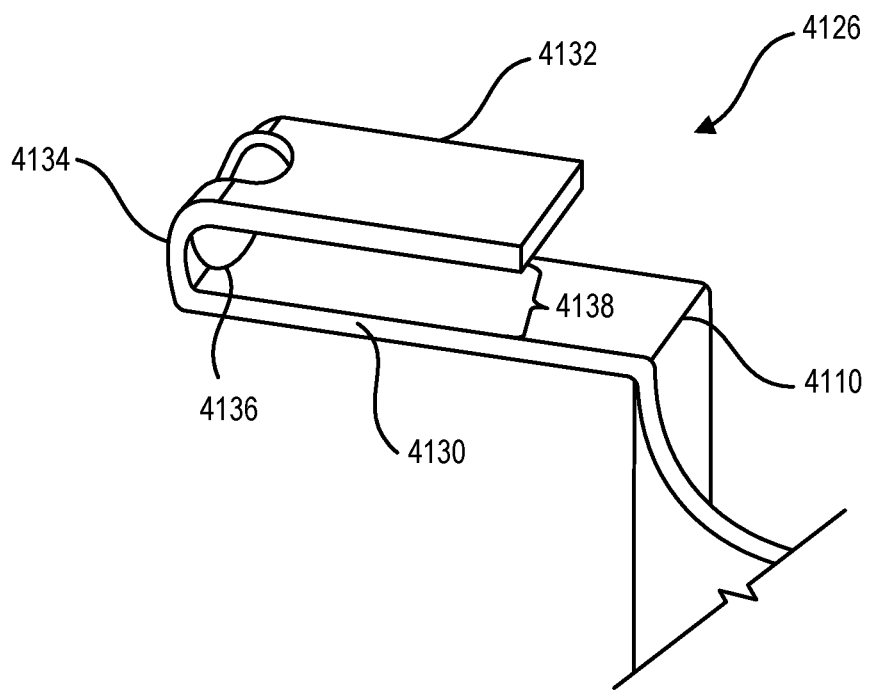
FIG. 44B is a perspective view of a grounding tab according to an embodiment of the disclosed subject matter.
Figure 44C:
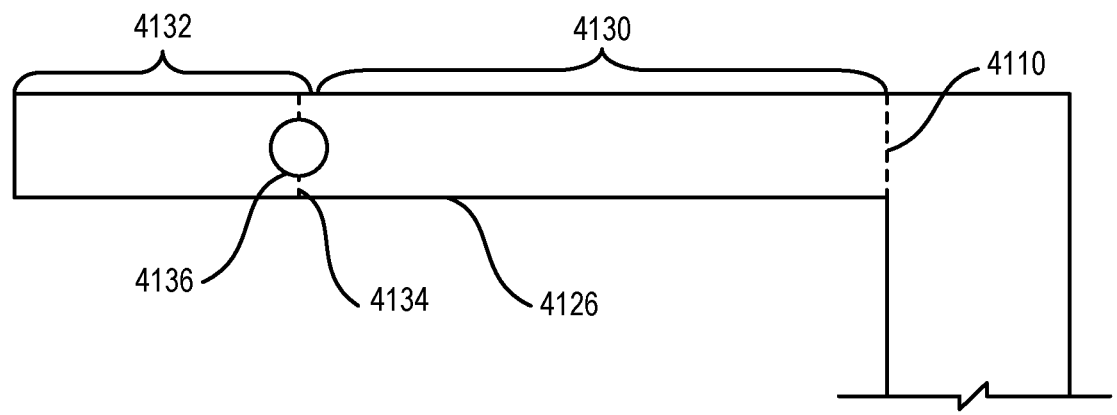
FIG. 44C is an illustration of a grounding tab according to an embodiment of the disclosed subject matter.

In an embodiment of the disclosed subject matter, and referring to FIGS. 44B and 44C, the lower member 4130 and upper member 4132 of the grounding tab 4126 are folded back upon themselves in a parallel arrangement. The upper member 4132 and the lower member 4130 are separated by a predetermined distance 4138. An end hole 4136 is disposed on the grounding tab 4126 proximate the distal end 4134 to receive a ground wire (shown in FIG. 44D). The predetermined distance 4138 is sized to receive the grounding element between the lower member 4130 and the upper member 4132. FIG. 44C illustrates a top view of the grounding tab 4126 in an un-folded state.

Figure 44D:
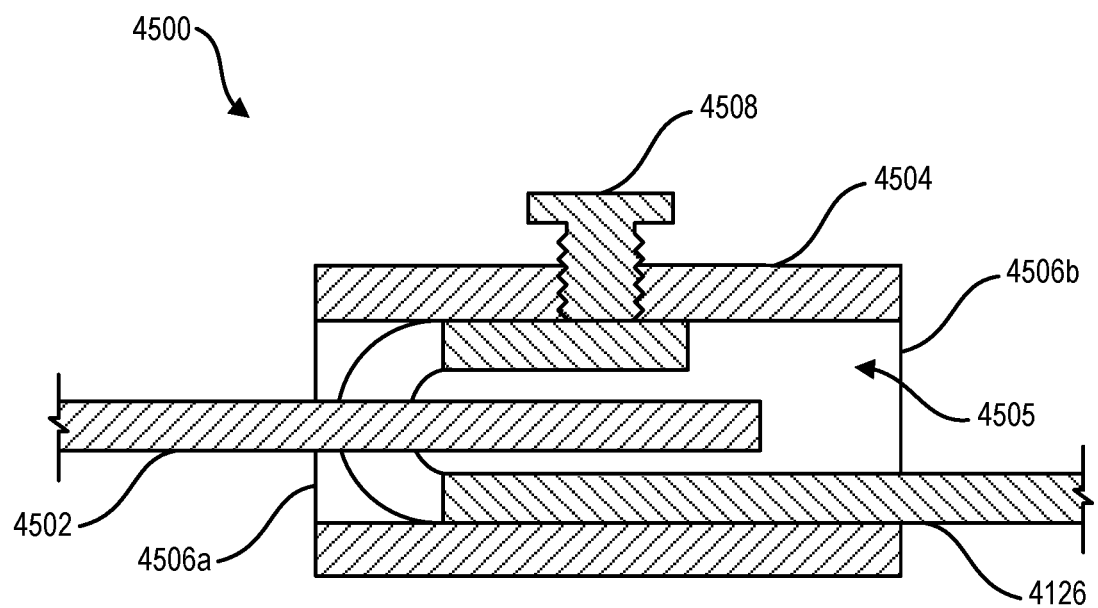
FIG. 44D is a sectional view of an electrical connector according to an embodiment of the disclosed subject matter.

Referring to FIG. 44D, in an embodiment of the disclosed subject matter, an electrical connector 4500 for electrically connecting or grounding a ground wire 4502 to the grounding tab 4126 comprises: a connection body 4504 having a central cavity 4505 and two openings 4506a,b at opposite ends of the central cavity 4505, the two openings 4506a,b sized to receive the ground wire 4502 at one opening and the grounding tab 4126 at the opposite opening; and a contact element 4508 for urging the grounding tab 4126 towards the ground wire 4502 and securing the grounding tab 4126 to the ground wire 4502; thereby creating an electrical connection, bond, or ground between the ground wire 4502 and the grounding tab 4126. In some embodiments, the electrical connector 4500 is cylindrical shaped or rectangular shaped. The contact element 4508 may comprise a set screw disposed through the body, or other suitable connection hardware.

Figure 44E:
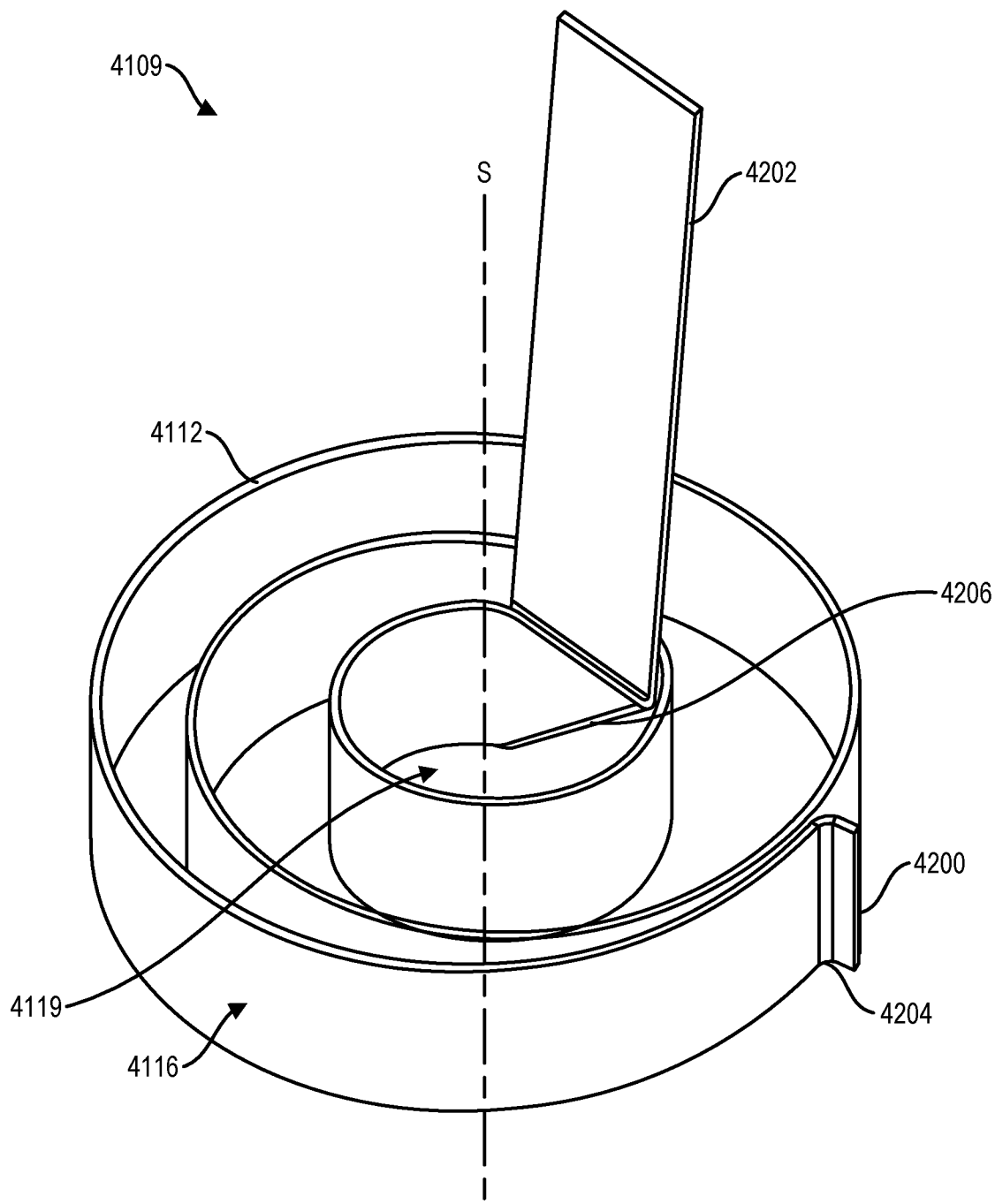
FIG. 44E is a perspective view of a grounding spring according to an embodiment of the disclosed subject matter.

Referring to FIG. 44E, in an embodiment of the disclosed subject matter, the grounding spring 4109 comprises a coiled member 4112, a restraining tab 4200 connected to the coiled member 4112 at a first coil distal end 4204, and a planar grounding tab 4202 connected to the coiled member 4112 at a second coil distal end 4206. The coiled member 4112 spirals inwardly towards a central spring axis S forming a central coil region 4119 to receive a cable therethrough.

The restraining tab 4200 may be formed by bending the first coil distal end 4204 approximately 90 degrees outwardly and away from an exterior coiled surface 4116. The restraining tab 4200 is disposed approximately perpendicular to the central spring axis S. The restraining tab 4200 configured to engage the interior of the gland body 2302 and frictionally restrain the grounding spring 4109 to the gland body 2302. The restraining tab 4200 furthered configured to engage at least one of the plurality of linear notches 2328a,b shown in FIG. 25.

The planar grounding tab 4202 may be formed by bending the grounding spring 4109 back upon itself along a 45-deg bend line proximate the second coil distal end 4206; whereby the planar grounding tab 4202 extends outwardly and away from the central coil region 4119. The planar grounding tab 4202 is disposed approximately 0 to 10 degrees with the central spring axis S. In other embodiments, the planar grounding tab 4202 and/or the restraining tab 4200 are electrically bonded to the grounding spring 4109.

Figure 45:
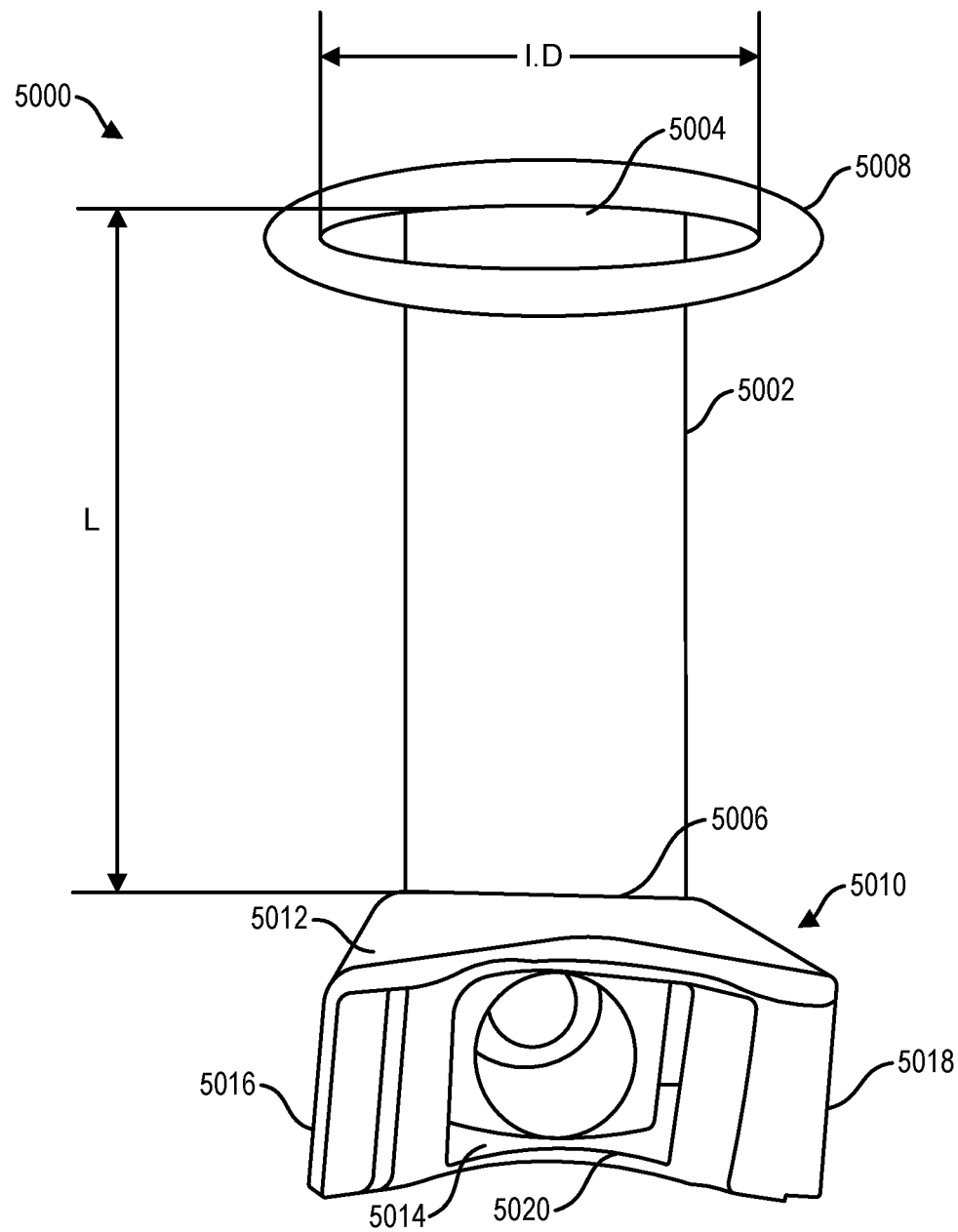
FIG. 45 is a perspective view of a cable retainer according to an embodiment of the disclosed subject matter.

Referring to FIG. 45, in an embodiment of the disclosed subject matter, a cable retainer 5000 comprising: a body 5002 having a first distal end 5004 and a second distal end 5006; a retaining member 5008 connected to the first distal end 5004; and a securing member 5010 connected to the second distal end 5006. In an embodiment, the retaining member 5008 is ring-shaped having an internal diameter (I.D.) configured to accommodate a cylindrical body (not shown) therein. In an embodiment, the body 5002 may have length L between 3.0 to 9.0 inches, and preferably about 5.0 inches. In an embodiment, the securing member 5010 comprises: a top portion 5012 and a bottom portion 5014, the top portion 5012 and the bottom portion 5014 each extending outwardly and away from the body 5002; a first armature 5016 connected to the top portion 5012 and the bottom portion 5014; a second armature 5018 connected to the top portion 5012 and the bottom portion 5014, wherein the top portion, bottom portion, first armature and second armature defining a fifth aperture 5020. In an embodiment, a cable (not shown) may be attached to the securing member 5010 by means of a cable tie, wire or clamp; whereby the cable is secured in a vertical position and is further disposed within the internal diameter I.D. of the retaining member 5008. The cable retainer 5000 is configured to axially align a cable though the center of the retaining member 5008; wherein the alignment is generally parallel to the body 5002. In an embodiment, when the retaining element is attached to a cable gland 2300 (not shown) and the cable is secured to the securing member, the securing member provides restraint to the cable to eliminate rotational and axial forces of the cable upon the cable gland 2300. In an embodiment, the cable retainer 5000 is connected to the cable gland 2300 in order to assist in the alignment of a cable with the central axis A of the cable gland 2300. The retaining member 5008 is connected between the central body 2308 and nut 2312 of the cable gland 2300. In this configuration, the securing member 5010 is positioned a predetermined distance away from the cable gland 2300.

Figure 46:
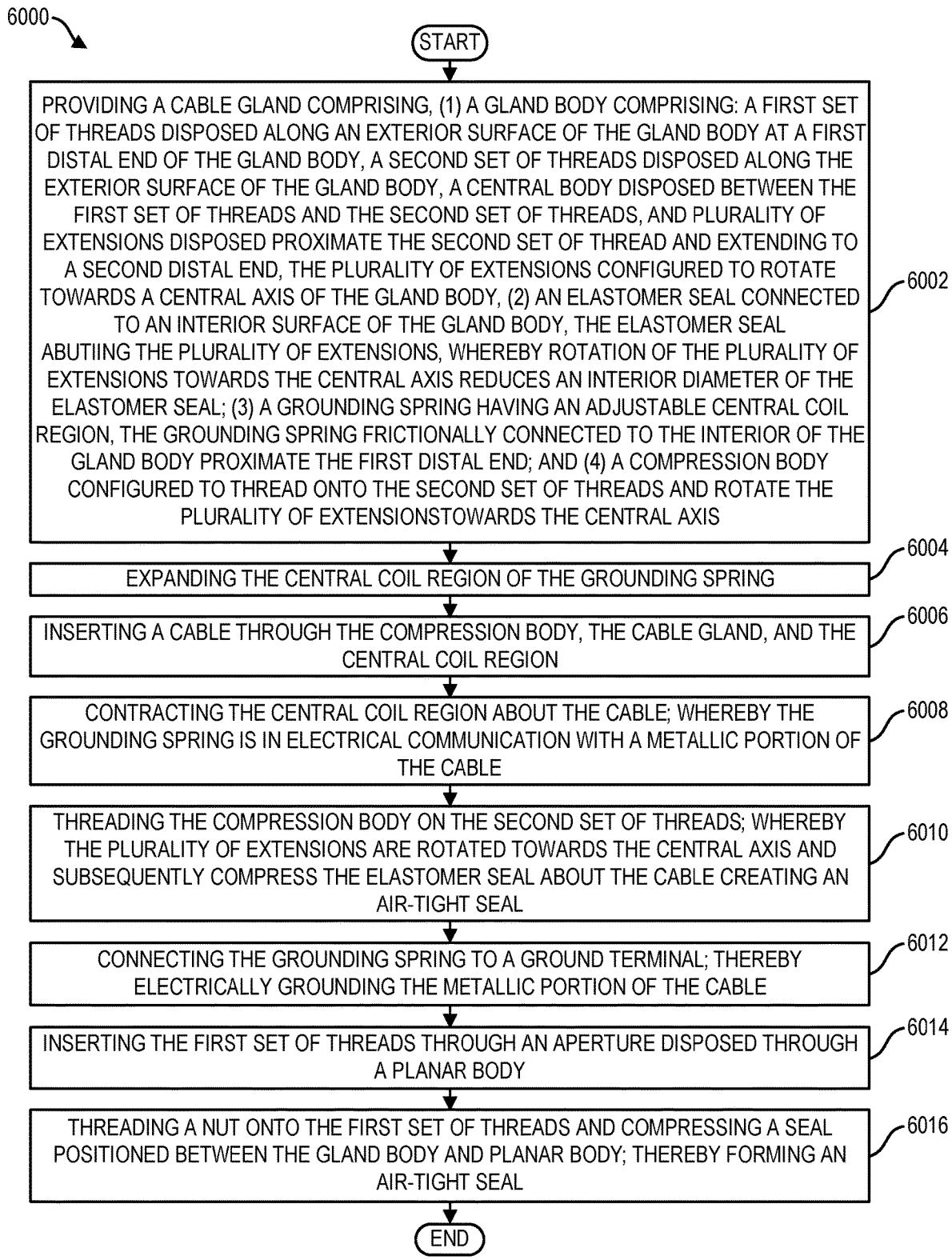
FIG. 46 is a flow chart according to a method of the disclosed subject matter.

In some embodiments, and referring to flow chart 6000 of FIG. 46, a method of grounding a cable comprises the steps of, at block 6002, providing a cable gland comprising: (1) a gland body comprising: a first set of threads disposed along an exterior surface of the gland body at a first distal end of the gland body, a second set of threads disposed along the exterior surface of the gland body, a central body disposed between the first set of threads and the second set of threads, and a plurality of extensions disposed proximate the second set of threads and extending to a second distal end, the plurality of extensions configured to rotate towards a central axis of the gland body; (2) an elastomer seal connected to an interior surface of the gland body, the elastomer seal abutting the plurality of extensions; whereby rotation of the plurality of extensions towards the central axis reduces an interior diameter of the elastomer seal; (3) a grounding spring having an adjustable central coil region, the grounding spring frictionally connected to the interior of the gland body proximate the first distal end; and (4) a compression body configured to thread onto the second set of threads and rotate the plurality of extensions towards the central axis.

The method of grounding a cable further includes, at block 6004, expanding the central coil region of the grounding spring. The method further includes, at block 6006, inserting a cable through the compression body, the cable gland, and the central coil region. The method further includes, at block 6008, contracting the central coil region about the cable; whereby the grounding spring is in electrical communication with a metallic portion of the cable. The method further includes, at block 6010, threading the compression body on the second set of threads; whereby the plurality of extensions are rotated towards the central axis and subsequently compress the elastomer seal about the cable creating an air-tight seal. The method further includes, at block 6012, connecting the grounding spring to a ground terminal; thereby electrically grounding the metallic portion of the cable. The method further includes, at block 6014, inserting the first set of threads through an aperture disposed through a planar body. The method further includes, at block 6016, threading a nut onto the first set of threads and compressing a seal positioned between the gland body and planar body; thereby forming an air-tight seal.

Figure 47:
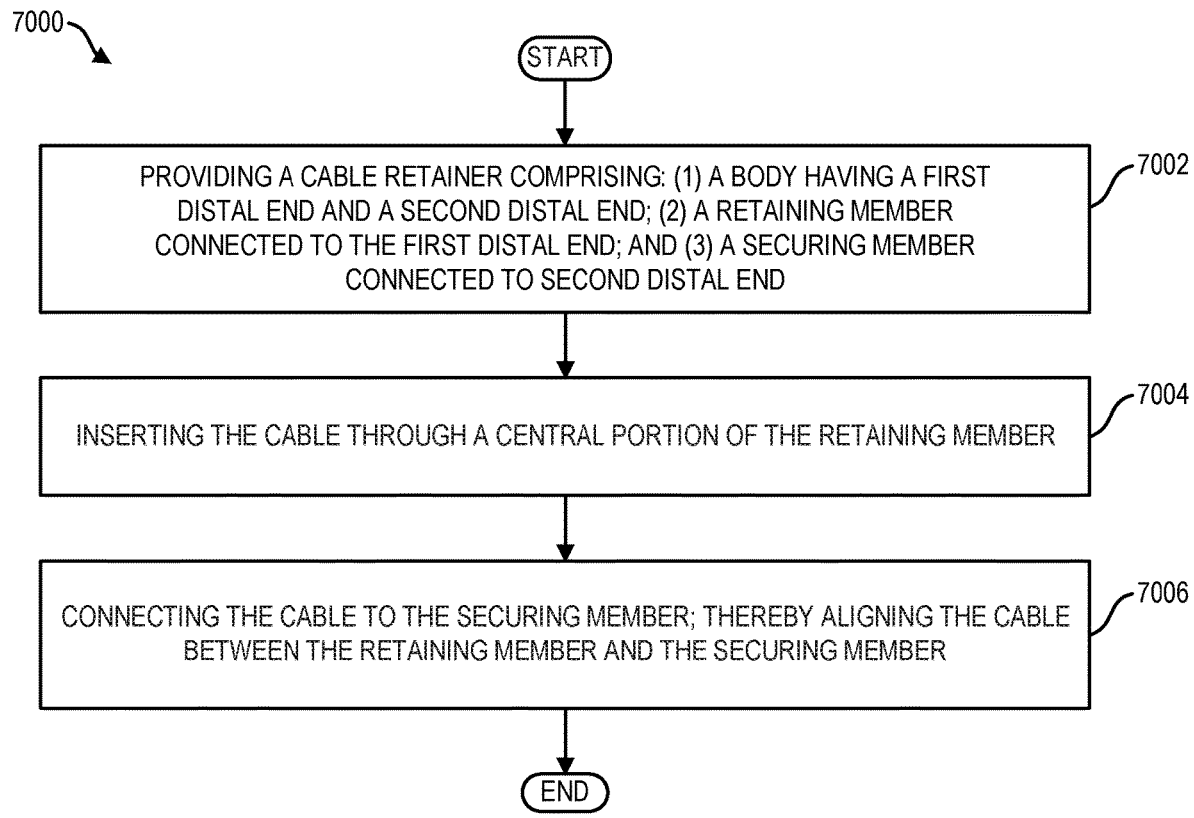
FIG. 47 is a flow chart according to a method of the disclosed subject matter.

In some embodiments, and referring to flow chart 7000 of FIG. 47, a method of aligning a cable comprises the steps of, at block 7002, providing cable retainer comprising: (1) a body having a first distal end and a second distal end; (2) a retaining member connected to the first distal end; and (3) a securing member connected to second distal end. The method further includes, at block 7002, inserting the cable through a central portion of the retaining member. The method further includes, at block 7004, connecting the cable to the securing member; thereby aligning the cable between the retaining member and the securing member.

Having described the disclosed subject matter, what is claimed as new and desired to be secured by Letters Patents is:

1. A cable gland comprising:
   a gland body comprising:
      a central axis;
      an interior surface;
      an exterior surface;
      a first distal end;
      a second distal end opposite the first distal end; and
      a plurality of extensions proximate the second distal end, the plurality of extensions comprises a plurality of inner surfaces inclined towards the central axis;
   an elastomer seal connected to the interior surface proximate the plurality of extensions, the elastomer seal configured to abut the plurality of inner surfaces;
   a compression member configured to rotate the plurality of extensions, whereby rotation of the plurality of extensions compresses the elastomer seal; and
   an earthing insert mounted in the gland body proximate the first distal end.

2. The cable gland of claim 1, further comprising:
   a first set of threads disposed on the exterior surface proximate the first distal end;
   an o-ring disposed around the exterior surface proximate the first set of threads; and
   a nut demountably attached to the first set of threads for compressing the o-ring against the gland body.

3. The cable gland of claim 1, wherein the plurality of inner surfaces comprising a plurality of cavities configured to engage the elastomer seal.

4. The cable gland of claim 1, wherein the elastomer seal further comprising:
   a set of channels disposed along an exterior seal surface of the elastomer seal, the set of channels extending from a first seal end towards a second seal end;
   a set of tapered end faces disposed between the set of channels proximate the first seal end; and
   a set of exterior surface protrusions disposed on the set of tapered end faces configured to engage the plurality of inner surfaces.

5. The cable gland of claim 4, wherein the elastomer seal further comprising a set of tongues disposed around a circumference of the exterior seal surface, the set of tongues configured to engage a set of grooves disposed around the interior surface of the cable gland.

6. The cable gland of claim 4, wherein the elastomer seal further comprising:
   an annular ring extending from the first seal end towards a central seal axis; and
   a plurality of thickened bodies disposed on the annular ring; wherein the plurality of thickened bodies are radially aligned with the set of tapered end faces.

7. The cable gland of claim 1, wherein the compression member comprises a plurality of tabs disposed around an interior compression surface of the compression member.

8. The cable gland of claim 7, wherein at least one of the plurality of tabs comprise an inclined surface configured to intermittently engage the plurality of extensions when the compression member is rotated about the plurality of extensions.

9. The cable gland of claim 1, wherein the plurality of extensions comprise a plurality of helical fingers helically disposed about the central axis.

10. The cable gland of claim 1, wherein the gland body comprises an interior slot disposed about a first interior diameter proximate the first distal end.

11. The cable gland of claim 10, where in the earthing insert comprises a grounding spring comprising:
    a coiled member spiraling inwardly towards a central spring axis; wherein the coiled member forms a central coil region about the central spring axis;
    a restraining tab connected to the coiled member at a first coil distal end; the retraining tab extending outwardly and away from the coiled member; and
    a planar grounding tab connected to the coiled member at a second coil distal end; the planar grounding tab extending away from the coiled member.

12. The cable gland of claim 11, wherein the planar grounding tab is disposed approximately 0 to 10 degrees to the central spring axis.

13. The cable gland of claim 11, wherein the restraining tab is disposed approximately perpendicular to the central spring axis.

14. The cable gland of claim 11, wherein the earthing insert is constructed of an electrically conductive material.

15. A cable gland comprising:
    a gland body comprising:
       a central axis;
       an interior surface;
       an exterior surface;
       a first distal end;
       a second distal end opposite the first distal end;
       a first set of threads disposed on the exterior surface proximate the first distal end; and
       a plurality of extensions proximate the second distal end, wherein the plurality of extensions comprising a plurality of inner surfaces inclined towards the central axis;
    an elastomer seal connected to the interior surface proximate the plurality of extensions, the elastomer seal configured to abut the plurality of inner surfaces;
    a compression member configured to rotate the plurality of extensions, whereby rotation of the plurality of extensions compresses the elastomer seal; the compression member comprising a plurality of tabs disposed around an interior compression surface of the compression member;
    an earthing insert mounted in the gland body proximate the first distal end;
    an o-ring disposed around the exterior surface proximate the first set of threads; and
    a nut demountably attached to the first set of threads for compressing the o-ring against the gland body.

* * * * *